US009625344B2

(12) United States Patent
Etheredge et al.

(10) Patent No.: US 9,625,344 B2
(45) Date of Patent: Apr. 18, 2017

(54) SYSTEM AND METHOD FOR ADAPTIVE ELECTRONIC DISTRIBUTION OF INFORMATION

(71) Applicant: SavvyPhone LLC, St. Petersburg, FL (US)

(72) Inventors: David Etheredge, New Port Richey, FL (US); Lisa Nalewak, New Port Richey, FL (US); Daud Power, Maldon (GB); John David Sims, Las Vegas, NV (US); Eric Hicks, Palm Harbor, FL (US); Michael James Kenny, Port Richey, FL (US); David Lee West, II, Palm Harbor, FL (US); Eli Wheaton, Dunedin, FL (US)

(73) Assignee: SAVVYPHONE, LLC, St. Petersburg, FL (US)

( * ) Notice: Subject to any disclaimer, the term of this patent is extended or adjusted under 35 U.S.C. 154(b) by 561 days.

(21) Appl. No.: 13/666,927

(22) Filed: Nov. 1, 2012

(65) Prior Publication Data
US 2013/0226995 A1 Aug. 29, 2013

Related U.S. Application Data

(60) Provisional application No. 61/554,217, filed on Nov. 1, 2011, provisional application No. 61/604,231, filed on Feb. 28, 2012.

(51) Int. Cl.
G06F 15/16 (2006.01)
G06F 3/0481 (2013.01)
G06F 3/0482 (2013.01)
G01L 27/00 (2006.01)
G06F 3/00 (2006.01)
G06Q 30/02 (2012.01)
E02F 9/22 (2006.01)
F15B 13/044 (2006.01)
H04L 29/08 (2006.01)

(52) U.S. Cl.
CPC ............ *G01L 27/00* (2013.01); *E02F 9/2228* (2013.01); *F15B 13/044* (2013.01); *G06F 3/00* (2013.01); *G06Q 30/02* (2013.01); *H04L 67/02* (2013.01)

(58) Field of Classification Search
CPC .... G06Q 30/02; G06Q 50/01; G06Q 30/0251; H04L 67/22; H04L 67/306; H04L 67/30; G06F 3/04817; G06F 3/0482; G06F 3/04845; G06F 3/0488; G06F 17/3089; G06F 3/0485
USPC .................................. 709/203; 715/204, 810
See application file for complete search history.

(56) References Cited

U.S. PATENT DOCUMENTS 8,732,010 B1* 5/2014 Parikh et al. ................ 705/14.1
2004/0015568 A1* 1/2004 Kaakani et al. .............. 709/220
(Continued)

*Primary Examiner* — Oleg Survillo
*Assistant Examiner* — Imran Moorad
(74) *Attorney, Agent, or Firm* — Polsinelli PC

(57) ABSTRACT

A system and method for generating, presenting, transferring, and tracking personal, product, organizational information or the like as a microsite that mimics the look and feel of a business card in a manner that is adaptive to the platform on which the microsite displays. A microsite may be associated with a product, person, organization or other entity, and may be grouped together with other microsites in various associations. Share activity of the microsites between users may be tracked to generated share analytics on the shared microsites.

11 Claims, 41 Drawing Sheets

402

404

(56) References Cited

U.S. PATENT DOCUMENTS

| | | |
|---|---|---|
| 2004/0117213 A1* | 6/2004 | Pache et al. .................... 705/2 |
| 2005/0251448 A1 | 11/2005 | Gropper |
| 2008/0249833 A1 | 10/2008 | Ali et al. |
| 2009/0089073 A1 | 4/2009 | Su |
| 2009/0125800 A1* | 5/2009 | Chen et al. ................ 715/234 |
| 2009/0197581 A1 | 8/2009 | Gupta et al. |
| 2009/0282352 A1* | 11/2009 | Solanki ............. G06F 3/04817 715/765 |
| 2010/0268584 A1* | 10/2010 | Pullur et al. ............. 705/14.16 |
| 2010/0313116 A1* | 12/2010 | Hyman ................ G06Q 10/00 715/240 |
| 2012/0035992 A1* | 2/2012 | Tanaka et al. ............. 705/14.4 |
| 2012/0059696 A1* | 3/2012 | Theberge et al. ........... 705/14.4 |

\* cited by examiner

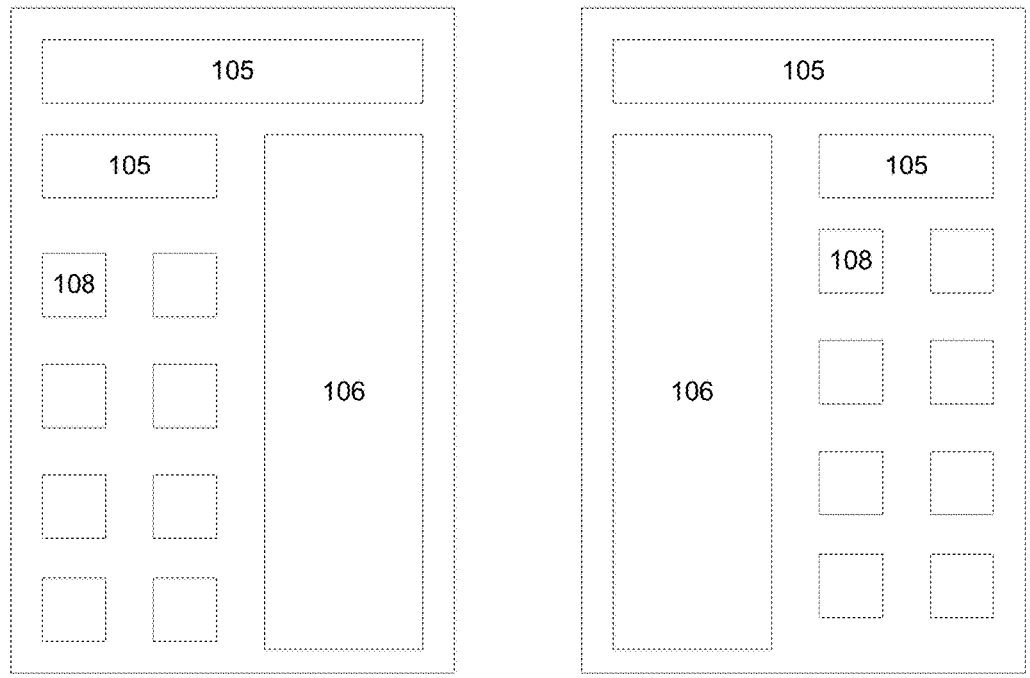
Fig. 2
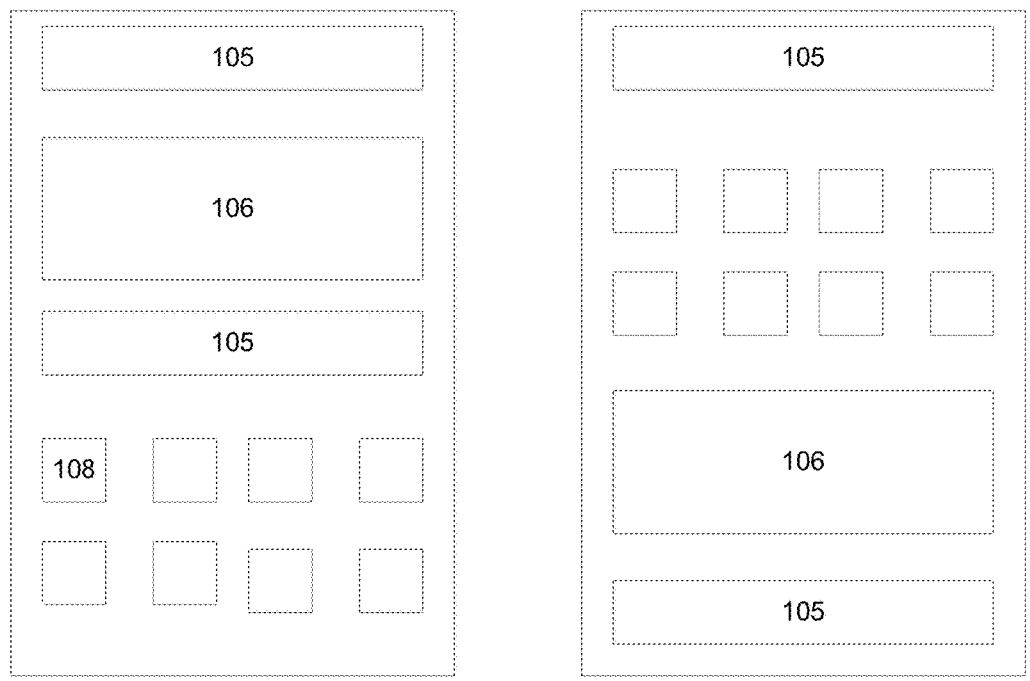

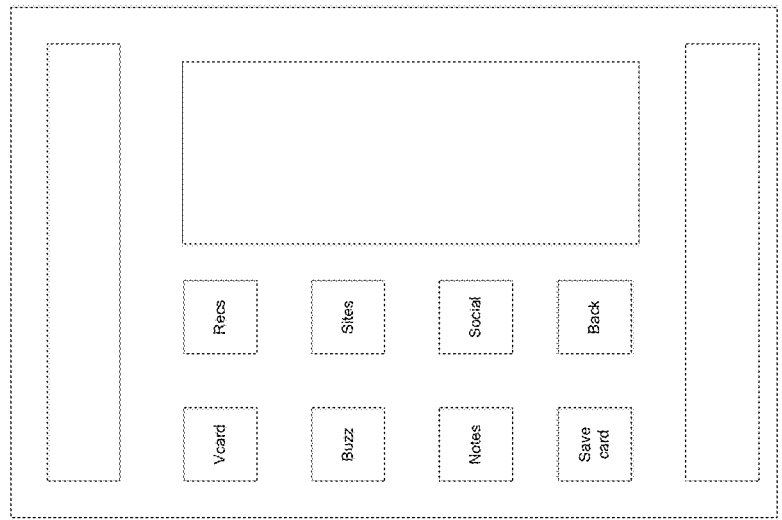
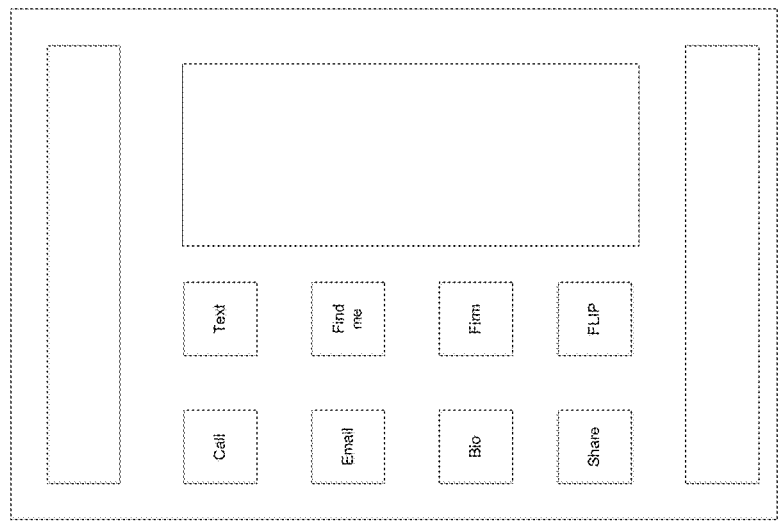
Fig. 4

| Icon | Name | Status |
|---|---|---|
| Call | Call | X |
| Text | Text | X |
| Email | Email | X |
| Find me | Find me | X |
| Bio | Bio | X |
| Firm | Firm / uspto.gov | X |
| Share | VCARD | X |
| Vcard | | X |
| Buzz | Buzz | |

Fig. 5

| Icon | Name | Status |
|---|---|---|
| Call | Call / Phone number: 202 555 1234 | X |
| Text | | X |
| Email | Email | X |
| Find me | Find me | X |
| Bio | Bio | X |
| Firm | Firm | X |
| Share | Share | X |
| Vcard | VCARD | |
| Buzz | Buzz | |

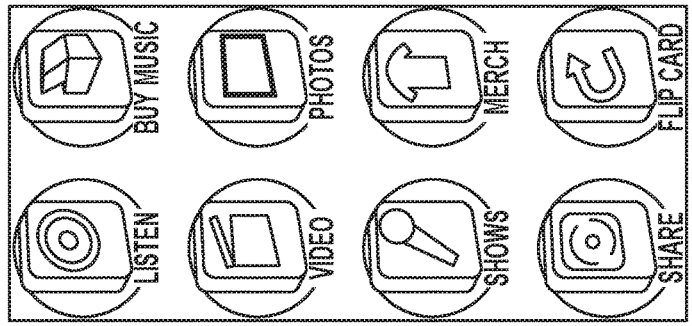
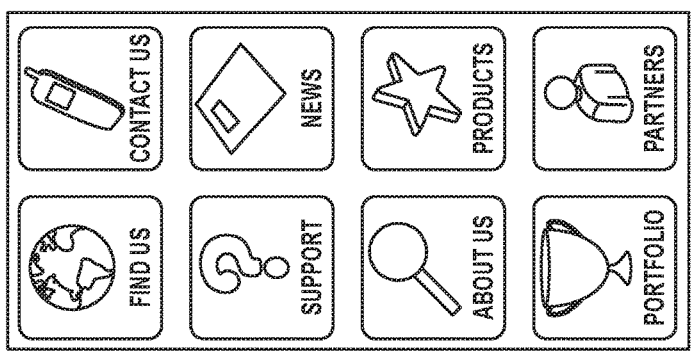
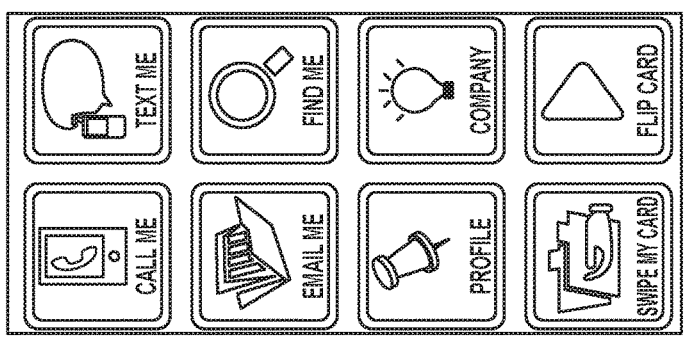
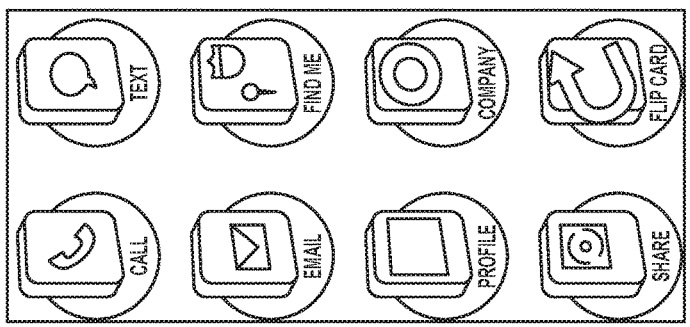
Fig. 17

| Card Analytics [Total Shares: 13] | | | | | Dave West |
|---|---|---|---|---|---|
| Top 5 Sharers | | | | | Curator of Awesome |
| Sharer | Shares | | | | SavyPhone, LLC |
| Lisa Naievak | 4 | | | | Tarpon Springs, FL US |
| Dave West | 3 | | | | |
| Daud Power | 3 | | | | |
| David Etheredge | 2 | | | | |
| Joe Smith | 1 | | | | |

Share Details (last 30 days)

| Date | Type | Who shared? | To whom? | Share message (Hover to show full message) |
|---|---|---|---|---|
| 1 Nov 2012 | ✉ | Daud Power | Jessica Jenkins | Here is the programmer I was talking about. |
| 1 Nov 2012 | ✉ | Daud Power | Anthony Stark | No message supplied |
| 1 Nov 2012 | ⌕ | Daud Power | Amanda Johnson | No message supplied |
| 1 Nov 2012 | ✉ | David Etheredge | Joan | Dave can help you with all your web development needs. |
| 1 Nov 2012 | ⌕ | Dave West | Dave | WHAT!!! |
| 22 Oct 2012 | ⌕ | Dave West | Recipients Name | true |
| 22 Oct 2012 | ✉ | Dave West | Recipients Name | Message |

Total shares is a count of all shares and also includes your anonymous shares (0) which are not listed above

Fig. 41

SYSTEM AND METHOD FOR ADAPTIVE ELECTRONIC DISTRIBUTION OF INFORMATION

PRIORITY CLAIM

The instant application claims priority to U.S. Provisional Patent Application 61/554,217 filed Nov. 1, 2011, entitled SYSTEM AND METHOD FOR ADAPTIVE ELECTRONIC DISTRIBUTION OF INFORMATION, and U.S. Provisional Application 61/604,231 filed Feb. 28, 2012, also entitled SYSTEM AND METHOD FOR ADAPTIVE ELECTRONIC DISTRIBUTION OF INFORMATION, the disclosures of which are incorporated herein in their entirety.

BACKGROUND

1. Field of the Disclosure

The present disclosure relates to the use and transfer of electronic information in a visually immersive and adaptable environment. More specifically, the present disclosure relates to generating, presenting and transferring personal, product, organizational information or the like as a microsite that mimics the look and feel of a business card in a manner that is adaptive to the platform on which the microsite displays.

2. Background Information

In various human interactions, it is necessary to exchange contact data. In business circles, this is often done through the physical exchange of business cards. In earlier years, people typically retained the business cards in a rolodex or transferred the information into a contact log. In more modern times the data from the card is imported into an electronic database. In some cases, people expand upon the relationship to social networking sites such as LINKEDIN or FACEBOOK, in which people can invite others to join their social circles.

Exchange of information through print media has various disadvantages. The printed media is static as of its printing. It therefore cannot be edited or updated absent reprint and redistribution. The provider loses control of the print media once it is in the hands of a third party. Physical channels, such as physical proximity or delivery via the mail, are necessary for distribution.

Some efforts have been made to convert print media into electronic format. For example, printed material can be scanned and converted into electronic format. In some cases information in the scanned matter can be electronically extracted and used to make electronic files for the person, such as potentially a VCARD in OUTLOOK. These systems suffer from similar limitations to print media, in that the information is static at the time of its creation, and physical control of the information is lost once the information is sent.

Websites, such as networking sites (e.g., FACEBOOK or LINKEDIN) provide electronic methods for the exchange of information with varying degrees of access within social circles. A drawback of websites is that they are generally designed for use and display on PCs or laptops that have large display screens and updated web browser access. Such websites are not easily displayable on smaller devices such as mobile phones or tablets, such that the website providers must create alternative (e.g., mobile) versions of the website and/or applications for specific devices. Another drawback of networking sites is that they are generally content independent, in that the website functionality is the same regardless of whether the content is a person or a product.

SUMMARY

According to an example embodiment, a method for adaptive distribution of information includes storing, by a server, microsite information for a first microsite; determining, by the server, a platform of a device for reproducing the first microsite; and generating, by the server, the first microsite based on the platform of the device, wherein the first microsite is associated with a unique identifier identifying the first microsite, and wherein the first microsite is associated with the same unique identifier for all platforms.

According to another example embodiment, a method for adaptive distribution of information includes storing, by a server, microsite information for a first microsite; determining, by the server, a platform of a device for reproducing the first microsite; generating, by the server, the first microsite based on the platform of the device, wherein the first microsite is associated with a unique identifier identifying the first microsite, wherein the first microsite is associated with the same unique identifier for all platforms, and wherein the step of generating the first microsite based on the platform of the device includes providing at least one software application for performing a functional aspect of the first microsite by at accessing at least one of hardware and software of the platform of the device; and receiving, by the server, share analysis information if the first microsite is shared by a first user to at least one second user.

According to still another example embodiment, a method for adaptive distribution of information includes storing, by a server, microsite information for a first microsite; determining, by the server, a platform of a device for reproducing the first microsite; generating, by the server, the first microsite based on the platform of the device, wherein the first microsite is associated with a unique identifier identifying the first microsite, and wherein the first microsite is associated with the same unique identifier for all platforms; receiving, by the server, share analysis information if the first microsite is shared by a first user to at least one second user; and providing, by the server, at least a portion of the share analysis information for the first microsite to at least one third user.

BRIEF DESCRIPTION OF THE DRAWING FIGURES

These and other objects, features and advantages will be apparent from a consideration of the following Detailed Description of Example Embodiments considered in conjunction with the drawing Figures, in which:

FIG. 2 shows optional visual layouts for a card;

FIG. 4 shows example button views for cards;

FIG. 5 shows an example car in which data (a phone number) is provided for a "Call" button, and a URL link is provided for a "Firm" button;

FIG. 17 shows various different artistic collections of buttons;

FIG. 25 shows an example card search page;

FIGS. 31-35 show an example of one collection of formats of a card creation tool according to a disclosed embodiment;

FIG. 41 shows an example share analytics summary report for an example card.

DETAILED DESCRIPTION OF DISCLOSED EMBODIMENTS

It is to be understood that the figures and descriptions of embodiments of the present disclosure have been simplified to illustrate elements/steps relevant for a clear understanding of the present disclosure, while eliminating, for the purpose of clarity, other elements/steps found or used in typical presentations, productions, data delivery, computing systems, devices and processes. Those of ordinary skill in the art may recognize that other elements and/or steps are desirable and/or required in implementing embodiments of the present disclosure. However, because such elements and steps are well known in the art, and do not facilitate a better understanding of the present disclosure, a discussion of such elements/steps is not provided herein.

Figure 19:
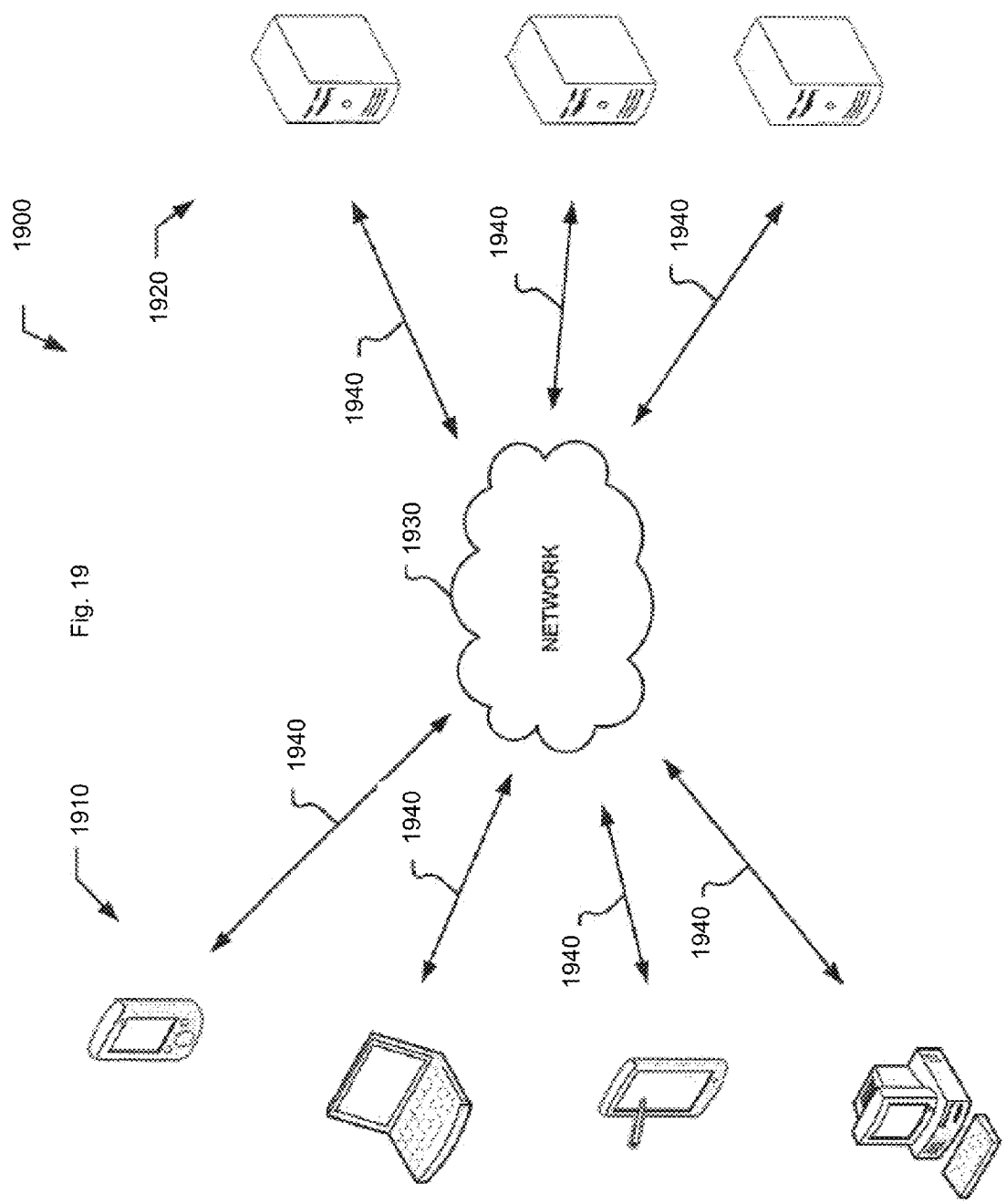
FIG. 19 shows a block diagram of a system according to an embodiment of the present disclosure.

Referring now to FIG. 19, there is shown a configuration of a system 1900 according to an embodiment of the present disclosure. In certain embodiments of the present disclosure, system 1900 is configured for performing and/or providing functionalities described herein.

System 1900 includes a first class of computing devices 1910 and a second class of computing devices 1920. The classes may, but need not be mutually exclusive. For example, one or more computing devices may be members of more than one of classes 1910, 1920. Generally, each of the computing devices of classes 1910, 1920 are communicatively interconnected with one another via at least one data compatible network 1930, such as the global interconnection of computers and computer networks commonly referred to as the Internet, and/or other wireline and/or wireless telecommunications networks. In the illustrated embodiment of FIG. 19, the computing devices of class 1910 are interconnected with the computing devices of class 1920 via network 1930 and network connections 1940. In certain embodiments of the present disclosure, one or more of these computing device interconnections may comprise wireline and/or wireless Internet or other data network connections.

In certain embodiments of the present disclosure, class 1910 computing devices may comprise end-user computing devices, such as personal computers, like desktop, laptop and/or tablet computers, terminals, web-enabled personal digital assistants, tablets, Internet appliances and/or web enabled cellular telephones or smart phones, for example.

In certain embodiments of the present disclosure, class 1920 computing devices may comprise servers, for example. In certain embodiments of the present disclosure, class 1920 computing devices may correspond to network or system servers. In certain embodiments of the present disclosure, computing devices in class 1920 provide one or more websites that are accessible by computing devices in class 1910, for example.

By way of non-limiting explanation, "computing device", as used herein, generally refers to a general-purpose computing device that includes a processor. A processor, such as a microprocessor, as used herein, generally includes a Central Processing Unit (CPU). A CPU generally includes an arithmetic logic unit (ALU), which performs arithmetic and logical operations, and a control unit, which extracts instructions (e.g., code) from a computer readable medium, such as a tangible memory, and decodes and executes them, calling on the ALU when necessary. "Memory", as used herein, generally refers to one or more devices or media capable of storing data, such as in the form of chips or drives. For example, memory may comprise one or more random-access memory (RAM), read-only memory (ROM), programmable read-only memory (PROM), erasable programmable read-only memory (EPROM), or electrically erasable programmable read-only memory (EEPROM) chips, by way of further non-limiting example only. Memory may be internal or external to an integrated unit including the processor. Memory may comprise magnetic or optical technology based storage media. Memory may be internal or external to a computing device. Memory may store a computer program, e.g., code or a sequence of instructions being operable by the processor. In certain embodiments of the present disclosure, one or more elements may comprise, or functionalities discussed may be provided using, code being executed using one or more computing devices, such as in the form of computing device executable programs or applications being stored in memory. There are various types of computing devices having varying processing and memory capabilities, for example: personal computers (e.g., personal computers commercially available from DELL and APPLE), and personal digital assistants and smart phones (e.g., smart phones available from APPLE, MOTOROLA, HTC and RIM), by way of non-limiting example only.

A "server", as used herein, is generally communicatively coupled to a network, and manages network resources. A server may refer to a discrete computing device, or may refer to an application that is managing resources rather than a discrete computing device. "Network", as used herein, generally refers to a group of two or more computing devices communicatively connected to one-another.

"Website", as used herein, generally refers to a collection of one or more electronic documents (e.g., webpages) that are available via a computer and/or data compatible network, such as the Internet. By way of non-limiting example, a website may typically be accessed at a given address on the World Wide Web (e.g., "www.URL.TLD"), and include a home page, which is the first webpage visitors typically see when they enter the site. A website may also contain additional webpages. Webpages may be fixed, and/or dynamically generated in response to website visitor webpage requests. By way of further non-limiting example only, the World Wide Web is a system of Internet servers that generally support HTML (Hypertext Markup Language), such that a website visitor can jump from one webpage to another webpage by clicking on references to other webpages, such as hot spots or hot links (sometimes referred to as "links"). Web browsing applications, such as Microsoft's Internet Explorer™, Google's Chrome™, and Apple's Safari™ are commercially available applications typically used to access websites on the World Wide Web. Webpages are typically served by servers. Other computer network types and/or protocols and/or mark up languages and/or applications may be used.

The general manner of creating website content and delivering it to Web browsers is well known in the art, and is not discussed further herein. When presented with desired functionality of a website, the method used by web designers to design webpages that can implement such functionality is well known, and not discussed further herein. Similarly, the back end architecture, including servers, networks displays, processors, databases and/or memories and the interactivity there between are also well known and not discussed herein beyond the general architecture discussed below with respect to FIG. 19. Further, the disclosure is not limited to the specific webpages discussed herein, nor the design or layout of the same. Similarly, the disclosure is not limited to "webpages" per se, and may be any form of interaction between a user interface and electronic computer hardware, software and/or networks. For ease of reference, webpages are referred to herein, although it is to be understood that the disclosure is not limited to webpages.

Web browser applications, as referred to herein, may include one or more plug-ins. A plug-in, or add-on, as used herein, is a computer program (e.g., code stored in memory) that interacts with a host application (such as the web browser application) to provide a certain, often specific, function "on demand". For example, a plug-in may be used to provide for media file playback within or in association with a host web browser application responsively to certain activity that occurs in connection with the host web browser application, e.g., a user clicking on a link.

Embodiments of the present disclosure are generally directed to the creation, and distribution of microsites (mini-websites) that mimic the look and feel of business cards. The microsites may be adaptable to the device (e.g., PC, laptop, tablet, mobile phone, etc), operating system (e.g., WINDOWS, LION, ANDROID, iOS, etc.), and/or web browser (IE, MOZILLA, SAFARI, etc.). The concept of a device and/or operating system and/or web browser is hereinafter referred to as "platform". Adaptability may, for example, be visual and/or functional.

Visual adaptability may generally refer to the ability of the website to tailor the display of the microsite to the platform on which it is displayed. The same microsite may thus display differently on different platforms. Functional adaptability may generally refer to the ability of the website to assign functionality of the microsite, which is tailored to the platform that interacts with the website. The same microsite may thus operate differently on different platforms. By way of example, a microsite may visually appear the same on two different platforms, but function differently.

As discussed in more detail below, this microsite preferably has a look and feel of a business card when displayed on a mobile phone. (A common size of business cards is 3.5×2 inches, which is consistent with the realm of dimensions and/or dimension ratios of the display screens of many current mobile phones.) For ease of discussion, this microsite shall be referred to herein as a "card."

Figure 1:
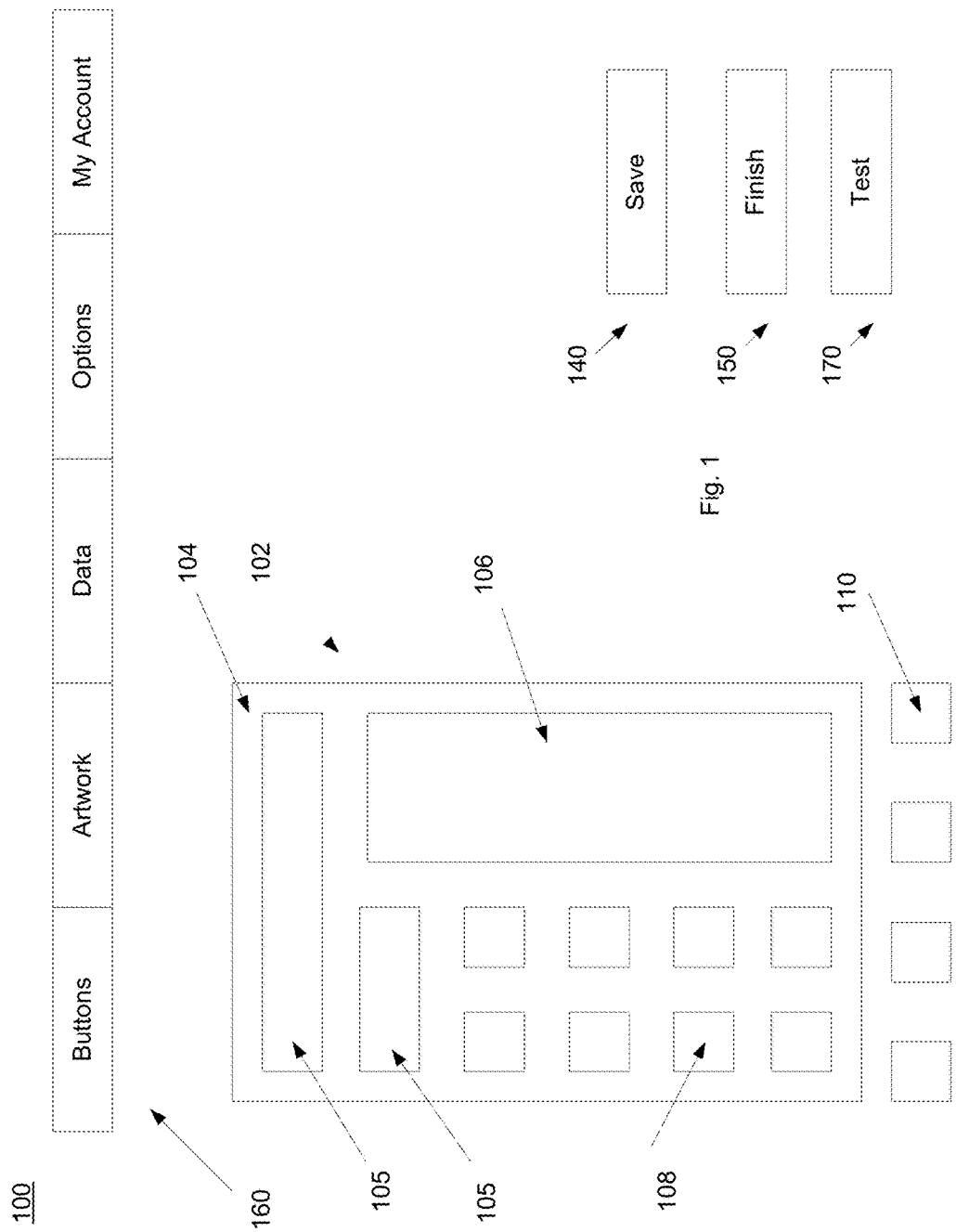
FIG. 1 shows a card creation tool according to a disclosed embodiment.

An initial step is to create a card. Referring now to FIG. 1, a card creation tool 100 is shown. To access the card creation tool 100, it may be desirable for a user to first register and/or establish an account with the website provider via a user ID and password. This provides a method for the system to store cards for that particular user.

Card creation tool 100 may be a webpage or series of webpages that a user can interact with to create a card. A toolbar 160 may provide navigation to various portions of the tool 100. Toolbar 160 preferably includes a button function, an artwork function, a data function, and/or options function, each of which navigate to a webpage or portion of a webpage (for ease of reference, only webpage is referred to herein, although the disclosure is not so limited). The names of the various functions are exemplary only, and other names for similar functions can be used. Other toolbar functions may also be provided. The use of a toolbar for navigation and/or use of the card creation tool 100 is exemplary only, and other navigation and/or methods may be employed.

Card creation tool 100 includes a card creation area 102 that serves as the visual platform within which the user designs the artistic look of the card. The card preferably includes one or more backdrop fields 104, one or more graphic/text fields 105, one or more photo field(s) 106, a misc. field 107 (not shown) and one or more button fields 108. Other fields not shown may also be provided. These fields may be populated as discussed below.

Another series of options presented as buttons 110 enable a user to select between certain preset layouts of the various fields 102-108. Referring now to FIG. 2, various layouts that can be selected are shown, and four (4) buttons 110 are shown to select amongst four (4) possible layouts. Other configurations for buttons 110 may be used, such as next or next/back. The disclosure is not limited to any particular method to change layouts.

The disclosure is not limited to any particular layout, and the layouts may be customized by the user beyond the layouts shown. In this way the layouts can be thought of as templates. However, it may be desirable to limit the layout of cards only to predetermined layout formats, as this may provide the foundation of a common branding scheme.

As discussed in more detail below, a user can design a card using the card creation tool 100. The user can save the draft card at any time to preserve progress via a save button 140. When the card has reached the desired state of completion, the user indicates the same, such as by pressing a finish button 150.

In the alternative, the system requires the user to preserve progress via the save button for each change or group of changes made, such that the card is effectively updated in real time so there is no need to press a finish button 150. In another alternative, the system can save automatically on a per modification basis, group of modifications basis (such as a number of changes and/or after changes to a particular cluster of items), or on a timed basis. Another button can be provided to undo modifications and/or return the card to a prior iteration.

The website stores the card in memory as a new microsite and assigns the card one or more unique identifier(s), such as a URL and/or QR code. For ease of discussion, only a URL or QR code is referred to herein, although the disclosure is not so limited and other identifiers may be used. The URL may be any unique ID number, name and/or a custom designation (e.g., a "vanity" URL) selected by the user (to the extent available).

Fields 102-107 of card creation area 102 can be populated in any order desired by the user. An exemplary method is provided below for ease of discussion. It is to be understood that the disclosure is not limited to any particular order of steps by which the card is created. Nor does a card need to utilize all of the fields shown in FIG. 1.

It is also noted that a completed card is not necessarily fixed. A cardholder can post-completion modify aspects of the card. For example, a user may want to change their picture or update their phone number after a job change. Card creation tool 100 is a non-limiting example of a method by which cardholders can modify their cards, but the invention is not limited thereto. Preferably, a card once updated maintains the same identifier(s) for retrieval purposes such that individuals who already have stored the identifier for the card can still retrieve the card.

Artwork

One useful method for beginning creation is via the selection of artistic qualities of the card. These options may be accessed via the Artwork button on the taskbar 160, which would preferably bring up a specific webpage or subsection of a webpage by which a user can input, select and/or manipulate desired artistic qualities of the card. In the alternative, the various artwork fields discussed below may have their individual buttons on the taskbar 160.

For selection of a background for backdrop field 104, this webpage may display various options from a library of graphics, photos and/or videos supported on the website. The website can also provide links to locate and/or import material from third party libraries of graphics, photos and/or videos. Options can also be presented for a user to load their own graphics, photos and/or videos. Options can also be presented to enable the card provider to offer a service to design a custom background. The disclosure is not limited to any specific source of visual material, and indeed no material need be selected (which would default to a predetermined background). Selected material can be in its original dimensions, cropped to fit the card, and/or resized as desirable by the user.

Photo field 106 is similar to backdrop field 104, but occupies less area. As with backdrop field 104, the photo field 106 can be filled with visual material from any source, although the user may elect not to populate photo field 106 at all.

Figure 6B:
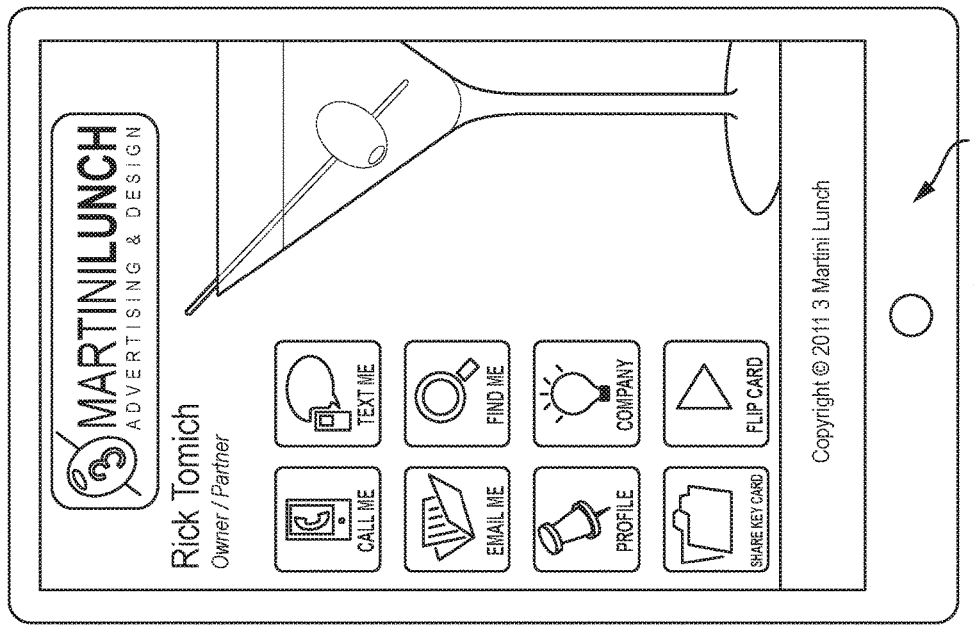
FIG. 6B shows an example card including a field including a graphic.
Figure 11:
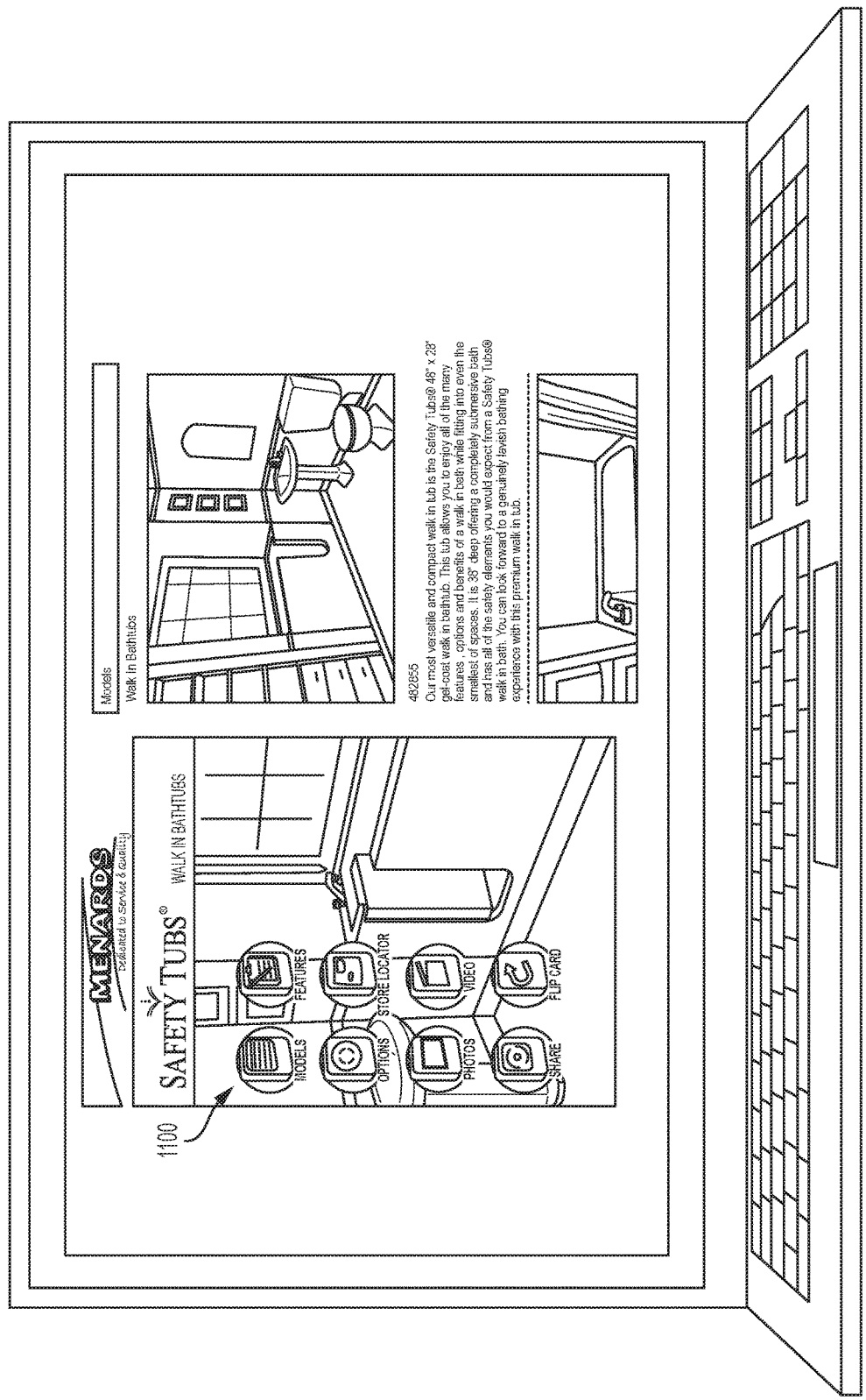
FIG. 11 shows a photo field of a card which is not populated such that the product that appears in the area is actually part of the image of backdrop.

Backdrop field 104 and photo field 106 are preferably populated by static images, but video, slideshows, and/or rotating images (where a different image is presented in response to events, such as button depression and/or when the card is displayed) may be used. For a business card, photo field 106 may be a picture of the person. For a product, backdrop field 104 may be akin to a brochure of the product, and/or photo field 106 may be a picture of the product. By way of non-limiting example, in FIG. 6A, field 106 in card 600 is a photo of a person. In FIG. 6B, field 106 in card 602 is graphic. In FIG. 11, photo field 106 in card 1100 is not populated (the product that appears in the area is actually part of the image of backdrop 104).

Figure 16:
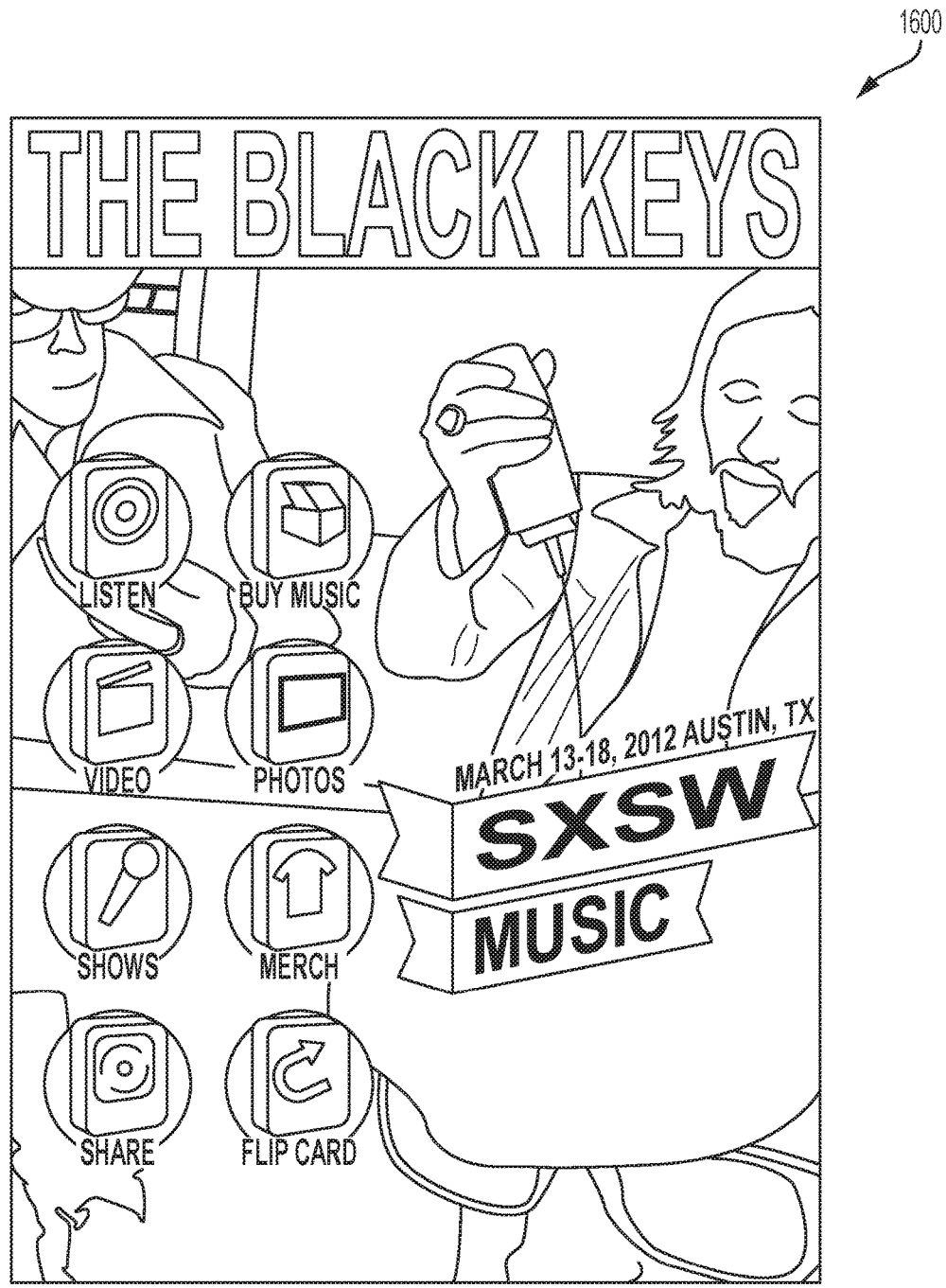
FIG. 16 shows an artistic collection of buttons.

As discussed in more detail below, various button fields 108 should be assigned functionality. The Artwork screen may provide different artistic renditions of the buttons, such as shape, color, or different graphics (although this alternatively can be accessed via the "Buttons" webpage below). FIG. 16 shows an artistic collection of buttons. For example, for a "Call" button, one graphic may be a square blue icon with "call," and another graphic may be a round red circle with a phone inside. FIG. 17 shows how different artistic collections of buttons can be displayed. In the alternative, only individual buttons may be displayed rather than collections of buttons. Options may be presented to design a button based on different features, such as a combination of a selected style and color. Options may be presented to enable the user to customize the design of their buttons.

Preferably button options exist in duplicates for different languages. For example, the button graphic with Call may also exist as the same graphic with Llamar, which is Spanish for call. As discussed in more detail below, this may enable for further customization of the card when presented.

Graphic/text field(s) 105 may present certain text information for the card. For example, for a personal business card, a person's name, title and/or company may be used. For a product card, the name of the product, manufacturer and/or distributor may be used. As with other fields, it is not necessary to populate graphics/text field 105.

Options

The Options or Settings button on toolbar 160 may pull up a webpage or subsection of a webpage that is directed to various options that may be set for the card.

One type of option is that a user may set different levels of access associated with the card. By way of non-limiting example, a user may be able to designate cards as unrestricted, partially restricted, completely restricted, and/or inaccessible. An unrestricted card (accessible to authorized users, as discussed below) has all information and functionality. A partially restricted card omits some information, buttons, and/or renders some buttons inoperative; a user may have multiple different levels and combinations of restrictions to select from. A restricted card level may be only the card itself, with no information and/or buttons available (other than perhaps a button and/or function to contact the website to request an "invitation" for a higher level of access). An inaccessible status may prevent an unauthorized third party from even receiving the card and/or contacting the website or user.

By way of example, a user may share their card with a third party (method discussed below). At the time of sharing, the user may determine whether to provide their unrestricted card or partially restricted card.

In the alternative, the website and/or the user may have a default setting. For example, the cards may be unrestricted by default. In another example, only partially restricted cards are provided to third parties pending a later confirmation stage of agreement by the user to a higher level of access.

By way of non-limiting example, an unrestricted card may be consistent with a "friend" status in social networking circles, and someone with the card may have full access to the card and its associated information and functionality; the third party may thus press the "Call" button and call the cardholder. In contrast, a partially restricted card may not enable for calls; the "Call" button may thus be inactive and/or be configured to respond with a message that access is not granted; or the "Call" button may not even be included on the card at all.

A user can also change and/or manage permissions via interaction with the website. For example, the user can access, through the website, a list of all individuals who have any access to their card. By selecting a particular individual or group of individuals, permission levels can be changed. By way of non-limiting example, a user may give unrestricted permission to a particular individual and later not want that individual to have access to the card. To do this, the user simply changes the permission from unrestricted to an inaccessible setting. When the particular individual next attempts to access the user's card, they would be unable to retrieve the card.

In some cases, there may be only one permission level for a card, although the need for the same may be based at least in part on the nature of the card. For example, a business card, product card or event card may have no need for different permission levels and may be disseminated freely.

A related set of options relates to how the card is listed. A user may designate a card to be listed, partially listed, unlisted and/or inactive. A listed card would return in search results when searched for, whereas an unlisted card would not. A partially listed card might appear in search results under certain predetermined conditions, but not for others. An inactive card simply turns the card off.

Another option is to name the particular card. As users may have multiple cards, individual names for each card may assist in differentiating them. A business card may be named "Business" and a personal card may be named "Personal".

The Options button on the toolbar may also bring up other various options for the user. The disclosure is not limited to any particular options.

Buttons

The "Buttons" on the toolbar 160 navigate to one or more webpages or portion(s) of a webpage where a user can assign appropriate buttons to button fields 108. As discussed in more detail below, each of the buttons has a functionality associated therewith.

Figure 3:
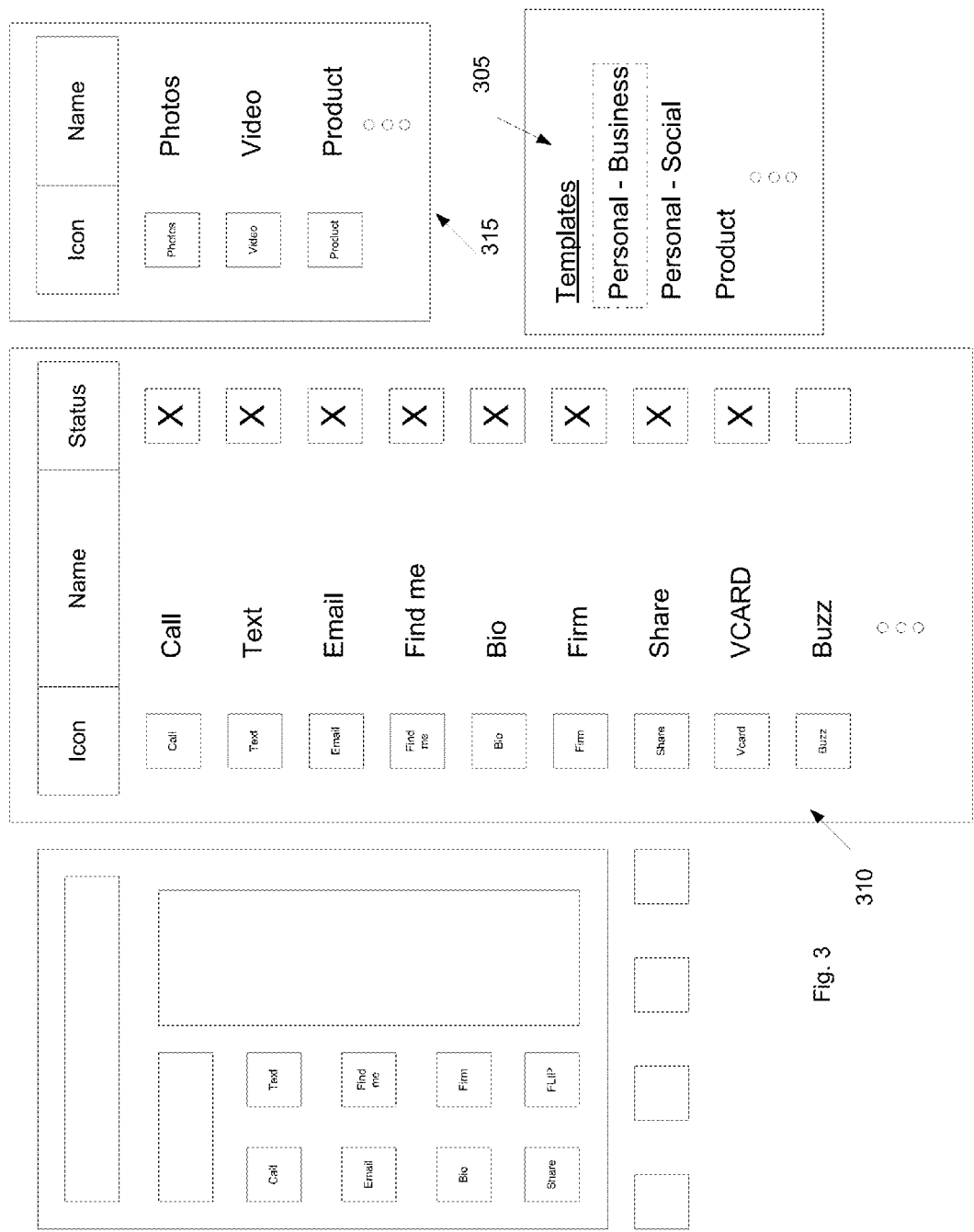
FIG. 3 shows various example fields for a card creation tool.

Referring now to FIG. 3, selection of "Buttons" on toolbar 160 may open various fields including a template field 305, an active button field 310, and an available button field 315. The fields as shown in FIG. 3 may appear in conjunction with the card creation area 102 as in FIG. 1, although this need not be the case. All fields can be displayed on the same screen or window, or disbursed amongst different screens or windows. The fields may be distinct as shown in FIG. 3 or part of a common field. The information therein may be exclusive to a field and/or overlap with other fields.

Template field 305 preferably provides a list of pre-existing templates for different types of cards. Non-limiting examples of types of cards include:

People—Business
People—Social
People—Employment
Product
Event
Service
Public Figure—Sports
Public Figure—Actor
Public Figure—Politician
Real Estate
Company
Quickstart—a basic template with the most commonly used buttons (which may be part of a larger global card template to create a basic level card).

This list is by no means exhaustive. Templates may be made for virtually any person, thing, or subject that may be represented via a website.

The different templates are designed to already include topics of information that are typically relevant to the topic of the template. Some topics may be generic to some or all of the templates. Photos and/or videos are non-limiting examples of the same.

Other topics may be more template specific. For example, a "People-Business" template may have buttons relating to business contact information and professional biographical information, but may exclude personal contact information. A "Personal-Social" template may have buttons relating to personal contact information, but may not include business contact information. A "People—Employment" template may have buttons to access personal contact data, a resume and/or references. A "Product" template may have buttons to access product information, models of available products, and/or optional features.

Once the user selects an appropriate template, button fields 108 of card design area 102 may partially auto-populate with the buttons from the template. By way of non-limiting example, for a Personal-Business card, button fields 108 may populate with: call, email, profile, text, find, share, VCARD, recommend, buzz, my sites, notes, social, and save card. For purpose of reference, FIG. 3 shows the status of some of the fields for selection of a "Personal-Business." The nature of these buttons is discussed in more detail below.

As noted above, embodiments of the disclosure relate to presenting information akin to the look and feel of a business card, and particularly the size of a business card. Business cards have dimensions that are in the realm of the size of displays of mobile phones. Card creation area 102 accordingly positions and presents information and functionality at a size that is easily viewable and useable, particularly for use with touch screen devices.

By way of non-limiting example, Applicants have determined that the buttons should be a certain minimum size for use, preferably with a footprint of about 0.15 square inches.

Relative to the size of a business card (commonly 3.5" by 2") and/or a mobile phone (in the realm of 3" by 2", but sizes vary by model), this optimally enables for eight (8) such buttons to be located on the card when other fields are present, although the disclosure is not so limited.

To the extent that the number of desired buttons on the card exceeds the practical spacing requirements, the buttons may be dispersed into different button views on the card, and a next/back button may be provided by default to move between the different button views. Consistent with the "card" motif of embodiments of the disclosure, the next/back button is preferably labeled FLIP™ or FLIP CARD™, but this need not be the case.

By way of example, the "Personal-Business" card template can have fourteen (14) buttons, which cannot all be displayed in a card configured for eight (8) buttons. The website thus creates two button views. FIG. 4 illustrates how the two button views 402 and 404 may appear. The number of card views is dependent upon the number of buttons desired and the available space per individual card.

In one embodiment of the disclosure, use of the FLIP™/next/back button changes the displayed buttons 108, while the remaining fields of the card remain fixed. In another embodiment of the disclosure, the card creation tool can be used to associate other environmental changes with use of the FLIP™/next/back button, which may include changes in the layout, and/or changes in the content of any of fields 104, 105, and/or 106. The change can be sudden (e.g., the button field is at one moment for one button field, and then reloaded as another button field), or other graphics may be introduced to accompany the change. By way of non-limiting example, the displayed graphics may shrink the card and expand to a new card, thereby visually simulating the effect of turning over a business card to look at its reverse side.

The different sets of buttons that a card may display are referred to herein as a "button view." The different views that an overall card may take are referred to as a "card view."

For design purposes, buttons placed in button fields 108 on card creation area 102 may be static and/or active. A static button would simply be artistic to show the look and feel of the card, but would not trigger any function if depressed. An active button would facilitate the functionality (artistically and/or in actuality) of the underlying function. For example, an active "Photo" button may cause photos associated with the card (discussed below) to appear relative to card creation area 102 in a manner consistent with how they would appear in actual use. Since the visual appearance may be platform dependent, the webpage may provide the user with the option of defining a platform so that the visual appearance simulates the appearance on that particular platform.

Available button field 315 contains the potential buttons that the system can place on any card. Active button field 310 contains buttons that have already been assigned to the card creation area 102. Buttons can be selected from the available button field 315 and transferred to the active button field 310 via, e.g., add/drop commands or drag-and-drop methodologies. To the extent that a template is selected, active button field 310 may auto-populate with button options that are pre-associated with the selected template. As an alternative to the use of templates, the user may build the card manually by selecting buttons from the available button field 315.

Active button field 310 lists the buttons that have been selected for the card as they appear in card creation area 102. Active button field 310 may contain three columns: (1) a column that shows the icons of the buttons as they appear in card creation area 102 so that it can be visually recognized, (2) a text area for the name of the button, and (3) a status column for selecting inclusion of the button on the card by checking a box.

A button that is selected in the third column may appear in one of the button fields 108, while a button that is not selected does not appear. Alternatively, selecting a button enables the user to view how the card looks and/or operates based on all of the ON buttons. For example, in the embodiment of FIG. 3, the "Buzz" button is part of the "Personal-Business" template, but it has been unchecked by the user. It therefore would not be shown in card creation area 102 in any button view and would not be part of the ultimate card generated by the system (discussed below).

In an embodiment of the disclosure, one or more buttons may be mandatory, and therefore may not be disabled or removed via card creation tool 100 By way of non-limiting example, a "Share" button (to distribute the card) or a "Save card" button (to save the card) may be required. Such required buttons may or may not be part of a template, but in any event may be present via template or default in active button field 310 and may not be deselected.

Preferably, a user would be able to organize the various buttons into the button fields 108. This may be done by, e.g., dragging and dropping the button fields 108 in card creation area 102, and/or moving the order of buttons in the active button area 310. In the alternative, there may be some limitations on where certain buttons can be moved. By way of example, it may be desirable for the "Share" button to always appear on the first button view, such that it may not be relocated to a different button view. By way of another example, it may be desirable for the FLIP™/next/back button to always be the last button on a card view and/or button view.

Several buttons may require that the user associate some type of data and/or link to data in order for the button to invoke any functions when depressed. For example, a "Photo" button needs the user to associate pictures and/or links to pictures with that button. Similarly, a "Video" button needs the user to associate video and/or links to video with the button, such as links to YOUTUBE or VIMEO. A "Call" button needs the user to associate with that button a phone number at which they can be reached. An "email" button requires the user to associate an email address to which they can receive any email.

This association can be accomplished by clicking on a row in the active button field 310, which may open a drop down table and/or data entry field that the user can enter the desired information. FIG. 5 shows such an example in which data (a phone number) is provided for the "Call" button, and a URL link is provided to the home page of the person's firm for the "Firm" button. The disclosure is not limited to any particular method for entering data, links, APIs or other material relative to the buttons.

In another embodiment of the invention, one or more buttons may have data associated therewith that is entered and/or controlled via a different source. For example, the "notes" button may refer to notes that an individual user may enter with respect to a particular card. Such data would be specific to the user, such that the cardholder would not be able to access that data and/or enter data of their own directly via card creation tool 100 into the notes section (unless possibly the user and the cardholder are the same person). In situations, the button may be considered mandatory, but the data field may not be accessed via active button field 310.

There are a variety of ways that buttons may appear in button field 108 based on the selected template. One manner is for all of the buttons of the template to automatically appear on the card when the template is selected; the buttons may appear as normal, or differently (e.g., grayed out) if they have not been specifically selected and/or data has not been assigned thereto. For example, the Save button may appear as normal, but the Call button may either not appear or appear grayed out until the user associates a telephone number with the Call button.

Button Functionality

For at least some of the buttons, the website maintains a corresponding database of functionality that is compatible with various known platforms. Consider for example a personal computer, a touch screen mobile phone (such as an IPHONE), and a non-touch screen mobile phone (such as various BLACKBERRY model phones). Each of these devices may have different hardware and/or operating systems that require different operability for different buttons.

For example, a "Call" button may be provided to call the phone number of the user associated with the card. For the IPHONE and BLACKBERRY, pressing this button would, in theory, access the mobile phone's capabilities and enter the number for dialing. However, because these products work on different operating systems, it may be necessary for different protocols to be established to effectuate that function on either phone.

Similarly, as most PCs do not have a phone, the "Call" protocol may be different from that of a mobile phone. For example, the PC protocol may be to automatically access an Internet phone program that is available on the PC, such as SKYPE or FACETIME. In the alternative, the protocol may call for a message to be displayed that prompts the user to select from a list of supported Internet phone programs, possibly limited to only those programs that are installed on the PC. In yet another alternative, the protocol may simply call for the display of the phone number, without prompting or initiating the call.

By way of another non-limiting example, consider a promotional card for a recording artist that has a "Buy Music" button that enables a user to purchase music. For an IPHONE, the music-purchasing portal would be an ITUNES purchase, whereas for an ANDROID product (which has limited compatibility with ITUNES) the music-purchasing portal may be an ANDROID compatible music store.

According to embodiments of the disclosure, the website stores in memory the functionality and protocols for the buttons as platform compatible. Thus, by way of example, the system may store the different protocols to effectuate a "Call" for a PC, an IPHONE, and a non-touch screen BLACKBERRY. Similarly, the system may store the different protocols to effectuate a "Buy Music" button for an IPHONE product and an ANDROID product.

In another example, the manner in which the buttons can be pressed may be platform specific. For example, in a non-touch screen PC, a mouse click may be needed. Physical depression may be suitable for a touch screen phone. Keypad control may be needed for a non-touch screen phone, where specific keys would trigger specific buttons.

It is noted that not every device and/or operating system is different, and different devices and/or operating systems may use common functionality and protocols. For example, an IPAD and IPHONE as understood both use the same touch screen method. It may therefore only be necessary to maintain one functionality/protocol that can be used for both devices. In the alternative, two identical functionality/protocols may be maintained. Functionality can thus be platform specific to the extent that it is designed for that specific platform, or otherwise functionality may simply be compatible with that platform (which may not require the same level of customization).

Prior to completing a card, a user may wish to test how the card looks and/or operates in certain environments. A test option can be provided via a button 170, which creates the card in its present form. Optionally the user may be able to identify a platform for possible use, and thereby observe how the card would operate in that platform.

Icons

As discussed in more detail below, cards may be saved on devices, and for which an icon may appear on a device to access the card. An Icon button on the taskbar 106 may navigate to one or more webpages or portion(s) of a webpage where a user can create an appropriate icon. The method tracks that of the selection of a backdrop video, and/or photo discussed above. Since a home screen icon is usually quite small (on the order of the size of a button), options may be presented to crop and/or shrink the backdrop, photo or video to an appropriate icon size.

Receiving a Request for a Card

As noted above, a URL or other identifier becomes available once the card is completed or created. Once the user has a URL for the card, they can retrieve the card by entering the URL into the web browser of a device. An appropriate request is issued by the device to the website for the card. Another method may be for the user to scan a code, such as a QR code, which would similarly issue a request by the device for the card.

Based on the nature of the platform, the request, or some communication subsequent to the request, may include information that identifies aspects of the platform, such as the device and/or its operating system. The absence of such information that identifies aspects of the platform may in and of itself constitute an identification, and specifically a type of device that does not identify itself. For ease of reference, embodiments below refer to the request containing (or lacking) the information, although it is to be understood that the invention is not limited thereto.

As discussed above, a device such as a mobile phone that sends a request to a website may include in the request certain information about the device's platform. Some websites maintain multiple versions of the webpages and/or individual for use on such devices, and would respond with a different webpage and a different URL. For example, if a mobile phone requests the page for ESPN, then ESPN (currently) responds with the webpage for ESPN mobile. This is not the page that was actually requested, and it often contains information that is different than, or organized differently than, the requested website. ESPN must therefore maintain and update two independent websites.

In contrast, some embodiments of the present disclosure do not select amongst different websites based upon the platform of the requesting device. Rather, various embodiments of the present disclosure create a card for the requester that is at least partially tailored to the platform of the requesting device. This adaption method can occur at both a visual level (the visual environment in which the card and associated content is displayed) and a functional level (the method in how the user interacts with the card and how the system responds).

Before responding to the request for a card, the website checks with existing permissions. For purposes of describing the nature and function of the card, the discussion below presumes that the card is an unrestricted card. However, this need not be the case, and the card as provided (if provided) remains subject to such permissions.

Visual Level Adaptive Options

At the visual level, the website determines, from the request information, as much of the nature of the platform of the requesting device as is possible. It is noted that for a requesting device that does not identify itself, the website may presume that the requesting device is a PC or laptop with a corresponding larger screen size.

Figure 6A:
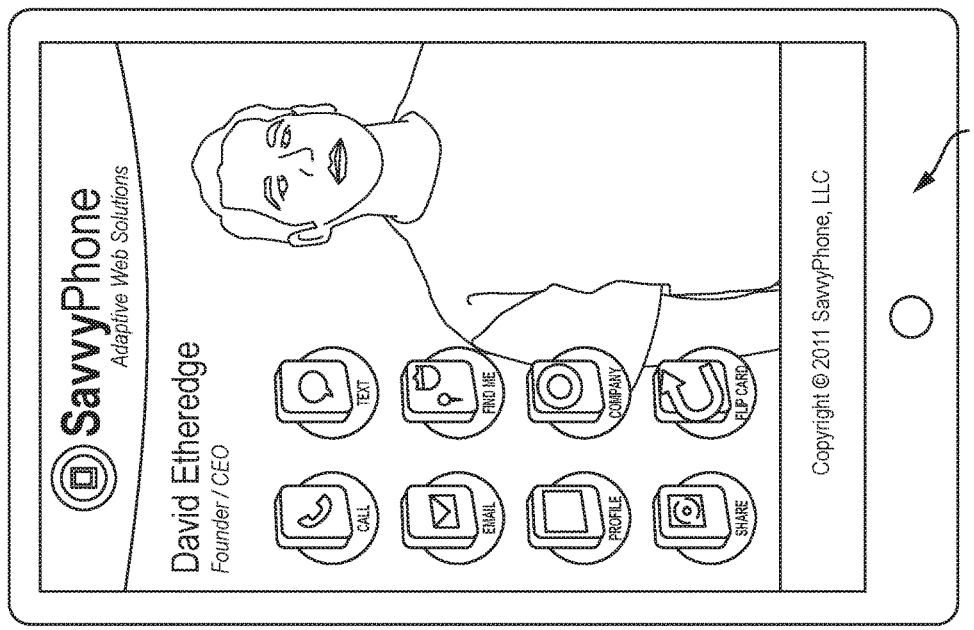
FIG. 6A shows an example card including a field including a photo of a person.

A platform characteristic that has impact on the visual level adaptation is the screen size of the device, as the website determines how the requested card and/or associated information should appear on the screen. In the context of a mobile phone with a screen the size of the phone (e.g., the IPHONE), this is roughly the target size of the card as designed in connection with the card creation area 102. Consequently, the website would organize the card consistent with the same. The website would thus provide the card as a webpage to the device, along with associated data and functionality. The website may also automatically add certain header, footer and/or other information to the card that gives some indicia of origin, copyrights, etc. FIGS. 6A and 6B show samples of a card 600 and 602 that may appear in such a format, such as for the screen of an IPHONE 4. The card preferably occupies the entire screen for this type of screen size. Note, by way of non-limiting example, that cards 600 and 602 utilize a common layout and common buttons, but completely different artistic renderings of the various fields 102-108.

The website may also add a global header or footer with information and/or buttons that are not card specific. Non-limiting examples include a Register button, a Login button, a Logout button, a card rolodex function button, add/remove from card rolodex function button, and a send user's card to owner of card show function button.

A smaller available screen size for a different device may require the card to be displayed differently than other environments. For example, many keyboard-based phones have smaller display screens. To accommodate this, the entire card may be shrunk, cropped and/or partially visible (such that hidden portions would need to be scrolled to).

Figure 7A:
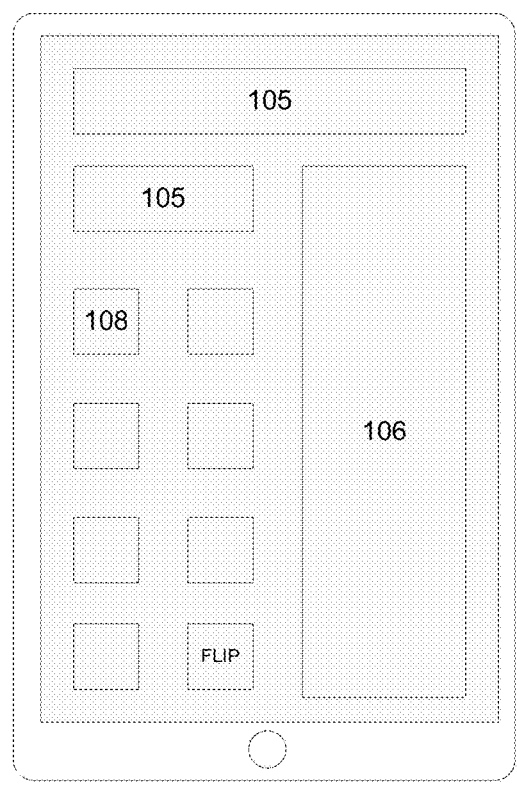
FIG. 7A show a single card view with eight buttons in FIG. 7A separated into two separate button views in FIGS. 7B and 7C.
Figure 7B:
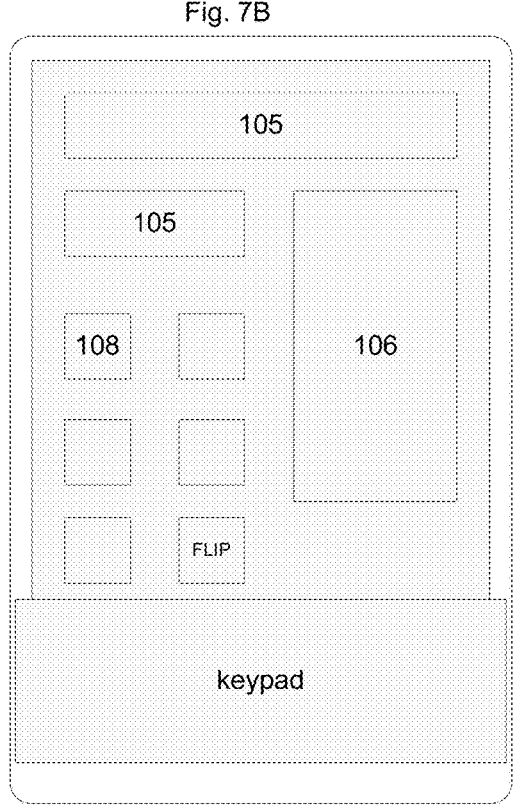
Figure 7C:
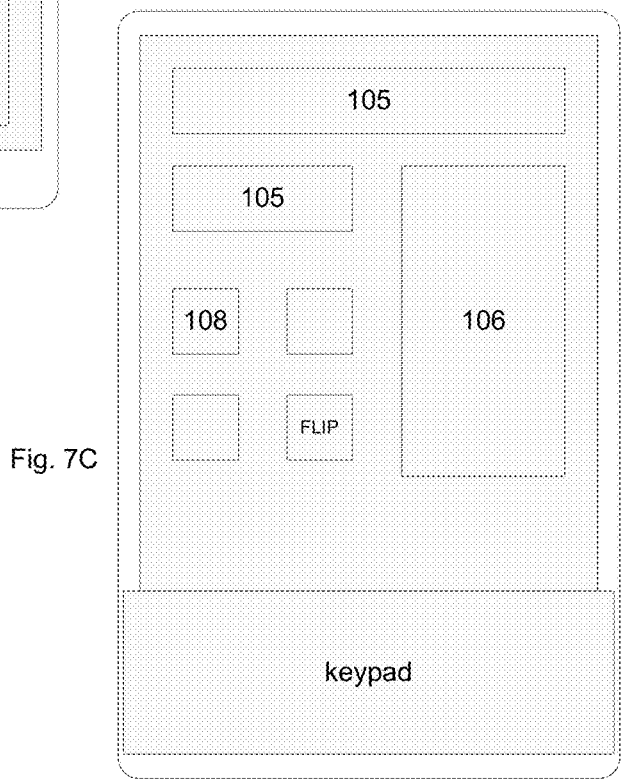

As an alternative, the website may organize the contents of the card into a different format and/or layout that is appropriate for the smaller size. By way of example, the website may crop the picture and reduce the number of buttons, such as from eight (8) buttons to six (6). One of the six buttons would have NEXT and/or BACK functionality, which would change the displayed button configurations and require (at least) a second button view. FIGS. 7A-C compare how a single card view with eight buttons in FIG. 7A would be separated into two separate button views in FIGS. 7B and 7C with ten buttons (the original eight plus two FLIP™ buttons to navigate between views).

As discussed above, various buttons have data and/or links associated therewith that the device can display based on activation of the button. For display screens at the mobile phone size, it is preferred that activation of such a button produces content in a window that either is layered on top of, or replaces, the display of the card.

Figure 8:
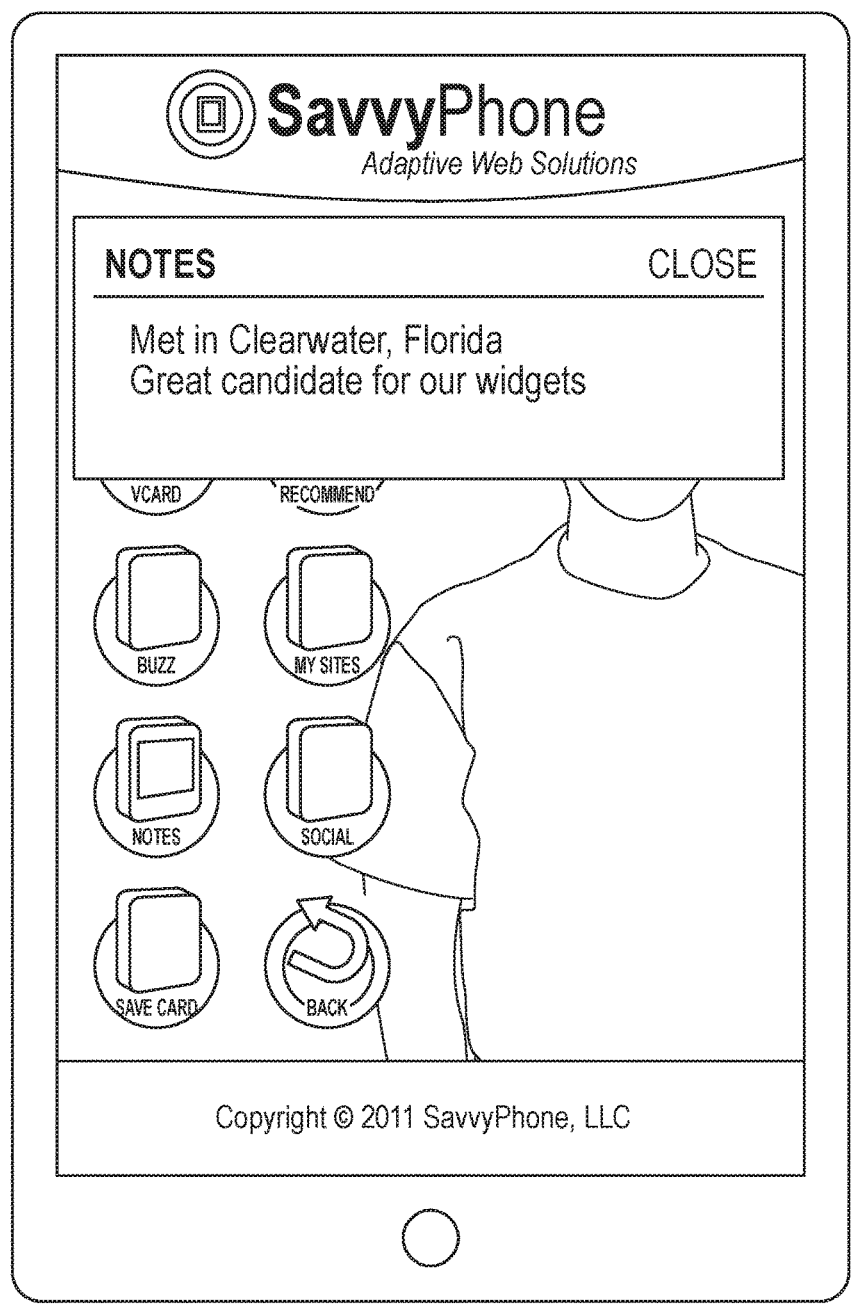
FIG. 8 shows a card including a "notes" button which opens a notes window.

For example, suppose that a user had associated a "notes" button of a card with a text description. (Notes can be personal to the user but not the cardholder or other users, akin to the user receiving a business card and writing something on their copy of the card; the website and/or platform saves the notes in association with that user's access of the card such that the notes are available when the user accesses the card in the future.) An embodiment of card 600 includes a "notes" button in a second button view of card 600, shown for example in FIG. 8. Pressing the "notes" button on card 600 would open a text window that overlaid onto the card 600 within the display window of the mobile phone. FIG. 8 shows such a display option for an IPHONE 4, although the actual location of the window may be other than as shown (e.g., below the name so the name remains visible). If the information is longer than the available display, then it may only be partially displayed and accessed via scrolling, or it may be separated into two different pages accessible via next/back buttons. In another option, a separate browser window may open, and the position of the card and the other window may be automatically or manually adjusted to enable partial view of each.

By way of another example, if the button is associated with a link (such as a video), then the device's web browser would proceed to that link using its existing protocols. Preferably, a new window is opened to view the materials called for by the link. However, based on platform and/or user preference, the new webpage may supersede the card, such that the user would have to use the back feature of the web browser or reenter the card URL to return to the card.

For a larger available screen size for a different device, such as a PC or laptop, the website may prepare the visual aspects differently to leverage the larger screen size (at least as compared to mobile devices). The website may recognize the device source as a PC and/or with a particular operating system based on either identification information sent from the device when requesting the card, and/or the absence of such information (as PC's and laptops may not provide such information, the absence of which enables the website to potentially determine that the source device is a PC or laptop).

Figure 9:
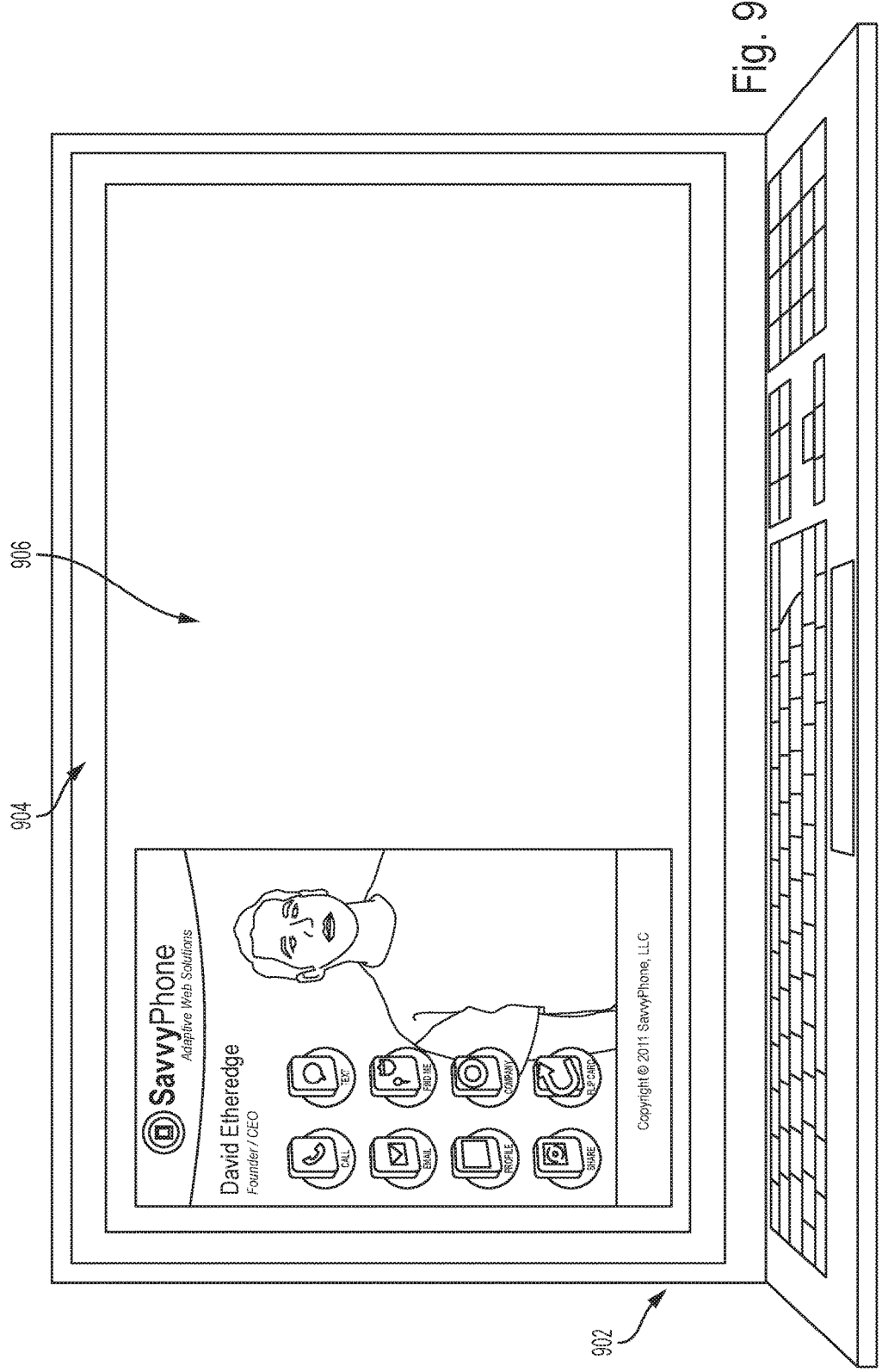
FIG. 9 shows an example display of a card on a laptop computer.

The website accordingly prepares the card as a webpage for the larger display consistent with the larger display platform. For example, the card 600 may occupy only a portion of the display, preferably approximately half of the display. FIG. 9 shows how card 600 may appear on a display 904 for a laptop 902. Toolbars and controls for the web browser may or may not appear at the top of display 904 based on user, system and/or web browser preferences. (The web browser is omitted in the figures for conservation of space purposes.)

Figure 10:
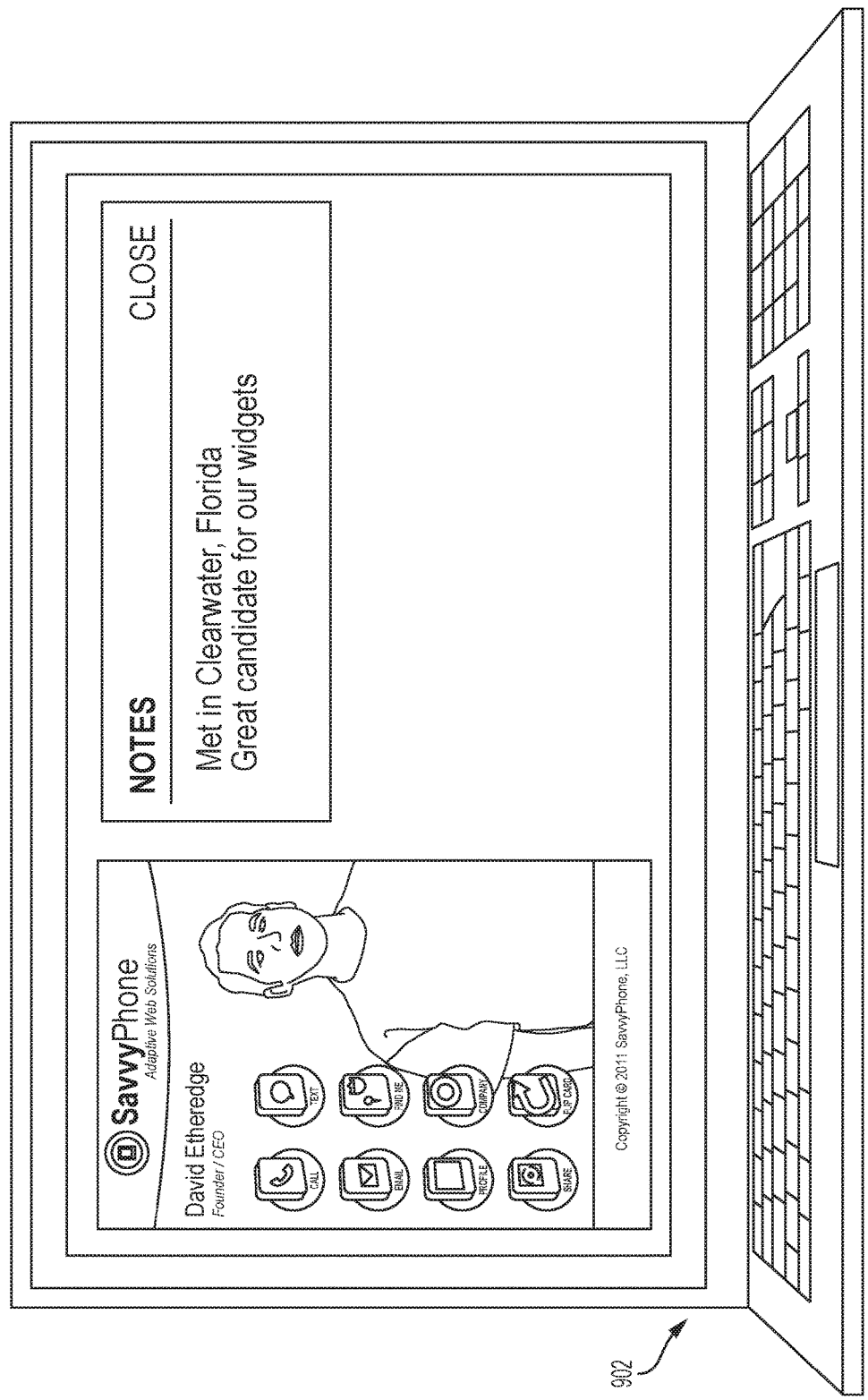
FIG. 10 shows an example display of notes information in the otherwise vacant area of the display of FIG. 9.

Activating one of the buttons on the card may, based on the nature of the button, cause content related to that button to display. Unlike the smaller screens in which the content was displayed to overlay and/or replace the card, the website provides the content in a manner that can be displayed separately on the remaining area of display 904. By way of non-limiting example, clicking on the "Notes" button in the card 600 (second button view as in FIG. 8) causes the display of notes information in the otherwise vacant area of the display 904 (hereinafter card content area 906), such as shown in FIG. 10.

Figure 18:
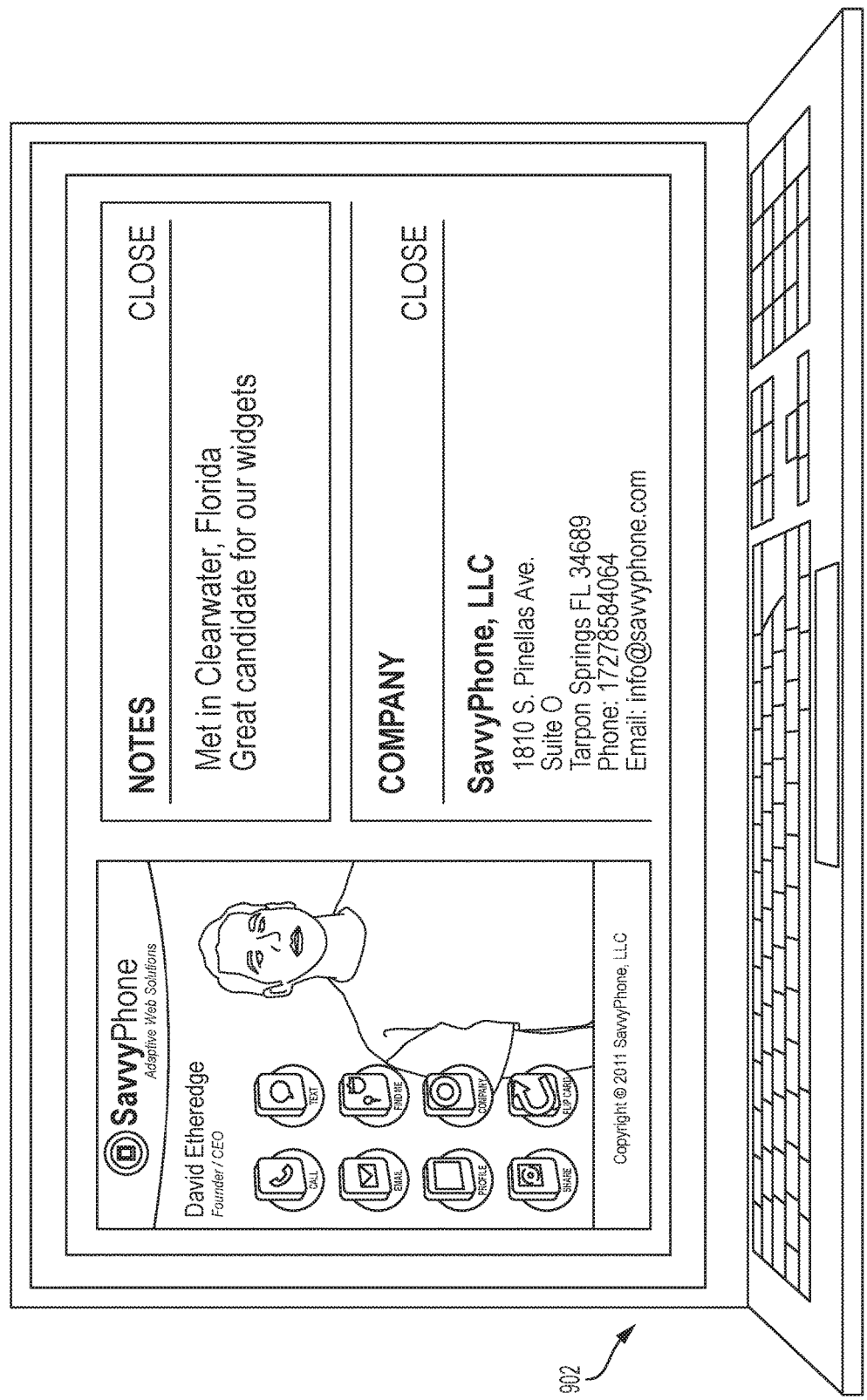
FIG. 18 shows an example of a content of card content area which changes when new content is called for by a different button.

Card content area 906 may populate in response to the pressing of a button that calls for content. In the alternative, the website may automatically populate card content area 906 with content, where such content comes from, e.g., the first listed button, the highest listed button that has content, a designated button during card creation, etc. Preferably, the content of card content area 906 changes when new content is called for by a different button, although content may instead add to the content that is already present, also card content area 906 may comprise sub-areas, each of which may contain the same or different content in response to pressing buttons. An example of this is shown in FIG. 18, where the user depresses the "Notes" button followed by the "Company" button.

Figure 12:
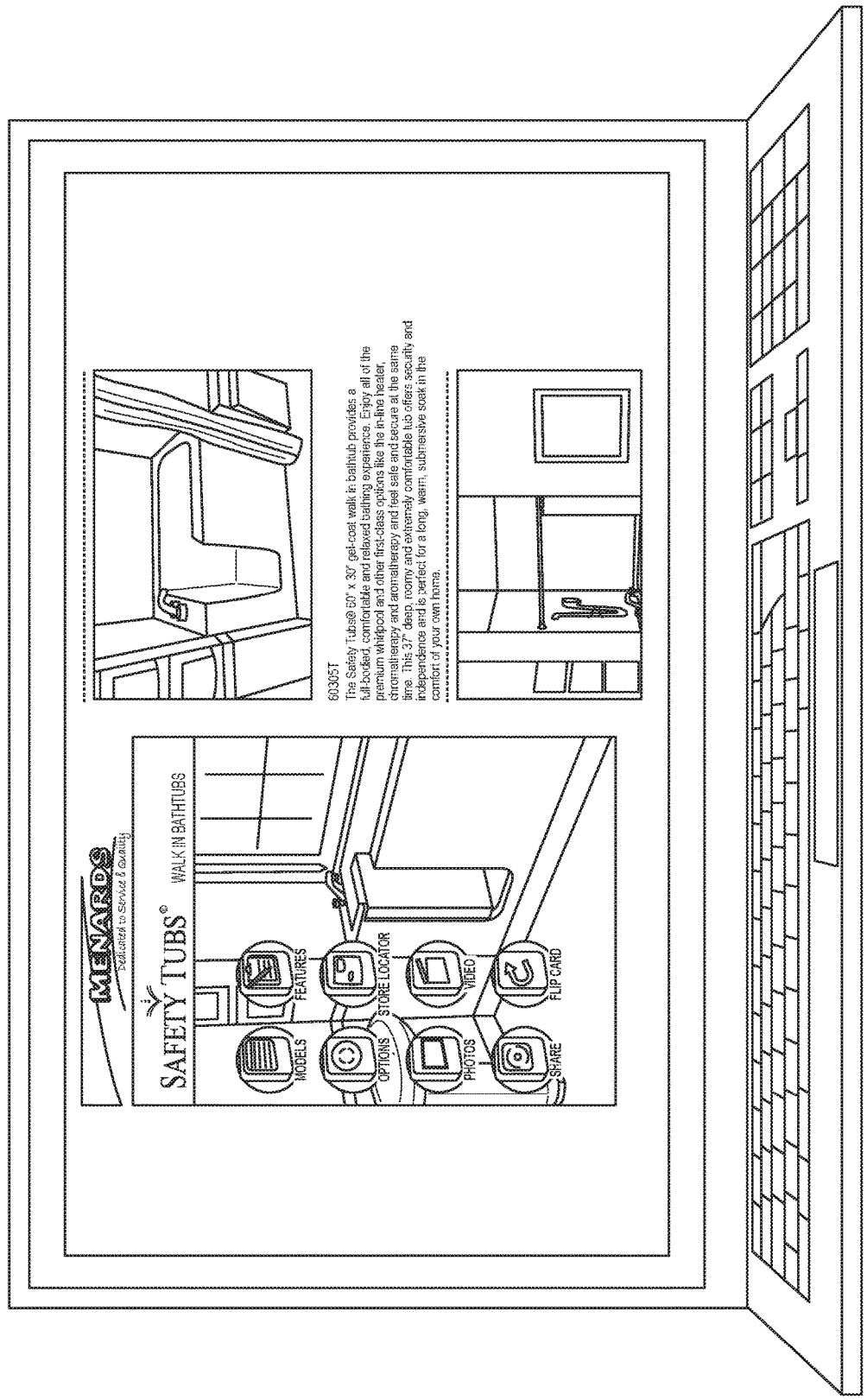
FIG. 12 shows a card in which content has been scrolled relative to its position in FIG. 11.

If the contents associated with the button are larger than the part of card content area 906 (which may be all or part of the area) provided for it, then preferably only the content that fits is displayed in the available part of card content area 906. The user can scroll down on the screen to access the remaining content. Preferably, only the content portion scrolls while card 600 remains fixed in its location. This can be seen in FIGS. 11 and 12, in which the content has been scrolled in FIG. 12 relative to the position in FIG. 11, but the card 1100 has not moved. Applicants note that, whereas card 600 was a business card (e.g., based on the "Personal-Business" template), card 1100 is a product card (e.g., based on the "Product" template).

If the contents of a button are associated with a link, then content associated with the link can be displayed in either card content area 906, or a new window. By way of non-limiting example, pressing the "Video" button in FIG. 11 or 12 opens a video display in card content area 906, possibly for display of a YOUTUBE file. In the alternative, a new browser window to YOUTUBE may open to the desired file.

Figure 13:
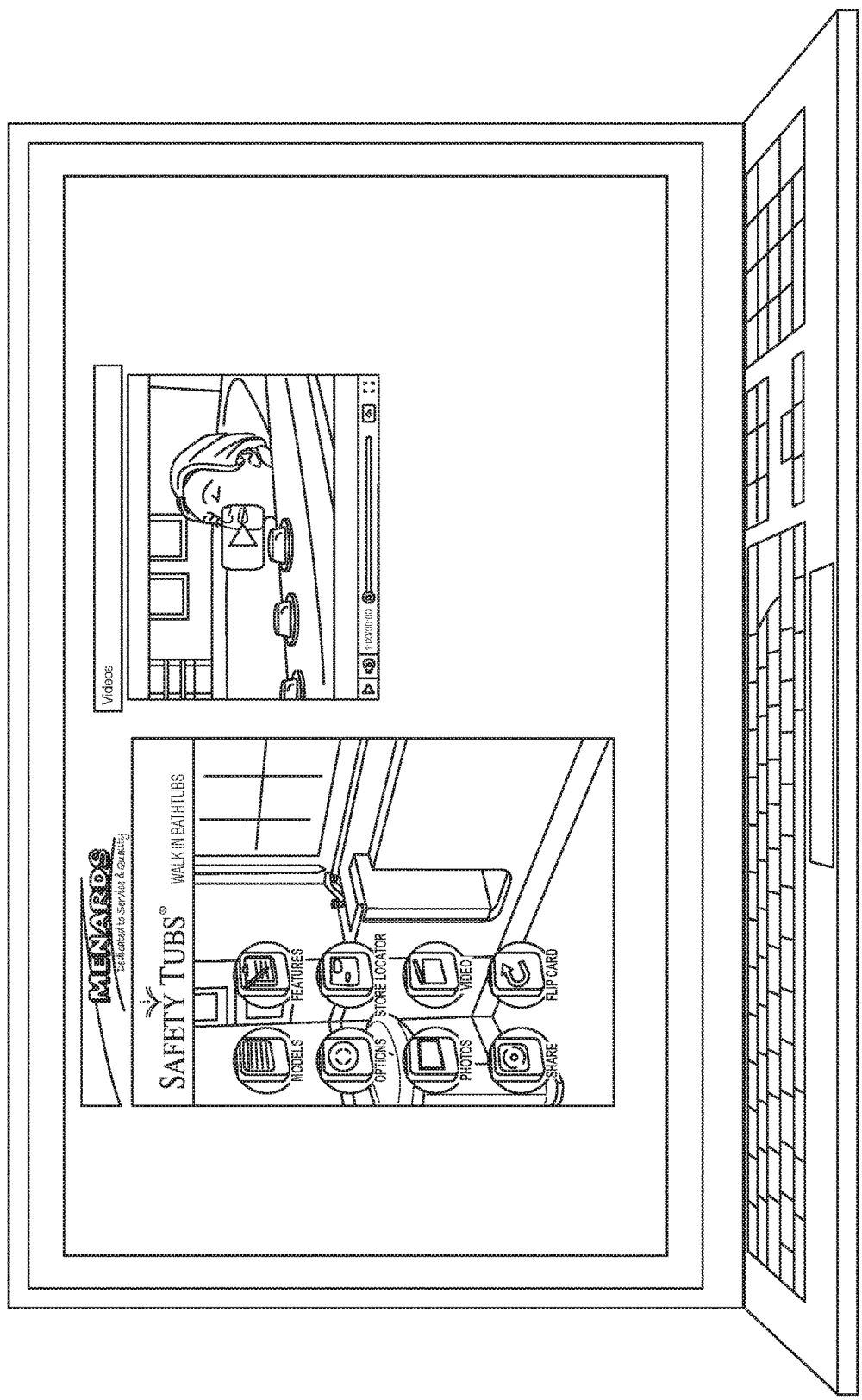
FIG. 13 shows another button view of a card.
Figure 14:
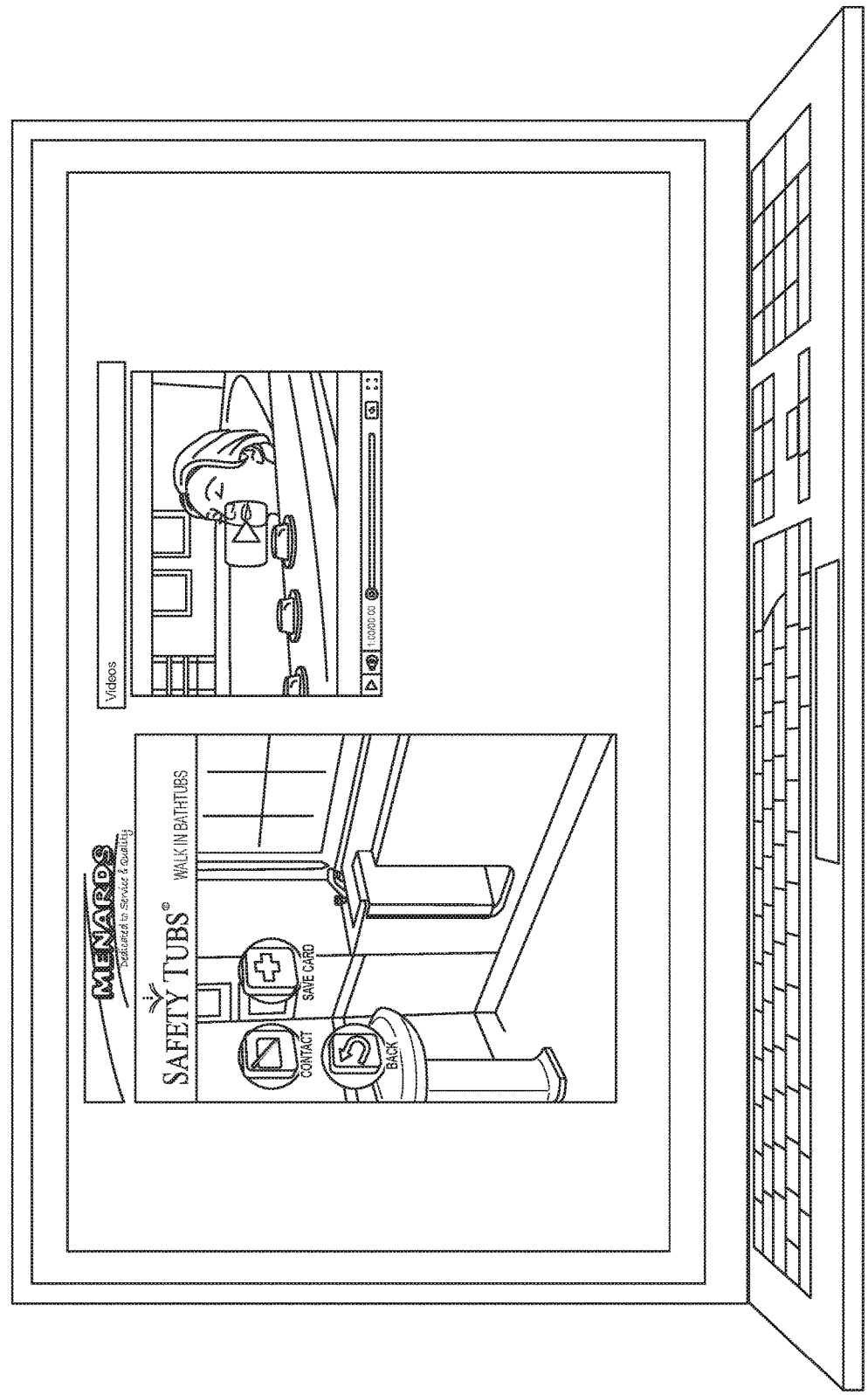
FIG. 14 shows the display after the FLIP™ button in the card shown in FIG. 13 is pressed.

In an embodiment of the disclosure, card and/or button views can be changed via the FLIP™ button. Preferably, the view changes without affecting any content within card content area 906. By way of non-limiting example, FIG. 14 shows the display 904 after the FLIP™ button in card 1100 of FIG. 13 is pressed. Note that in FIG. 13 the button view has changed to the next set of buttons, but the card contents area 906 remain unchanged. However, the disclosure is not so limited, and the card content area 906 may go blank or change to different content.

The website's organization of the visual content of the card for the platform of the requesting device is preferably based on a website maintained database of preexisting platforms in correlation with the layouts of cards. For example, once the website determines the platform, there may be a website maintained index that provides instructions as to where to place the various fields 102-108 in the card for that platform. The website may organize the card for the requesting platform based on the instructions as contained in the database.

Creating cards in this manner may provide a degree of temporal security against a movement away from older platforms and/or a progression to newer ones. Once a device and/or operating system is supported, it may remain in database memory and may continue to be accessed by that device and/or operating system. By way of example, if the database contains the necessary information to support INTERNET EXPLORER 6, then it may be able to continue to provide cards for systems that use INTERNET EXPLORER 6 as the web browser, even though most web sites may no longer operate in conjunction with that browser. Similarly, as new platforms are introduced by the manufacturing sector, the database of the website can be updated with appropriate protocols to provide cards for those newer environments.

Figure 15:
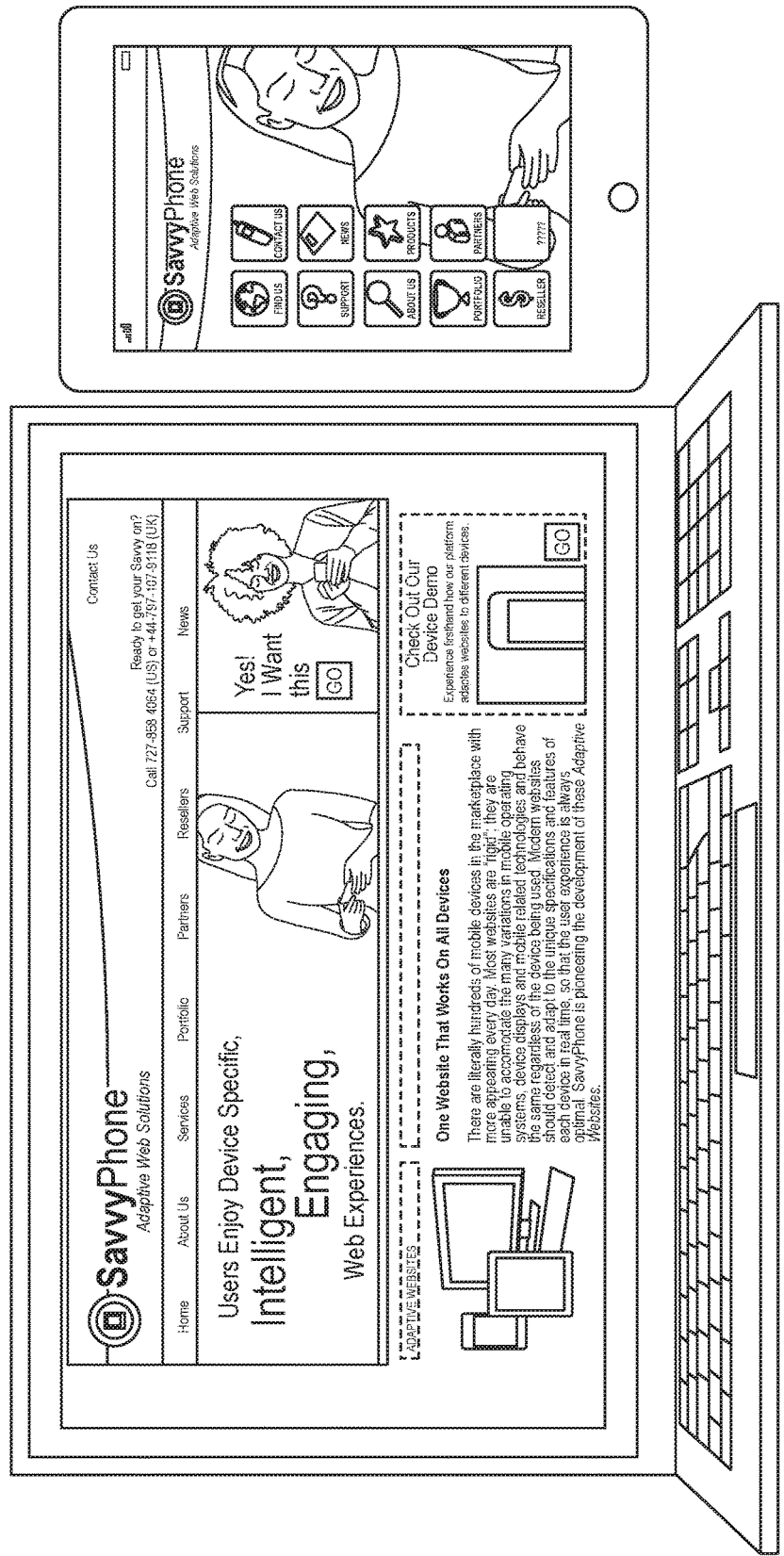
FIG. 15 shows an example of a card organized to present the card contents differently on a laptop and a mobile phone.

In another embodiment of the disclosure, cards 600 and/or 1100 are limited for use on devices that have small screens consistent with the size of business cards and/or mobile phones (e.g., less than about 4" on its longest edge). For devices with larger screens such as PCs and laptops, the website can organize the card to present the card contents is an entirely different visual environment. FIG. 15 shows an example of this on a laptop and a mobile phone. In both cases, the URL to obtain the card and the URL used by the browser are the same, but, as can be seen, the layout of content is quite different.

Another type of device that embodiments of the disclosure may cooperate with is a tablet device, such as the IPAD. The method for use with a tablet is the same as with any device and/or operating system as above. Preferably, this is a class of supported device, and the nature of the display and platform is stored in databases accessible to the website that provide instructions for visual and functional organization of the website. There may be default settings for the same as established by the website and/or the user. By way of non-limiting example, a tablet with a 10" screen may be considered akin to a PC screen size, whereas a tablet with a 7" screen may be considered akin to the mobile phone size.

Notwithstanding default settings for how a card and related content would visual appear on a particular platform, the website and/or the user may select to override such functionality. For example, card 600 in FIG. 9 may display in a manner consistent with FIG. 6A and FIG. 8, and thus not leverage unused portions of the display 904. Hybrid combinations may also be used, in which some button, content, or combination thereof appear in the open display space of 904, over the card 600, or some combination thereof.

As can be seen by the above, the presentation of the card on the display device can be at least partially dependent upon the nature of the device, and particularly its screen size. The website organizes certain visual aspects of the card and/or associated content in response thereto. In this manner the card itself, to the extent that it is a microsite, is at least partially dynamic in its visual organization. Moreover, the identifier/URL used for the card is common to all web browsers.

There are a variety of methods by which the website may provide a dynamic card in the manner discussed above. One possible method is that the website creates the card "on the fly" based on the stored card information and the platform of the requested device. Another possible method is that the website preemptively prepares all or part of the card for different environments after the card is initially created. Another possible method is a combination of the two preceding methods, in that some aspects of the card may be established in advance and the remainder are established on the fly. Still another possible method is that the user may identify common devices that they use, and the cards would be created for those devices in advance and created on the fly for other devices.

Functional Level Adaptive Options

Cards 600 or 1100 are also at least partially dynamic in functionality based upon the device and/or operating system that the device supports. Functionality includes, for example, interaction functions and button related functions. Interaction functions relate to how to press the buttons on the card, such as via mouse click, touch screen, and/or keypad links.

Button related functions generally refer to the functions pressing a button initiates. As noted above, different devices may utilize different protocols and/or methodologies to implement different functions that might be called for by the buttons. By way of non-limiting example, the manner in which a PC may make a phone call (if it even can) may be quite different from a mobile phone. Accordingly, based on the nature of the requesting platform, the website may, where necessary, associate with the card functionality that is specific to and/or compatible with the requesting platform and include that functionality with the card.

By way of example, card 600 as shown in FIGS. 6A and 9 are visually the same, and both contain the "Call" button. Yet they are displayed on different platforms—a mobile phone v. laptop—that make calls differently. For a mobile phone, pressing the "Call" button would cause the mobile phone to take the phone number (obtained as discussed below) and place a call to that number (although there may be an intermediate step of the user pressing a dial button). For a laptop, pressing the button may lead to accessing a resident program such as SKYPE or FACETIME.

Accordingly, when the website recognizes the specific device and/or operating system, it not only sends the "Call" button as part of the card to display, but also sends along the functionality, protocol and/or method to effectuate that function on that specific device. (This is most likely software and/or other electronic information designed to operate in conjunction with the phone's computer hardware that is compatible and/or appropriate for that specific mobile phone.)

For example, for card 600 on the laptop in FIG. 9, the website sends the functionality to use the call button to access an Internet phone program that is available on the laptop, such as SKYPE™ or FACETIME™, with the card. The website need not (and preferably does not) send along the functionality for a mobile phone to make a call, as the laptop has no need for such functionality. Similarly, for card 600 on a mobile phone in FIG. 6A, the website sends the functionality to use the call button to access the mobile phone's hardware installed phone function with the card. The website does not need to send along the Internet phone functionality as the mobile phone has no need for it (although it may be desirable if the mobile phone user uses an Internet phone program, and may be set accordingly).

Thus, in the above embodiment, the same URL can provide the same visual card 600 on different devices. Yet the functionality of those cards differs based on the different devices.

By way of another non-limiting example, consider a promotional card for a recording artist that has a "Buy Music" button that enables a user to purchase music. For an IPHONE platform, the functionality sent down by the website associated with the "Buy Music" button may be for ITUNES, such that pressing this button opens an ITUNES window. However, for an ANDROID product (which has limited compatibility with ITUNES), the functionality sent down by the website may be for an ANDROID compatible music store. In both cases, the underlying card would be visually the same on the devices, but the buttons have different functions and yield different results.

Not every function is different. In such cases, common buttons on cards as displayed on different devices may operate in the same manner and yield the same results.

As can be seen by the above, the functionality of the card on the display device is at least partially dependent upon the platform. The website, by determining the nature of the platform, determines what functionality is needed to effectuate the functions on that platform, and associates the functionality with the buttons as prepared for the device's platform. In this manner, the card itself, to the extent that it is a microsite, is at least partially dynamic in its organization. Moreover, the identifier/URL is common to all web browsers, and unlike the prior art which relies upon discrete webpages and for different devices.

In some cases, the available information does not provide a specific aspect of the platform. The website may, in those situations, provide instructions for multiple aspects of the platform. For example, a system may not identify the specific web browser that the user is using on the device. Using the "Save card" button may be problematic because the system may not know which browser to log a bookmark in. The website may thus provide the card with a displayable option field that identifies various supported browsers; the user selects the desired browser, and the save functionality is implemented relative thereto.

For changing button and/or card views, the FLIP™ function may request the next view from the website. In the alternative, the next view may already have been downloaded (either with the card in original view or thereafter) and can be retrieved locally.

There are a variety of methods by which the website may provide a dynamic card in the manner discussed above. One possible method is that the website creates the card "on the fly" based on the stored card information and the nature of the requested device. Another possible method is that the website preemptively prepares all or part of the card for different environments after the card is created. Another possible method is a combination of the two preceding methods, in that some aspects of the card may be established in advance and the remainder are established on the fly. Still another possible method is that the user may identify the devices that they use, and the cards are created for those devices in advance and created on the fly for other devices.

The website's organization of the functional content of the card and/or buttons for a card for the platform of the requesting device is preferably based on a database of preexisting platforms in correlation with the layouts of cards. For example, once the website determines the platform, there may be an index that includes that device and/or operating system along with instructions as to what functionality is needed to effectuate buttons that may be used in that platform. The website accordingly organizes the functionality for the card for the requesting platform based on the instructions as contained in the database.

The functionality may be sent along with the card, and thus resident on the mobile device when the user presses any particular button. In the alternative, pressing the button can cause the device to issue a request for the functionality from the website. The former is preferred to avoid delay, but the latter may nonetheless be used.

Data

A card may be thought of as having three categories of components: assets, functionality and data. Assets may generally consist of the visual elements that make up the card. Functionality may generally be thought of as the functions that can be performed by the card. Data may be thought of as the information leveraged by the functionality.

By way of non-limiting example, consider the "Call" button discussed above. The visual appearance and location of the "Call" button on the card may be thought of as an asset. The ability to dial a phone number to place a call when the button is pressed may be thought of as functionality. The actual phone number may be thought of as data.

By way of another non-limiting example, consider the "Photo" button discussed above. The visual appearance and location of that button on the card may be thought of as an asset. The ability to obtain a photo from a link or other identifier when the button is pressed may be thought of as functionality. The actual photo, link or identifier may be thought of as data.

Data associated with a card may be sent along with the card, and thus resident on the mobile device when the user presses any particular button. In the alternative, pressing the button can cause the device to issue a request for the data from the website. The latter of these two is preferred so that the card always has the most current data associated with the card. Specifically, the data is also dynamic in that the user can update and/or change the data of their card, and all persons who have access to that card automatically have access to the most current version of the data when they next access the card.

Disseminating a Card

An underlying premise of the card system may be to disseminate the cards, although the nature and method of dissemination may differ based on the nature of the card.

At a physical level, a card may be shared in a variety of ways. The first is by simple transfer in that one person may provide the URL/identifier of a card to another person by any known means of communication. For example, one person may simply give and/or send the URL to another person. In another example, a company may place the URL or other identifier (such as a QR code) on a product or literature that may be entered by a user (e.g., by scanning or typing) into an appropriate electronic device.

The card itself may provide a sharing function. As discussed above, one of the button fields 108 may be a "Share" button. Pressing this button may open a field in which the user may enter information, such as their name and the email or text address of the person that they want to share with. Submitting this information may cause a communication to be sent directly to the target email or phone with the URL or other identifiers. In the alternative, it may direct the information to the website for further processing; and the website may in turn send a message to the target email. The email may be different based on whether or not the target person is registered on the website, with a registered person receiving the card and a non-registered person receiving a card and/or an invitation to register with the website. Registration may or may not be needed to access a card, subject to preferences of the website designers.

Another option is for the "Share" button to produce an identifier, such as a QR code, that another person with a mobile device can instantly scan. This can provide the receiver with the card immediately, or may prompt a registration request from the website.

Another option is to exchange cards. Specifically, when a third party card is accessed by a user, a button may be provided for the user to send their card to the third party. Activating the button would add the user's card to the third party's rolodex of cards; in the alternative, activating the button may initiate an invite message to the third party of add the user's card to the third party's rolodex.

Regardless of the method involved, the user may receive and access the card (to the extent allowed by permissions). In some card applications, the user may need to interact with the website to request appropriate permissions.

One useful application of the card sharing method is for product cards. Products in stores often have little information associated with them. By, e.g., providing a product with a QR code, a user may scan the code with their mobile device and pull up the product card on their mobile display. The noted buttons on the product card enable the user to obtain additional information about the product while standing in front of the product at the store. The card can thus be saved or transmitted for view by another person and/or device at a later time.

Another useful application of the card is person-to-person interactions, in which cards can be shared as business cards. Rather than handing over a business card, the user instead provides the identifier through any of the noted methodologies. The recipient can then access the card on their device either instantly, after registration, and/or after permissions have been obtained. The card can then be saved into a person's card directory.

In another embodiment, aspects of the sharing/distribution method can be used in the card setting and/or for certain social network settings. For example, social websites such as FACEBOOK and LINKEDIN require an invitation to join someone's social circle. Such websites may be equipped with an identifier, such as a QR code, that is unique to a particular user. If this identifier were scanned or otherwise entered into a person's device, the receiving device can be programmed to automatically advise the website of the same. The website can respond by prompting an invite between the users to join their social circle (e.g., FACEBOOK can automatically send an invite from one user to the other, or vice-versa). In the alternative, the website can respond by automatically joining the other person into the user's social circle (e.g., FACEBOOK can automatically consider the code to represent an accepted friend request between two users).

Maintaining Decks of Cards

As discussed above, once a person receives a card, they may wish to save the card. If the card is obtained through a URL in a web browser, this can be done simply enough by bookmarking the URL under the existing protocol of the platform. If the protocol enables, the bookmark can be saved onto the home screen of a device, for which an appropriate icon would appear on the home screen.

A more flexible alternative would be to save the card via the "Save card" button, which may have additional functionality beyond simple bookmarking. At a minimum, the "Save card" button would save the URL of the card consistent with the bookmark procedure above (although an independent step to identify the browser may be needed). In addition, the Save card function may save the URL in a specific directory for cards; this directory effectively becomes an electronic rolodex of cards. Still further, the Save card function may automatically sort the cards into separate subdirectories that are specific to the types of cards, e.g., business cards may be in one subfolder, social cards in another, product cards in still another, etc.

If the user is registered with the website, then the Save card function may, in addition to the local save, also save the card in the user's main account on the website. This would enable collection of cards from multiple different sources. The website may store the cards in master and/or sub directories in the same manner as above. The website may also provide and/or make those updated directories accessible from other devices and/or locations.

Figure 20:
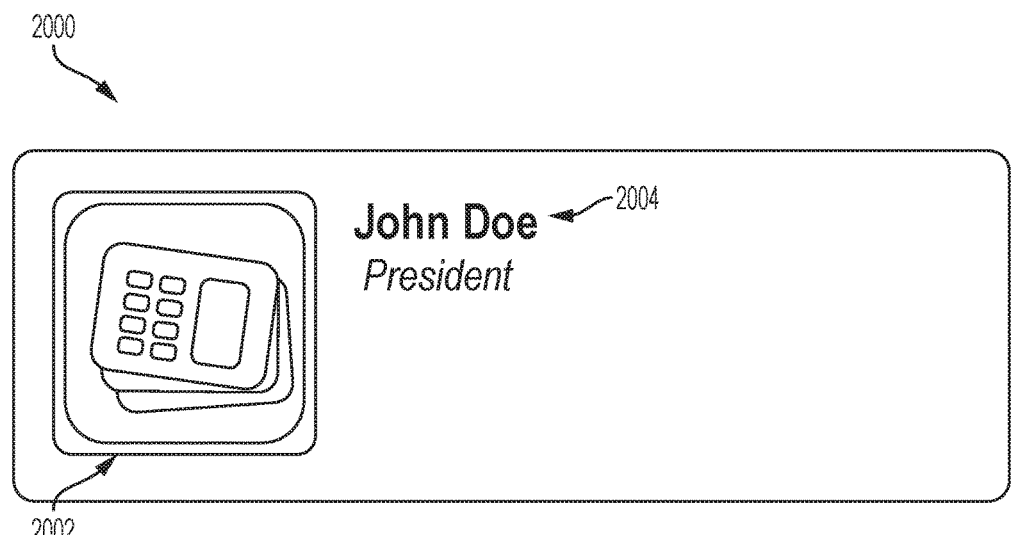
FIG. 20 shows an example mini-card.

Unlike a simple URL directory, the card directory can include data from the card into the directory line that can be viewed in a display of the directory, essentially a mini-card in a rolodex. Preferably the minicard includes a small icon (such as a picture, or the Icon noted above), name and a card description. The user is able to edit the mini card information to change what it displayed and/or add additional information potentially including their industry, their company, their job title, their location (city, state, country) and other info. These fields are dynamic and can be used for different types of information based on the type of card being edited. For example, product cards might include price and SKU number in the mini card instead of the other info. FIG. 20 shows a non-limiting example of a mini-card. FIG. 20 includes the mini-card 2000, which includes an icon area 2002, and a content area 2004. Content area 2004 may display any information that is saved in the system for that particular card. The type of content may be system defined and/or user defined.

Mini-cards can also be tagged with certain custom tags. For example a user may tag a person's card as "client." A subsequent search of the deck of cards for "clients" would yield the tagged mini-card.

Multiple Cards Per Person

A user can create as many cards as they desire and for any range of subjects. These would be associated with the user's account on the website. The deck of cards noted above may include a subdirectory of the user specific cards. When the user wants to view and/or share that card, the user can tap that card in the directory and pull up the card (a process akin to using a bookmark to pull up a webpage).

Card Families

Several cards may fall within a particular family. For example, business cards for a business may fall under the family of that business. Product cards for individual products of a particular manufacturer or a particular store may fall under the family of that manufacturer or store. In this scenario, an authorized administrator of the family group would control at least the look and feel of the family of cards, and/or possibly the content of the cards.

For use of such a family, the administrator may use card creation tool 100 to establish a global template for the family. The global template may have common assets, functionality, and/or data that can be saved and stored for use on individual cards. For example, for family of business cards, the template may include the background and button artwork, and selected button functionality. Most data would tend to be unique, such as a person's phone number, profile, etc.

Individual cards may then be created by either the administrator or specific family members. For example, an employee of a company may access the family template for that company and enter their own data for the same. The company may lock certain assets, functionality and/or data (e.g., layout, background, buttons, company data) but leave certain others open for customization by the user (e.g., photo, name, phone #).

Policing

As with any web based networking system, there is a potential for abuse. Receiving unwanted card solicitations, cards with inappropriate materials, etc. The website can be managed consistent with methods used by other sites such as FACEBOOK to police and curb such abuse.

Applications

The embodiments discussed herein are primary directed toward use of cards of web browsers. However, the disclosure is not so limited. Platform specific applications may be utilized to streamline certain adaptability features.

As discussed above, there are a variety of different templates and corresponding buttons. Below is a non-limiting example of such templates and associated buttons.

Business card:
  Call: Dial or display one or more phone numbers depending on device support for calls.
  Text: Send a text message to the cardholder.
  Email: Send an email to the cardholder.
  Find Me: Display address and map and option to get directions to location (e.g., a fixed address or coordinates, or mobile location of a person)
  Profile: Text based profile of cardholder
  Company/Organization/Group/Firm: Text based profile and address for company
  Share: Share card via email, text, QR code, bump or other mechanisms.
  FLIP CARD: Switches button and/or card views.
  FLIP BACK: Loads previous page of icons/buttons.
  VCARD: Send a VCARD with contact info for the cardholder via email or direct export to an application such as Outlook, Sales Force, etc.
  Recommend: Links to other cards for content recommended by the cardholder.
  SAVVY: Links to articles, blogs and webpages the cardholder recommends.
  My Sites: Links to websites associated with the cardholder.
  Notes: Enables users to store private notes on a card, storage to be either locally and/or at the website.
  Social: Links to cardholder's social media sites, e.g., FACEBOOK, TWITTER.
  Save Card: Device specific manual instructions or automatic addition of bookmark or home page icon linking to current card.

Product card:
  Models: Content page (text, photos)
  Features: Content page (text, photos)
  Options: Content page (text, photos)
  Store Locator Find closest retail location using GPS or input address using general map program (e.g., GOOGLE maps) or a store specific program.
  Contact: Either calls number or sends email based on cardholder preference.
  Coupons/Offers: Display coupon or special offer.
  Warranty: Content page (text, photos).
  Buy: E-commerce/enables purchase of product directly or through third party (PayPal, Amazon, etc.)
  User Manual Content page (text, photos)
  Testimonials: Content page (text, photos)

Sports card:
  Profile: Content page (text, photos).
  Stats: Displays real time stats from source like Stats.com or manually input stats.
  Tickets: Purchase of tickets via e-commerce or info on how/where to buy tickets.
  Team: Link to Team's webpage or card.
  Photos: Photo gallery or embedded links to Flickr or similar third party solution.
  Merch: (Merchandise) Buy merchandise or info on where to buy it.
  Charity: Description for and donate to associated charity or info on how to donate.
  Video: Gallery of thumbnails that link to videos via other third party services via embed codes.
  Awards: Content page (text, photos).
  News: Content page (text, photos).
  Scores: Real time scores from source like Stats.com or manually input scores.
  Fan Mail: Email form for sending fan mail to card holder Band card:
  Listen: Audio library or embedded links to iTunes or similar third party solution.
  Buy Music: Purchase music via third party source or info on where to buy.
  Shows: Calendar of show/tour dates with links to venues.
  Lyrics: Printed song lyrics for selected songs.
  Members: Mini-cards for Band Members with links to their cards.
  News: News feed or blog article posts.
  Label: Profile and Mini-card for Record label with link to card.
  Merch: (Merchandise) Buy merchandise or info on where to buy it.

Video: Gallery of thumbnails that link to videos via other third party services via embed codes.

Real Estate card:
MLS: Information pulled from MLS for this property and/or a link to MLS.
Features: Content page (text, photos).
Directions: Address, Map and directions to property.
Price: Price and related information (mortgage calculator, interest rates).
Virtual Tour Embed code linking to virtual tour of property from third party vendor.
School: Information on local schools
Community: Information on local community.
Contact: Email or call the realtor for the property.

Personal—Employment
Experience: Content page (text, photos).
Awards: Content page (text, photos).
Resume: Displays users resume with options to print or email based on device.
Skills: Content page (text, photos).
Education: Content page (text, photos).
Employment: Content page (text, photos).
Referrals: Content page (text, photos).
Portfolio: Gallery of thumbs linking to photos, audio or video content.
Hire Me: Icon placed on card to indicate cardholder is seeking job. Links to contact form.

MISC:
Send Gift: Enables user to send cardholder a gift & note from specific third party vendors.
Appointment/Set Meeting: Enables user to schedule a meeting or appointment with the cardholder.

The names of the various buttons and/or functions are exemplary only, and other names for similar functions may be used.

Localization

Embodiments of the invention enable cards to appear differently for different languages. Specifically, cards may include text, such as name, title and company, as well as buttons. Embodiments of the invention enable at least some of this information to be presented in a different language.

Figure 21:
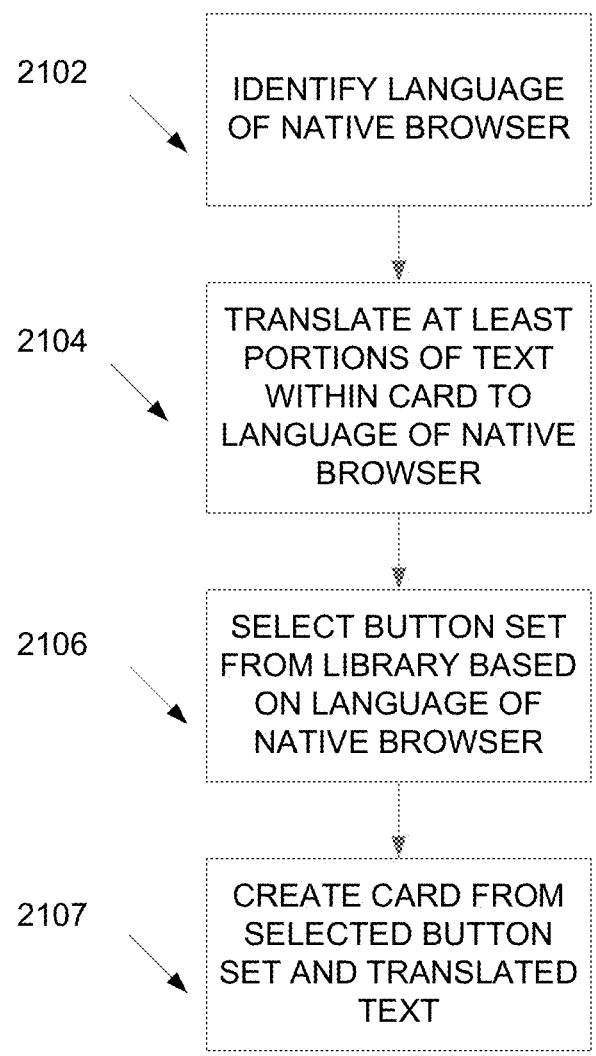
FIG. 21 is a flow chart showing a method for setting a language of a card.

Referring now to FIG. 21, the user's browser may have a default language feature that can identify a particular default language. That information can be forwarded at 2102 to the website, such as when a card is requested or when a user logs in. The invention is not limited to the method by which the browser and the website coordinate to identify the native language of the browser.

The website constructs and dispatch the requested card consistent with the methodologies discussed herein, with the following additional processing. For text files within the card, the website can translate at 2104 the source text into the language specified by the browser. This may be done directly by the website or through some third party translation service. GOOGLE translator is an appropriate translation product for this purpose, although the invention is not limited thereto. Some or all of the text can be translated depending on predefined conditions. For example, a person's name might not be translated, but his or her business title might be. The invention is not limited to what text is translated or left in native form.

With respect to the buttons, while they may have text within them (e.g., the "Call" button has "Call"), buttons tend to be graphic files, not text files. As such, they would not be translated in the same manner as text, such that another method may need to be used. As discussed above, buttons are preferably duplicated in different languages. In this embodiment, the website at 2106 selects the button set that is specific to the language identified by the browser.

In the alternative, text within the buttons or other graphics may be translated by some appropriate method and provided as translated text. In this content, buttons may contain their original format, or a non-text button (graphic only with no textual information) may be used.

At 2107, the website provides the card consistent with the methodologies discussed herein. Text and buttons, to the extent translated, appear in the native format of the browser.

Electronic Signature

As discussed above, embodiments of the invention may provide a mini-card for certain features, such as in a directory. A related use of a mini-card is as an electronic signature, which may be appended to a document or an email. For ease of discussion, this is referred to herein as a signature, although it may be the same as or different from the mini-card discussed above.

Figure 22:
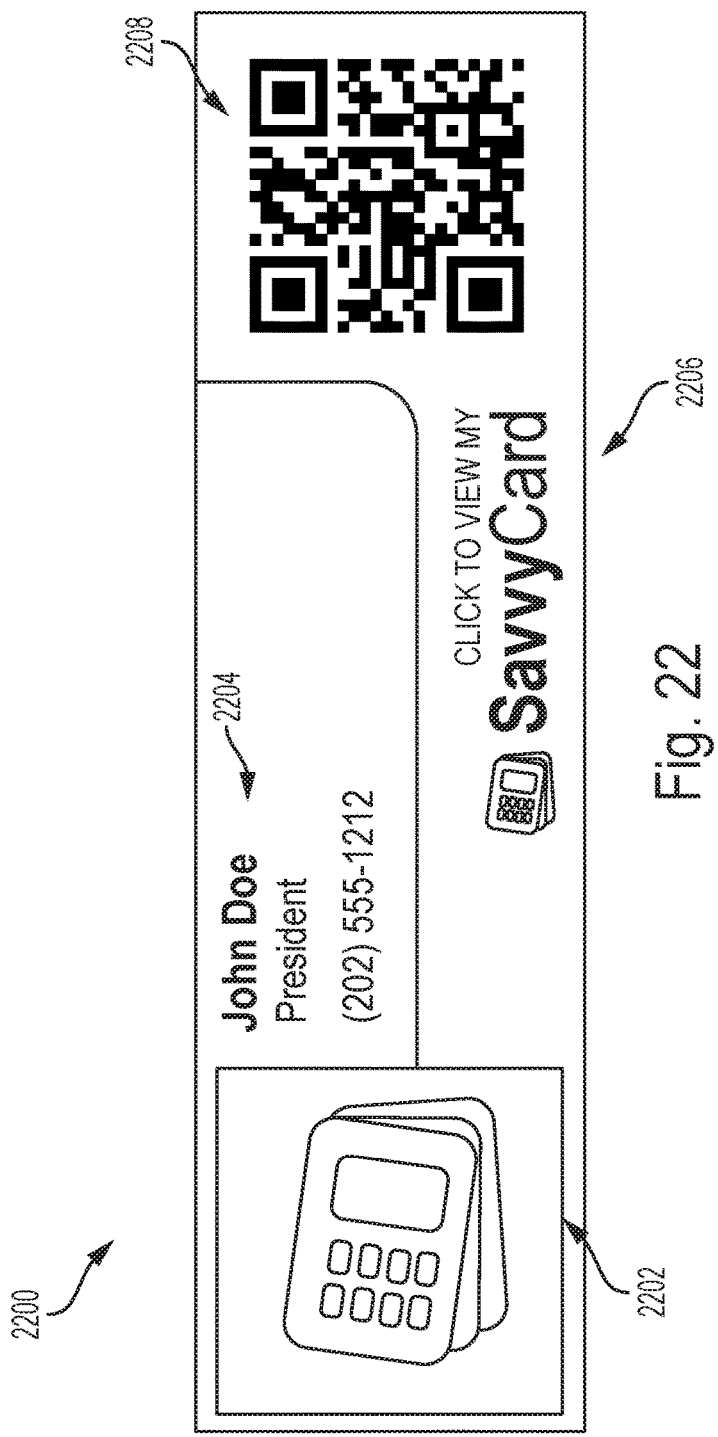
FIG. 22 shows an example use of a mini-card as an electronic signature.

FIG. 22 is a non-limiting example of such a signature 2200. It includes an icon area 2202 and content area 2204. A link 2206 provides a method for direct access of the full underlying card. A QR code area 2208 may also be provided.

Signatures 2200 may be downloaded and stored locally on a user's device, and then inserted into any electronic document or communication. In this manner, the signature can be somewhat akin to a V-Card as used in certain email programs, such as Outlook. However, unlike a V-Card, the information in the signature is dynamic and periodically updated to reflect the most recent information that the user associates with their base card. Such updates may be responsive to a variety of facilitating events, such as a predetermined schedule, when the signature is added to a document, and/or when the user updates the base card. The invention is not limited to any particular facilitating event for signature updates.

Links

As discussed above, cards may be accessed by links (such as QR codes) to the web address of the card. In some embodiments, it may be advantageous for the link to, instead, be the address of an intermediate point. The intermediate point acts as a bridge that redirects the card request to the actual web address of the card.

An example of the benefits of such an environment is for business cards under the control of a corporation. A card is established for Mr. Smith, e.g., the head of public relations, and then Mr. Smith distributes his card. Sometime later, Mr. Smith leaves the company, and Mr. John is hired as the new head of public relation. The company wants future communications for public relations directed to Mr. John, and not Mr. Smith. If the link went directly to the web address of the card, this might be difficult, as new card requests would continue to pull up Mr. Smith's card (if the card was even left active).

The intermediate point provides the company with the ability to redirect the call to Mr. John by changing the web address of the intermediate point from Mr. Smith to Mr. John. A card request for Mr. Smith's (now outdated) business card would go to the intermediate point rather than directly to Mr. Smith's web address. The intermediate point redirects to the card request to Mr. John's web address. As a result, the card request for Mr. Smith produces the card for Mr. John.

Cloned Cards

As discussed above, a user may have a variety of cards. Rather than creating each card from scratch, a user can be provided with a "clone" card option. This would create a new card by duplicating/importing all of the features of another prior designed card. The user can then modify the features of this cloned card without having to start from the beginning of the design process.

Introduce Function

Cards can be shared and exchanged between people consistent with the methodologies discussed herein. The introduce function provides an additional optional feature that enables a third party to facilitate an exchange of cards between two or more people.

Figure 23:
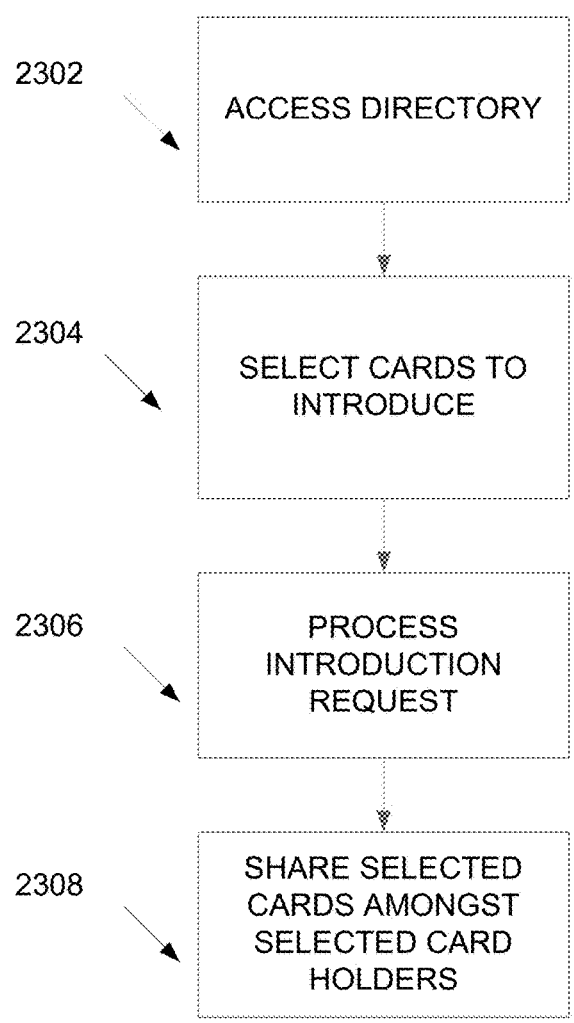
FIG. 23 is a flow chart showing an introduce function that enables a third party to facilitate an exchange of cards between two or more people.

Referring now to FIG. 23, a method for such functionality is shown. At 2302, a user accesses their card directory. This may be done through a specific "introduce" button that may be on the user's card or part of the global buttons associated with the card, or as part of the website. The invention is not limited to any particular method of accessing the directory.

At 2304, the user selects those cards in the card directory that are to be "introduced", and requests the introduction by appropriate interaction with the GUI (e.g., pressing a button).

At 2306, the website processes the introduction requests. At 2308, the website shares the selected cards amongst the selected individuals. This process is akin to the "share" functionality discussed above.

Social Sharing

Cards can be shared and exchanged between people consistent with the methods discussed herein. The Social Sharing function enables a third party to facilitate sharing of cards to one or more existing social networking accounts.

Figure 39:
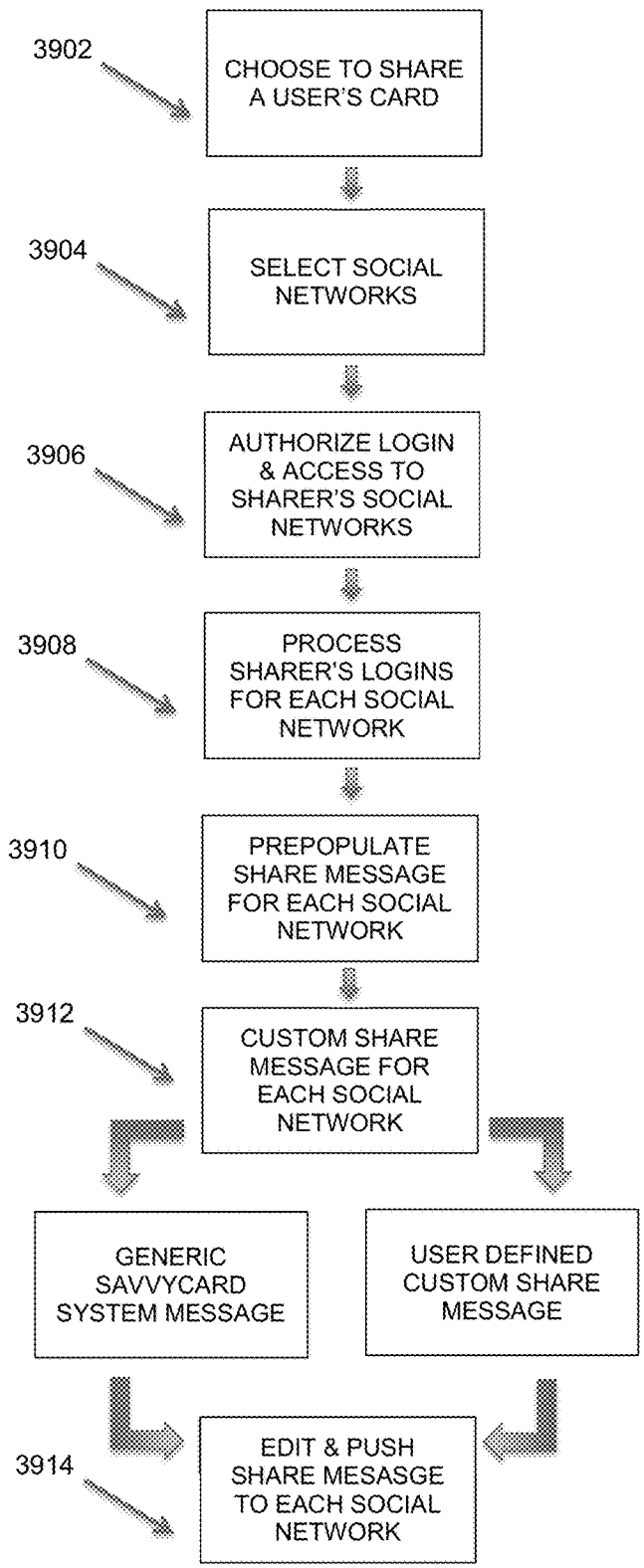
FIG. 39 is a flow chart showing a method for social sharing of cards.

Referring now to FIG. 39, a method for social sharing of cards is shown. At step 3902, a user selects to share a card of any other user. This may be done by selecting a Share button from a user's card or by selecting to share a card from a directory of cards. Disclosed embodiments, however, are not limited to any particular method of selecting to share a card.

At step 3904, the user selects one or more social networks to which the user desires to share the card. The user may choose a single social network, multiple social networks, or as an alternative, the user may share the card to a pre-selected group of social networks, which may be referred to as a Share to All Saved Social Networks function.

At step 3906, the user may be prompted to provide their login information to the selected social networks or to authorize the SavvyCard system to access and post information to the selected social networks both currently and in the future. For each Social Network for which access is authorized by the user, the system may ask the user if they wish to save the login information for that Social Network for future card shares. If the user chooses this option, the user is thereafter able to share cards to all authorized Social Networks using the Share to All Saved Social Networks function.

At step 3908 the website processes the login requests for each social network. At step 3910, the website prepopulates share messages for each social network using generic messages for each supported Social Network that are stored in the SavvyCard system. Alternatively, at step 3912, the user whose card is being shared may have previously defined a custom share message which is used to pre-populate each Social Network share message instead of the generic system message.

At step 3914, the user may edit the prepopulated share message for each social network and authorize the website to share the selected cards and edited share message to each Social Network specified by the user.

Mass Share

A group of SavvyCards (for ease of discussion, hereinafter referred to as a "Deck") can be shared to one or more users through a Mass Share function. The system enables a Deck to be distributed using any of the share mechanisms described in this document and additionally, based on locations defined by the Sharing party and the Recipient.

The Sharing party may define a Deck of cards using the SavvyCard system and use the Mass Share function to define rules for other users to access the Deck. By way of a non-limiting example, such rules may include limiting access to the Deck to specific SavvyCard users, to members of a specific Organization, to users based on their location or a location input by the user or by requiring the input of a password.

A Recipient may locate a Deck by providing the Mass Share system a target location either by giving the system access to the GPS system on their phone or by inputting a zip code, address or other location specific information into the function. Alternatively, the Deck may be located by searching for the name or other identifying characteristics of the Deck. The Mass Share system may display a list of Decks available for the Recipient to access based on the specified search or location based parameters and other rules determined by the Sharing Party.

The Recipient may use the Mass Share system to save some or all of the cards in a selected Deck. By way of a non-limiting example, the cards may be saved by storing them in the Recipient's SavvyCard account, through creating a browser bookmark to the cards, or by saving an icon on the home page of the user's mobile device which links to the cards. For ease of discussion, saving one or more cards from a Deck is referred to as "Collecting" the cards.

Share Analytics

As described above, users may share SavvyCards to other users through a variety of methods including, but not limited to, share by email, share by text messaging, share by QR code, share by Social Media, share by Mass Share, share by directory, or sharing by other means not yet specified.

The SavvyCard system includes Share Analytics functions that track all share activity by any sharing party (for ease of discussion, called the "Sharer") to any Recipient (the person or persons receiving the share), on behalf of any Subject (the person, organization, company, product, service, event or any other object which is the subject of the card being shared). The share activity may also be provided to one or more other parties which have Organizational privileges associated with the card being shared, even if the other party is not directly involved in the share of the card. As a non-limiting example, if the Subject of the card being shared is a member of a company, that company may have Organizational privileges granting the company access to information related to cards of that Subject (i.e., the company). Cards common to a particular subject may have a common identifier or other means of indicating that the cards are associated with the subject (e.g., the company, organization, etc.). A party having organizational privileges may be provided with the share analytics of each card shared by a user who is a member of the organization and/or each card associated with the organization that is shared by any user. A party having organizational privileges may create a summary report of shares made by its members and/or shares of cards associated with the organization. For ease of discussion each of the parties described above are collectively referred to as the "Parties" and a single instance of a share is referred to as a "Referral".

Figure 40:
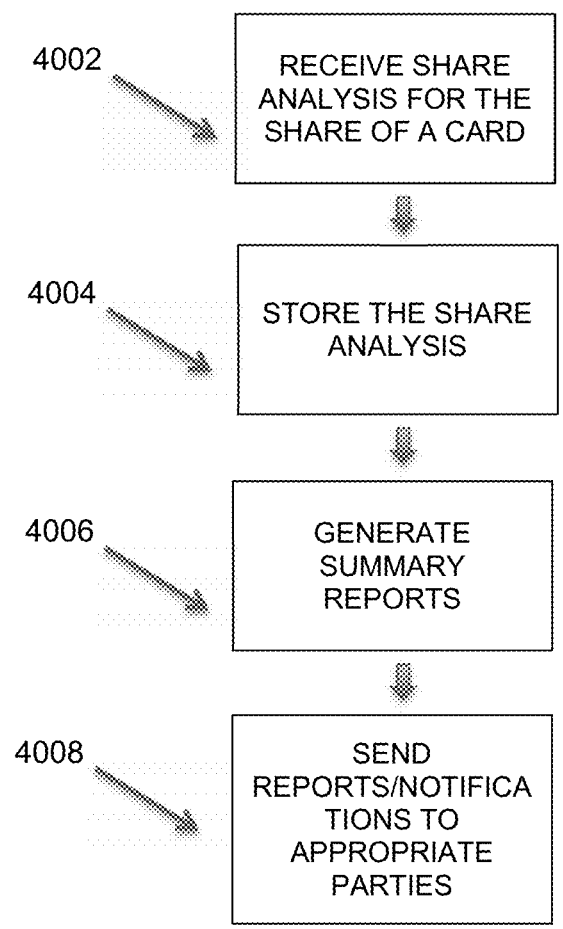
FIG. 40 is a flow chart showing a method for tracking sharing of cards.

The system is configured to track every share or Referral of every card regardless of whether the receiving party or the sharing party has an account or is registered with the system. A share button (or other functionality which enables sharing of the microsite) on the card executes an application included with the card which transmits share analytics information back to the system. FIG. 40 is a flow chart showing a method for tracking sharing of cards. The system receives the share analytics for the shared card as shown in step 4002, and the system stores the share analytics in step 4004. The system generates various reports (described in more detail below) in step 4006. The system provides the share analytics to those parties (discussed above) who are entitled to receive the share analysis information for the particular card in step 4008. The system can generate a summary report of the share analysis information on a card-by-card basis, a user-by-user basis or any on the basis of any other category associated with the cards. For example, the system may generate an analysis report for each card having a desired common identifier.

The Sharer may have the option of whether or not to include its information in the share analytics information. For example, although the sharer may be required to enter the contact information (e.g., email address or phone number) of the recipient in order to share the card through a desired medium to the recipient, the Sharer does not have to enter its own contact information or other details to share the card. Accordingly, the Sharer's information may not be included in the share analytics information received by the system. A name of the Sharing party name, email address, and phone number are thus optionally included in the share analytics information; however, the name, email address or phone number of the sharing party may be automatically input to any share message if the sharing party is logged into the system when sharing the card. A name of the Recipient is likewise optional because the recipient's name may be required to be manually input by sharer; however, the recipient's contact information (phone number, email) may be required in order to share the card as discussed above. The share functionality of the card may include a note option which enables the sharing party to include additional information (e.g., text, files, etc.) with the card when the card is sent the Recipient. A copy of the shared card and/or the share analytics information for the shared card may be automatically sent to a cardholder when the cardholder's card is shared. A copy of the shared card and/or the share analytics information for the shared card may be automatically sent to the sharing party. Each card may be created with an Autoshare function which defaults the system to sharing the contact information of the Recipient of a shared card to the cardholder. A card may include a Recommend button which any party may use to share the card to any other party.

The Share Analytics function preferably includes a Notification component which may communicate to one or more of the Parties, by email, text or other means, that a particular card has been shared. The Sharer may control the information that is shared to each of the Parties, including themselves. By way of a non-limiting example, in addition to a link to the Subject's SavvyCard, the information about the share/referral may include the time and date of the share, the type of medium through which the share took place, the name and contact information of the Recipient or the Sharer, and/or a message provided by the Sharer to the other Parties.

The Share Analytics function may also include a Logging system that stores a record of each share that has taken place for future reference by the Parties. This logging functionality preferably includes all of the information described above in reference to the Notification component and may further include a system for enabling the Subject of the share to notate the quality of the referral as it relates to the Recipient. This notation may include a rating system. By way of a non-limiting example, such ratings may be from 1 to 5 stars, indicating low to high quality. Alternatively, the notation may include a system for denoting whether the share generated a referral that resulted in a qualified lead or a closed sale. In such cases, the Subject is preferably be able to associate a value to each share indicating an estimated or actual monetary value of each referral logged in the Share Analytics system. The Parties may each have access to different Share Analytics log information based on their individual role for each Referral. In addition, users with Organizational privileges, may have access to log information for a large number of other users which are members of that Organization.

Share Analytics functions according to disclosed embodiments are not limited to any particular method of sharing a card either through the SavvyCard system or through third party systems that may be tracked by the SavvyCard system.REAL-TIME CUSTOMER RELATIONSHIP MANAGEMENT (CRM) INTEGRATION The SavvyCard system may be integrated into other third party Contact Management or CRM systems (for example Microsoft Outlook or Sales Force) to automatically update such systems with data from the SavvyCard system in real time. By way of a non-limiting example, a user with SavvyCard integration for MS Outlook may have the option to create new contacts or update old contact information in Outlook with contact information pulled from any SavvyCard. Thereafter, any time a SavvyCard stored in the user's account is updated by the card owner, or the user collects a new SavvyCard, the new contact information is automatically updated in the user's Outlook account.

Organizational Directories/Decks

The SavvyCard system may be used to automatically create a Directory containing cards for some or all members of a particular organization. By way of a non-limiting example, an Organization, such as a Chamber of Commerce, may notate specific SavvyCard users as being Chamber members and automatically use the SavvyCard system to create a Directory or Deck containing cards for some or all of its members. The resulting Organizational Deck may be setup to automatically add or remove cards whenever a SavvyCard user is added or removed from the Organization.

Examples

FIGS. 24-38 and 41 show non-limiting examples of a website implemented according to various embodiments described herein.

Figure 24:
FIG. 24 shows a web page after a user has logged in to a system according to disclosed embodiments.

FIG. 24 shows a web page 2402 after a user has logged in to the SavvyCard system. The web page 2402 includes a global toolbar 2404 for site navigation, which includes a list of the card holder's cards ("my cards"), a search other cards feature ("card finder"), a directory of saved cards ("savvycards"), services that the website can offer ("services"), help ("help"), and account access (John, per the name of the card holder).

Figure 25:
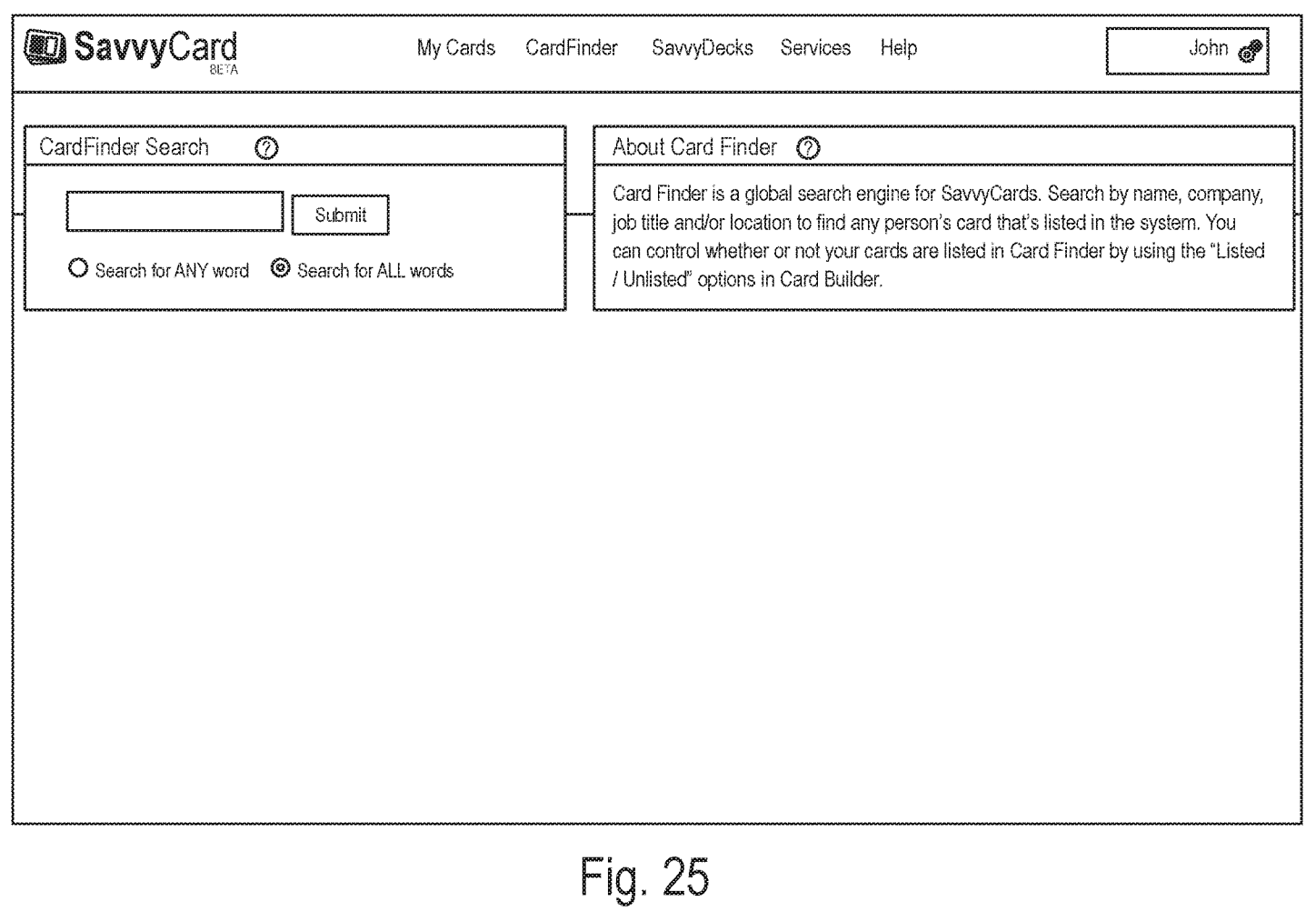
Figure 26:
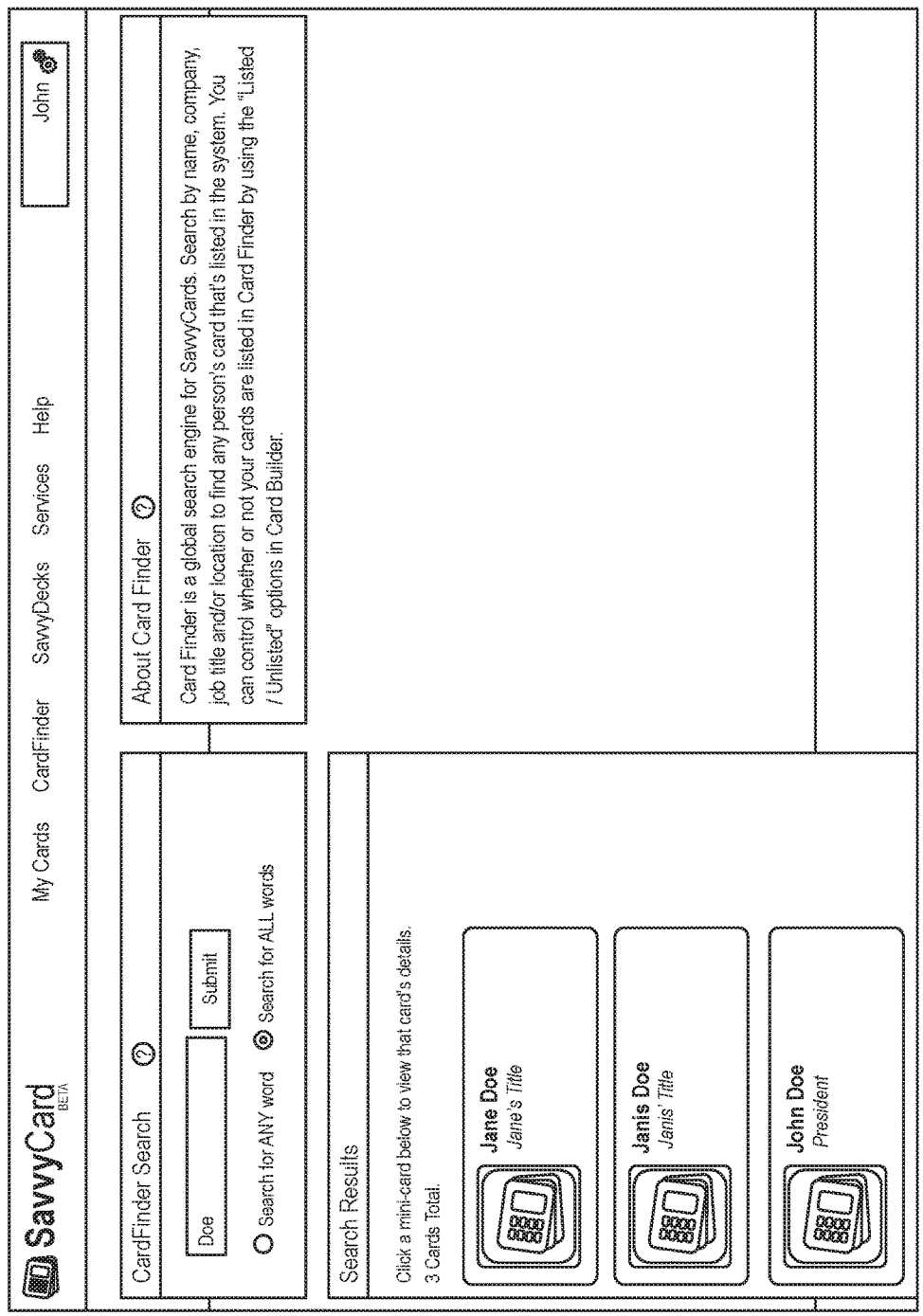
FIG. 26 shows example search results from a card search.
Figure 27:
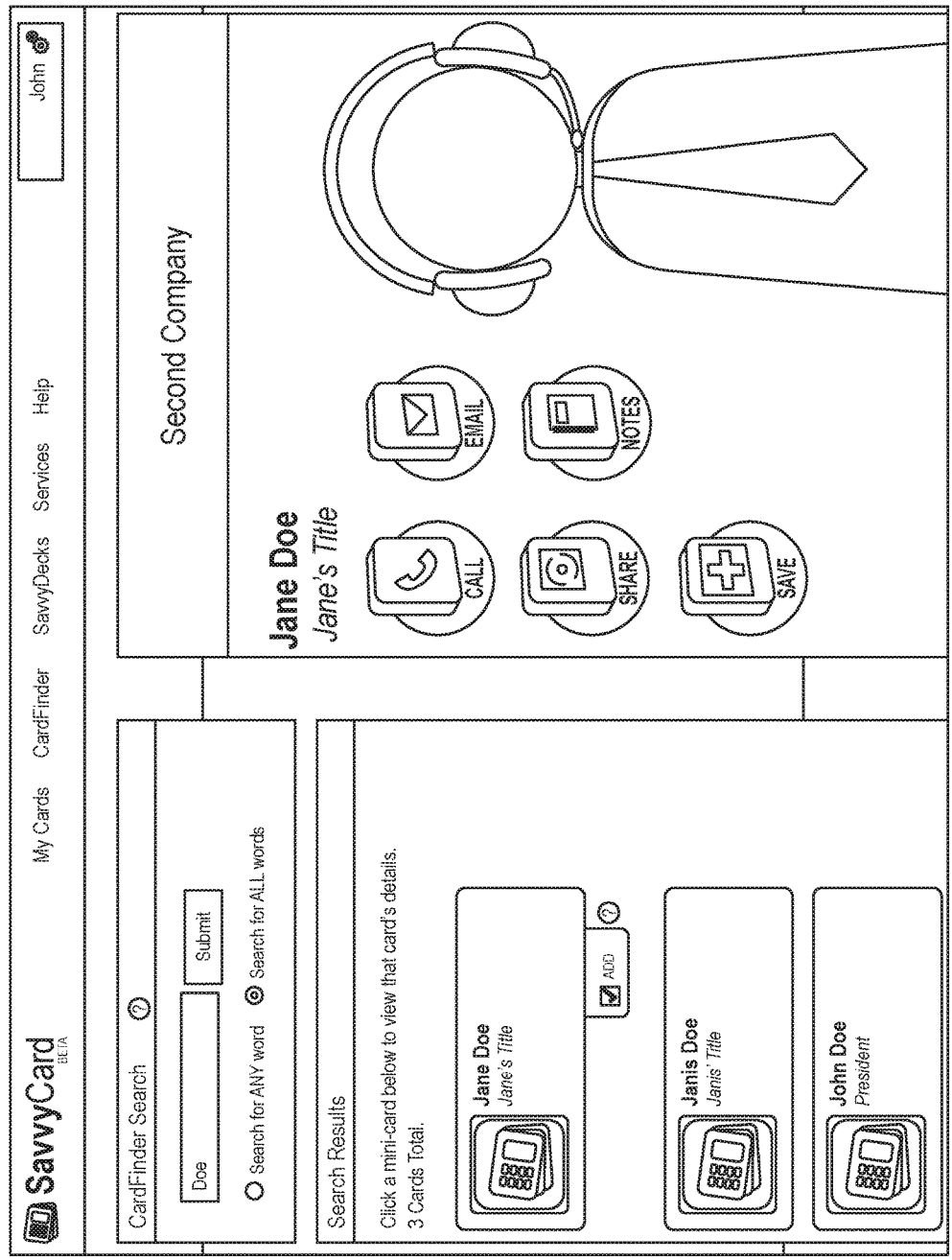
FIG. 27 shows a card for which a user has clicked on in the search results of FIG. 26.

FIG. 25 shows the card search page. FIG. 26 shows search results for the example name "Doe", for which the search results include the three mini-cards for three individuals with the Doe name. As shown in FIG. 27, a user can click on any name in the search results, and the corresponding card and/or an option to add that card to the directory/rolodex appears. Various textual explanations may also appear in the webpage to explain the noted functionality or features of the card.

Figure 28:
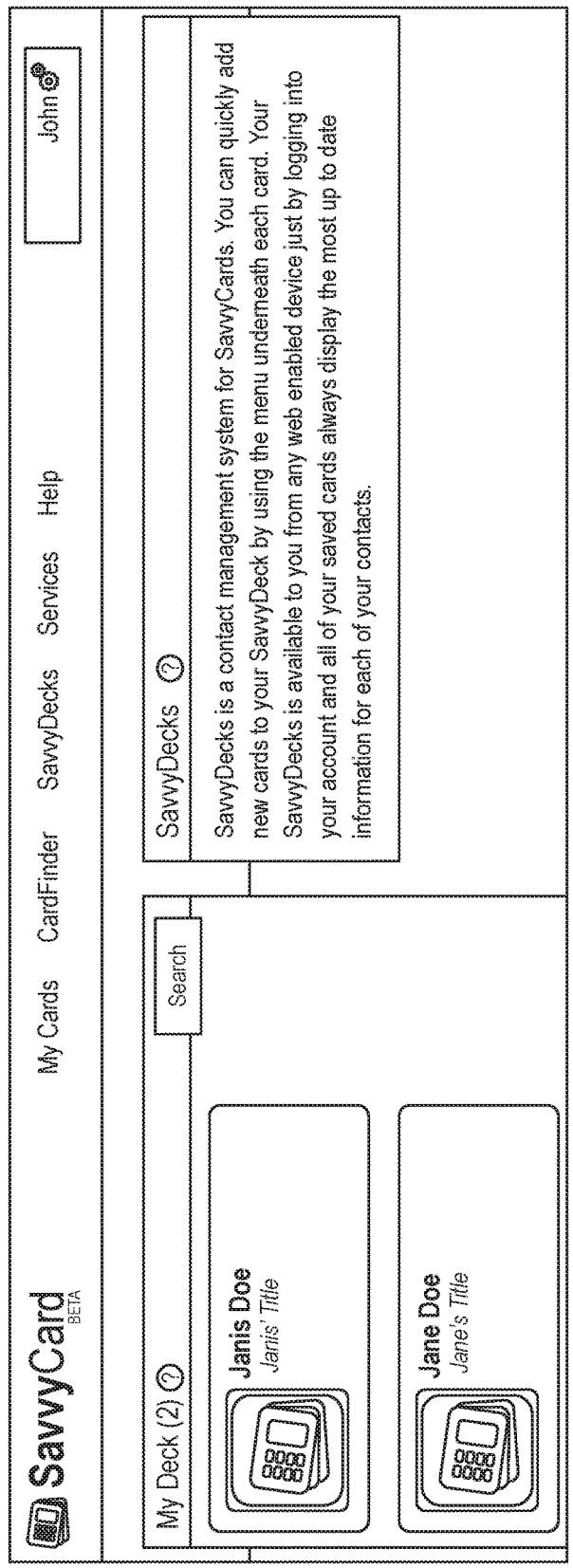
FIG. 28 shows an example directory page in which cards that a user has previously added appear.
Figure 29:
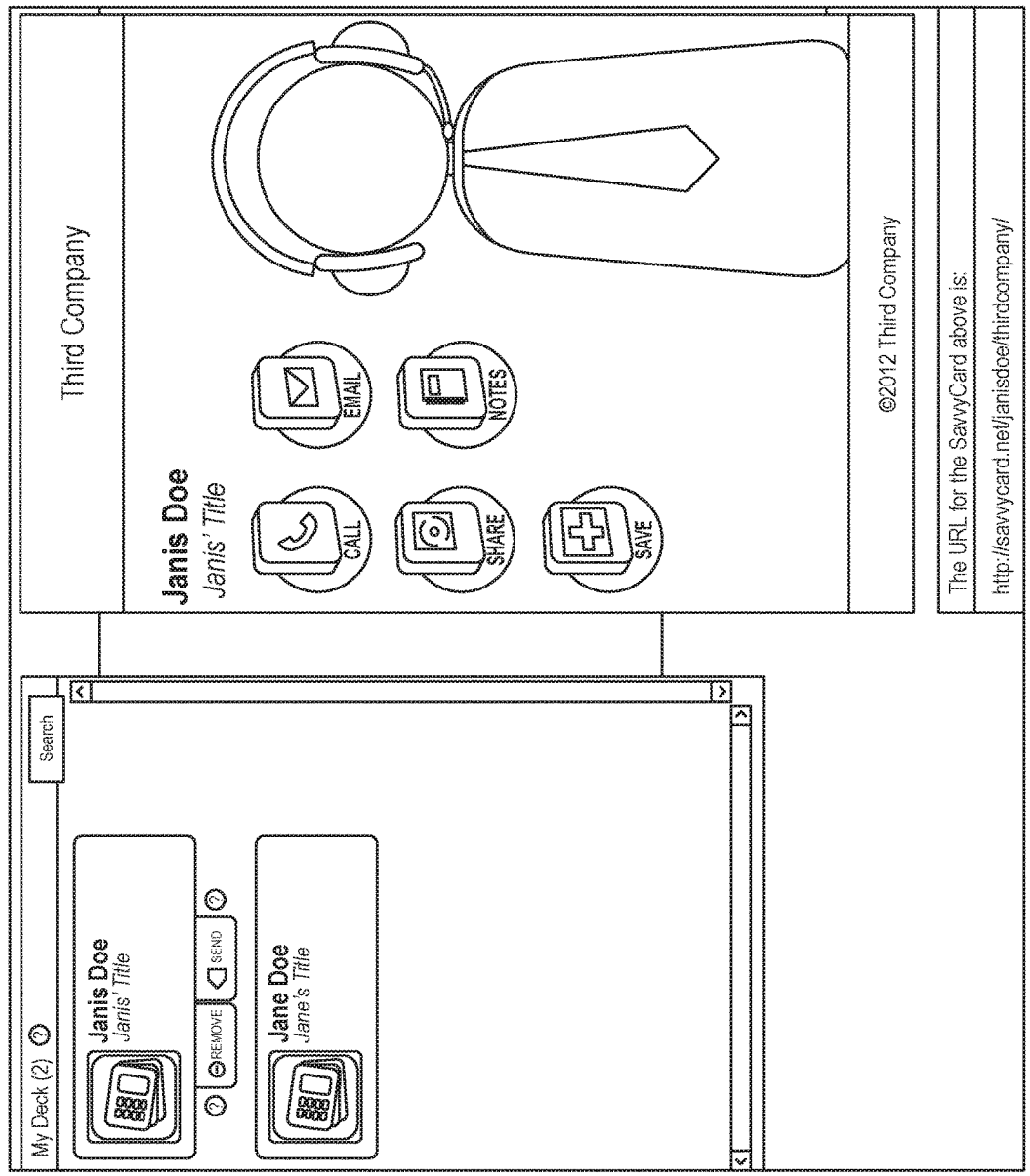
FIG. 29 shows a card for which a remove from directory option and an option for a user to send one of their cards to a displayed card holder appears.

FIG. 28 shows the directory page, in which cards that the user has previously added appear. As shown, the example card holder (John Doe) has previously added Jane and Janis Doe, and their mini-cards appear in the directory results. As shown in FIG. 29, a user can click on any mini-card in the search results, for which a remove from directory option and/or an option for the user to send one of their cards to the displayed card holder may appear.

The services button on the toolbar provides access to services that the website provider may offer to the user. Examples of services include a customized picture and/or backdrop creation. Disclosed embodiments, however, are not limited to any particular services.

Returning now to FIG. 24, if the card holder has multiple cards, the full list is shown with a default card at the top, followed by other cards in the user's card portfolio. The other cards may be listed in any order selected, such as number of times accessed, when created, etc. Disclosed embodiments, however, are not limited to any listing method.

Options may be presented at this web page to circulate the card. "Share this card" enables, e.g., entering of an email or text number to send the card to. "Share to phone" is another way to share the card via text message. Display QR code displays the visual code that can be scanned to access a card.

Figure 30:
FIG. 30 shows a web page after a new card option is selected.
Figure 31:
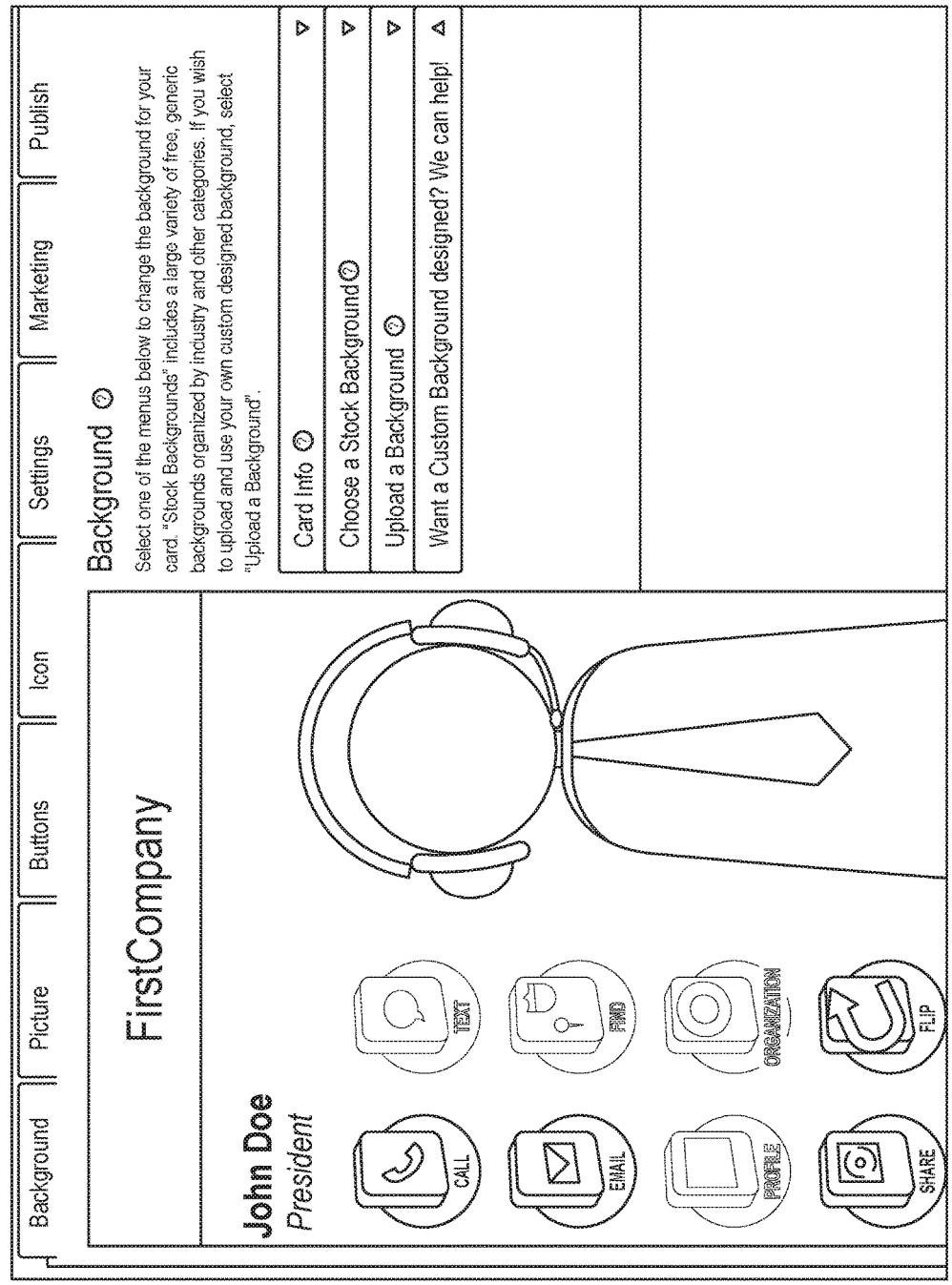
Figure 33:
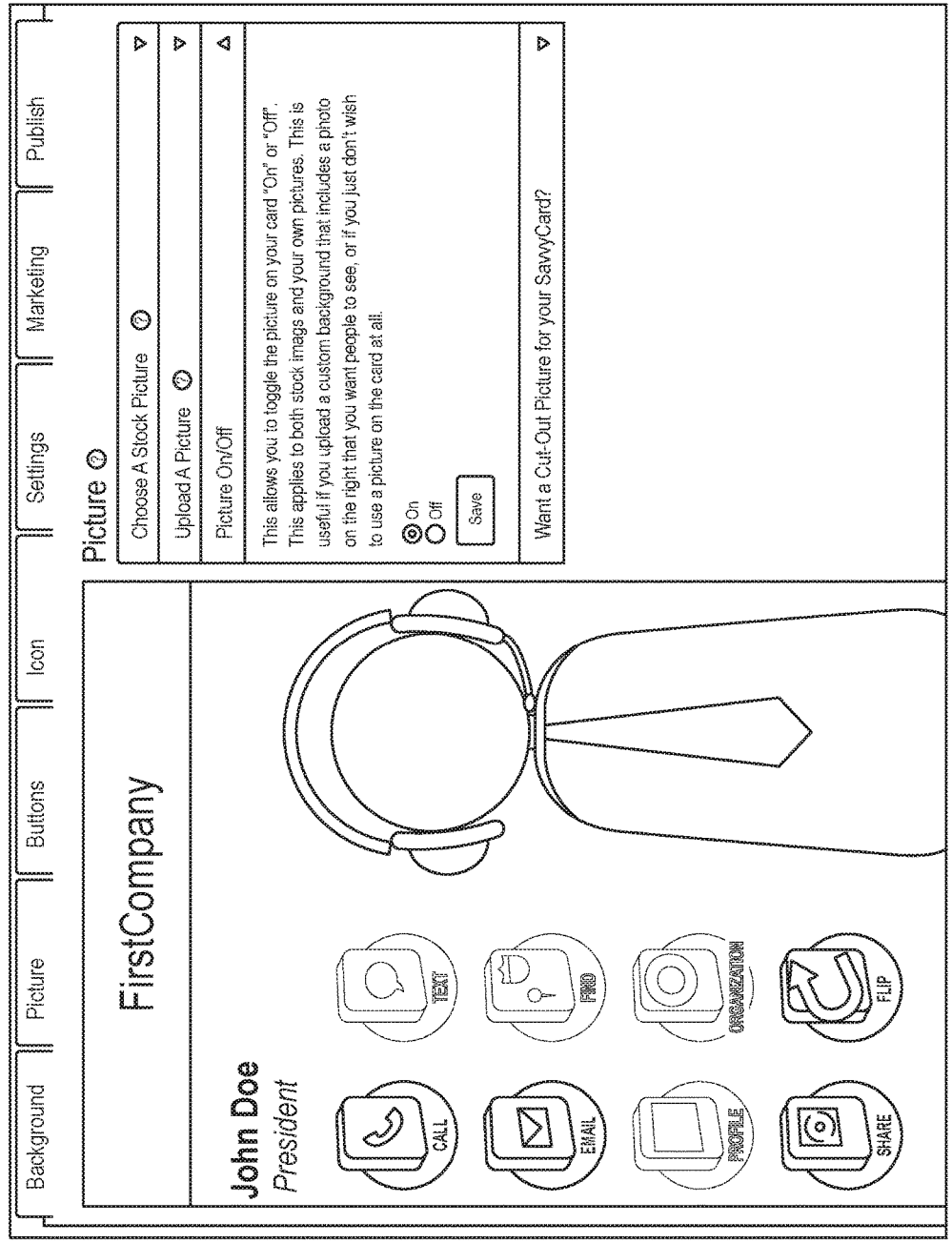
Figure 34:
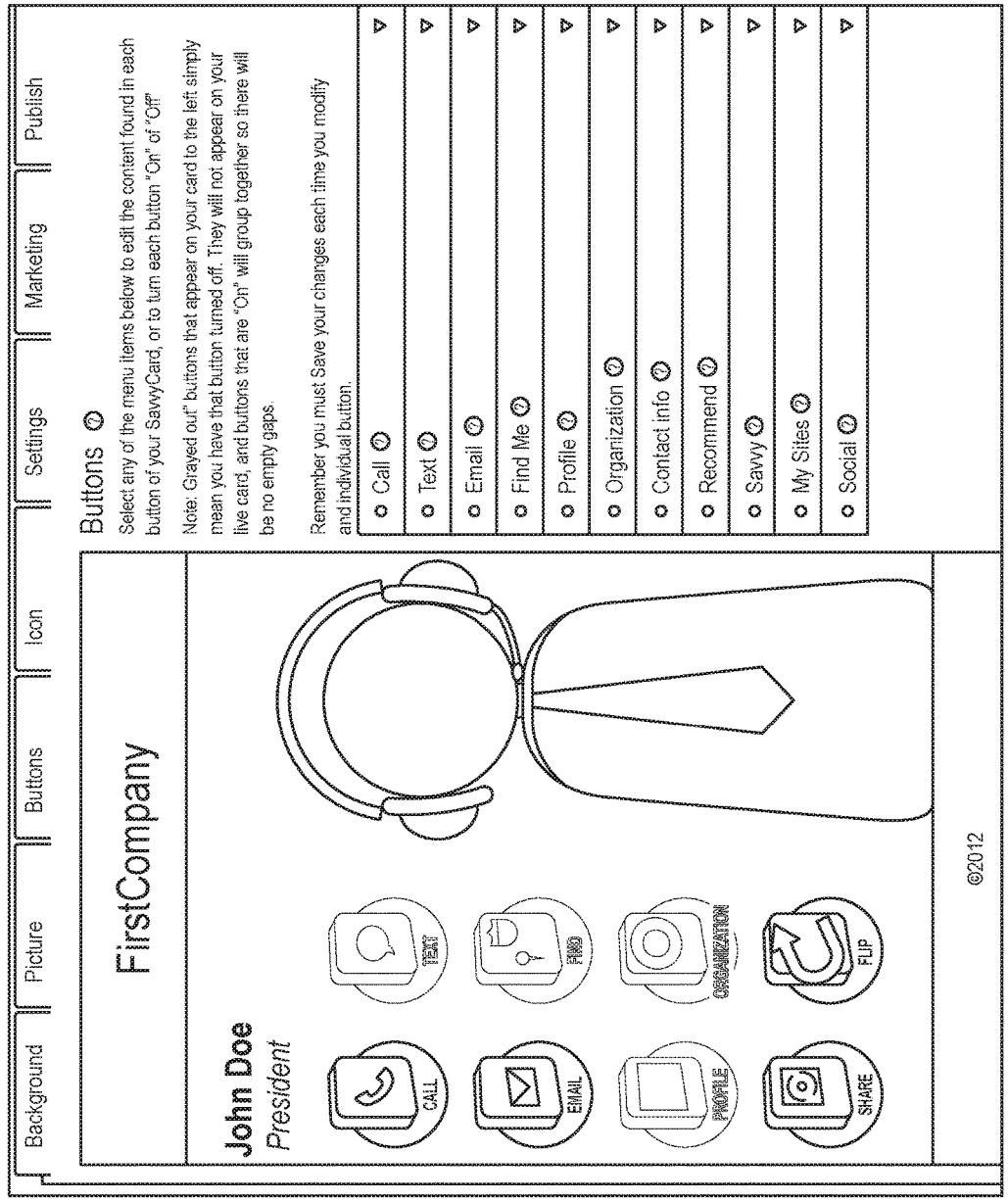
Figure 35:
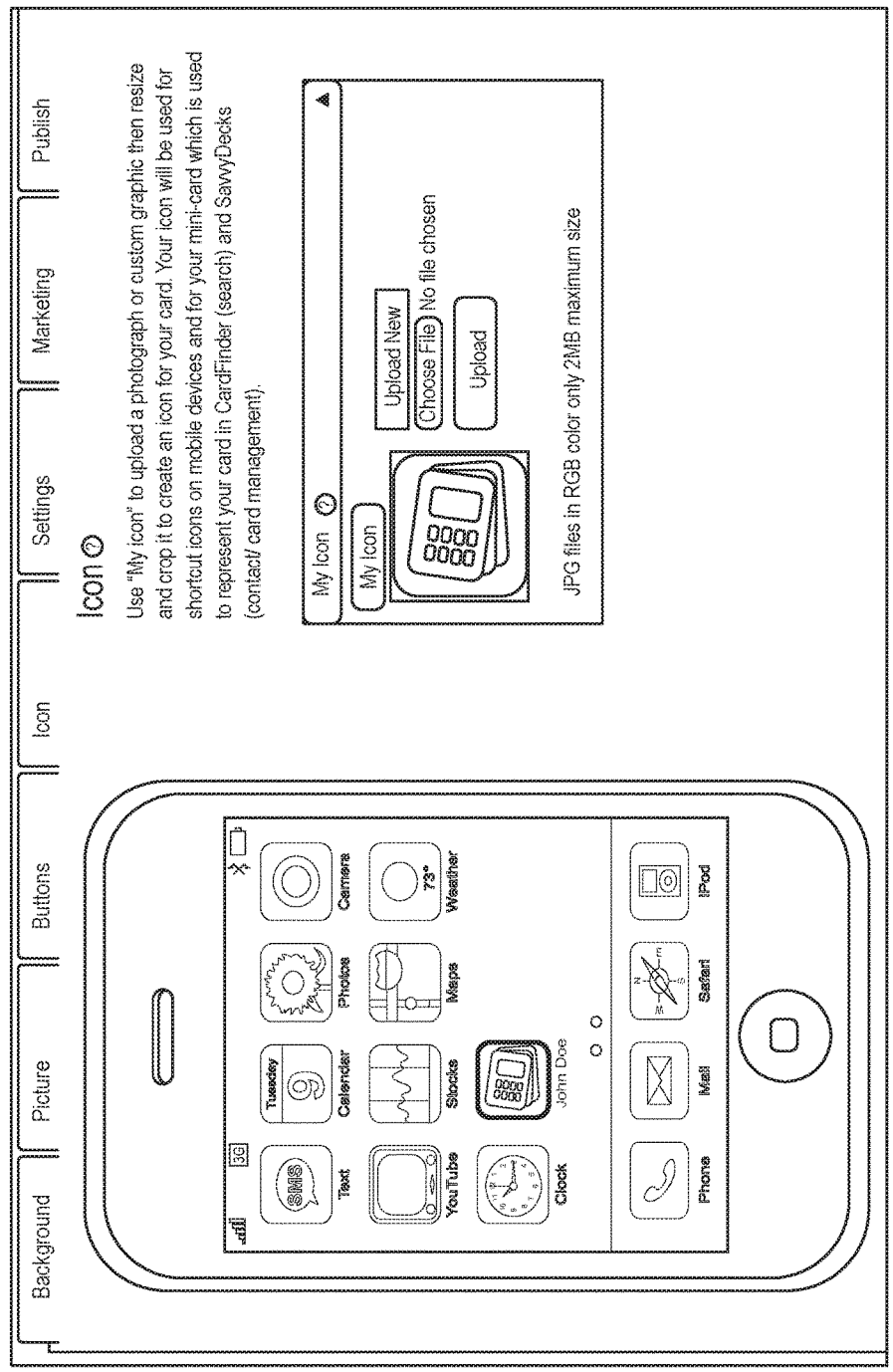

The web page shown in FIG. 24 provides the user the option to create a new card. FIG. 30 shows a web page after the new card option is selected. The user can edit the individual cards via the edit functionality. Alternatively, when a user selects the option to create a new card, the system may provide the user with various options, such as clone card, basic card, or blank card.

Selecting the edit card function engages card creation tool 100. As discussed above, the card creation tool according to disclosed embodiments may take a variety of formats, and FIGS. 31-35 show a non-limiting example of one collection of formats of the card creation tool.

Figure 36:
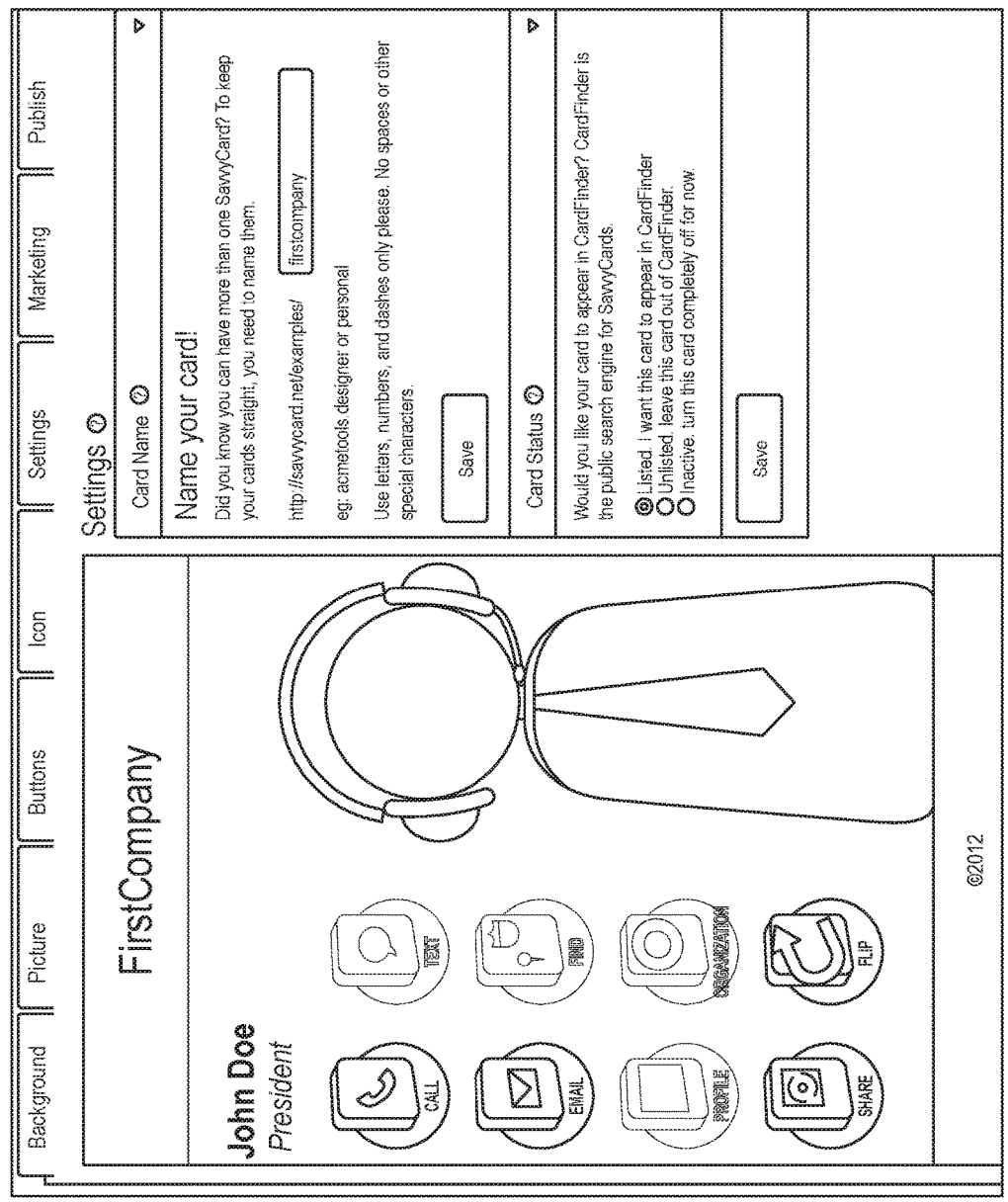
FIG. 36 shows a Settings tab that enables a user to specifically name a card to distinguish it from other cards in the cardholder's portfolio.

Referring now to FIG. 36, the Settings tab enables the user to specifically name a card to distinguish it from other cards in the cardholder's portfolio. The Settings tab enables the user to set the level of access to the card as described above.

Figure 37:
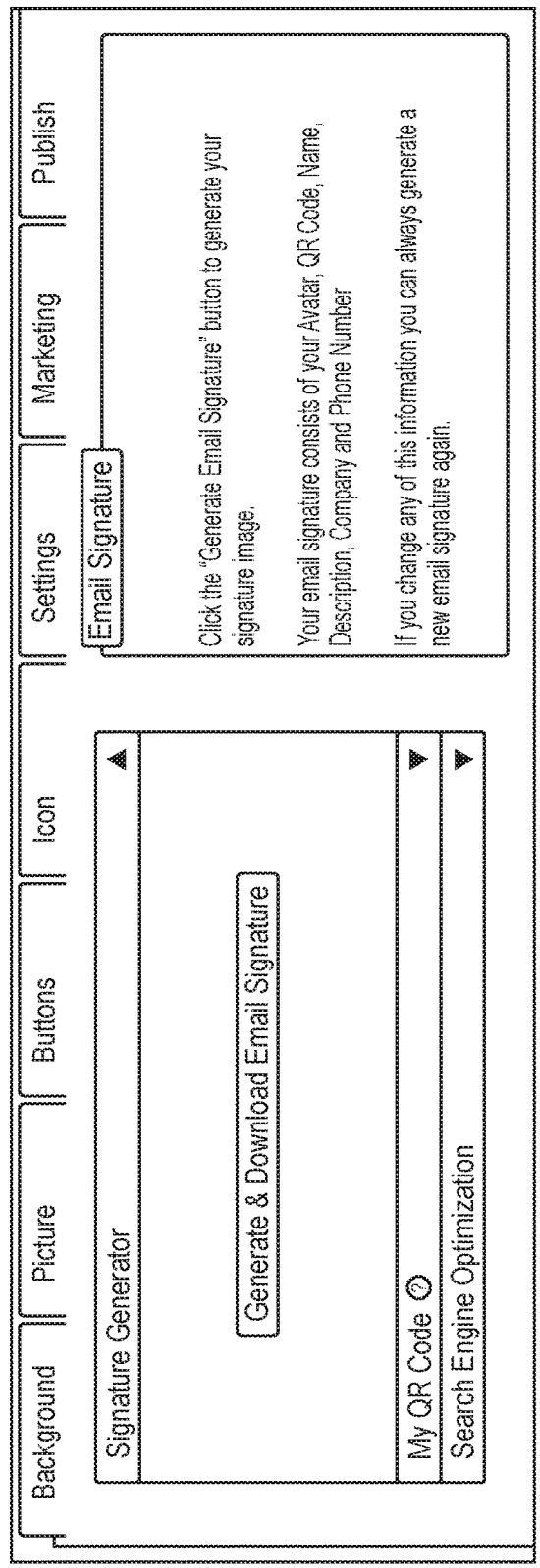
FIG. 37 shows a Marketing tab that links to a webpage providing various features that may assist in advertising and/or disseminating the card.

Referring now to FIG. 37, the Marketing tab links to a webpage providing various features that may assist in advertising and/or disseminating the card. From this webpage, the user can access their email signature, their QR code, and/or establish search parameters that make their card more present in on-line searches.

The Publish tab links to a webpage that facilitates publishing the card onto various network sites, such as FACEBOOK, TWITTER, or LINKEDIN.

Figure 32:
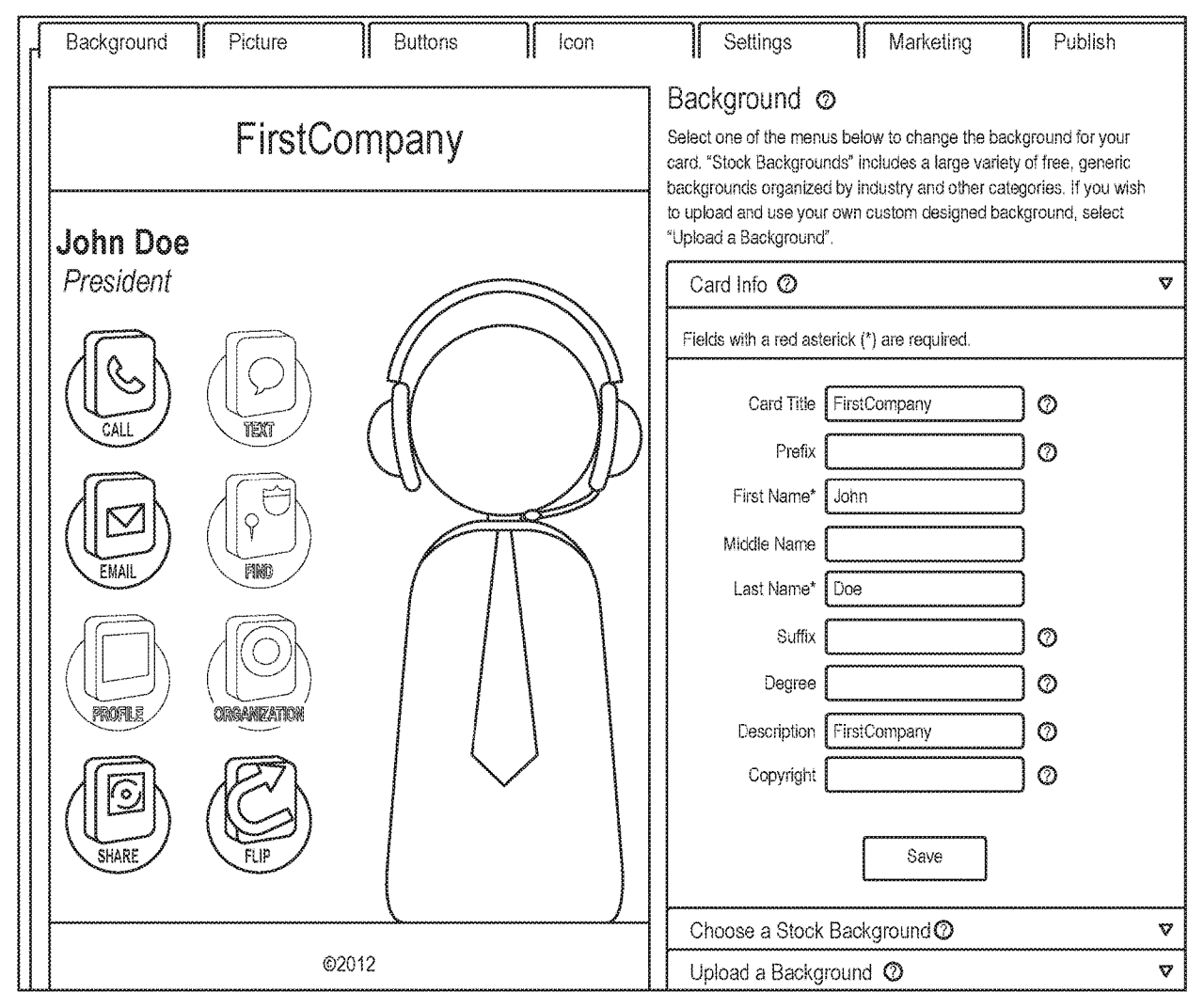
Figure 38:
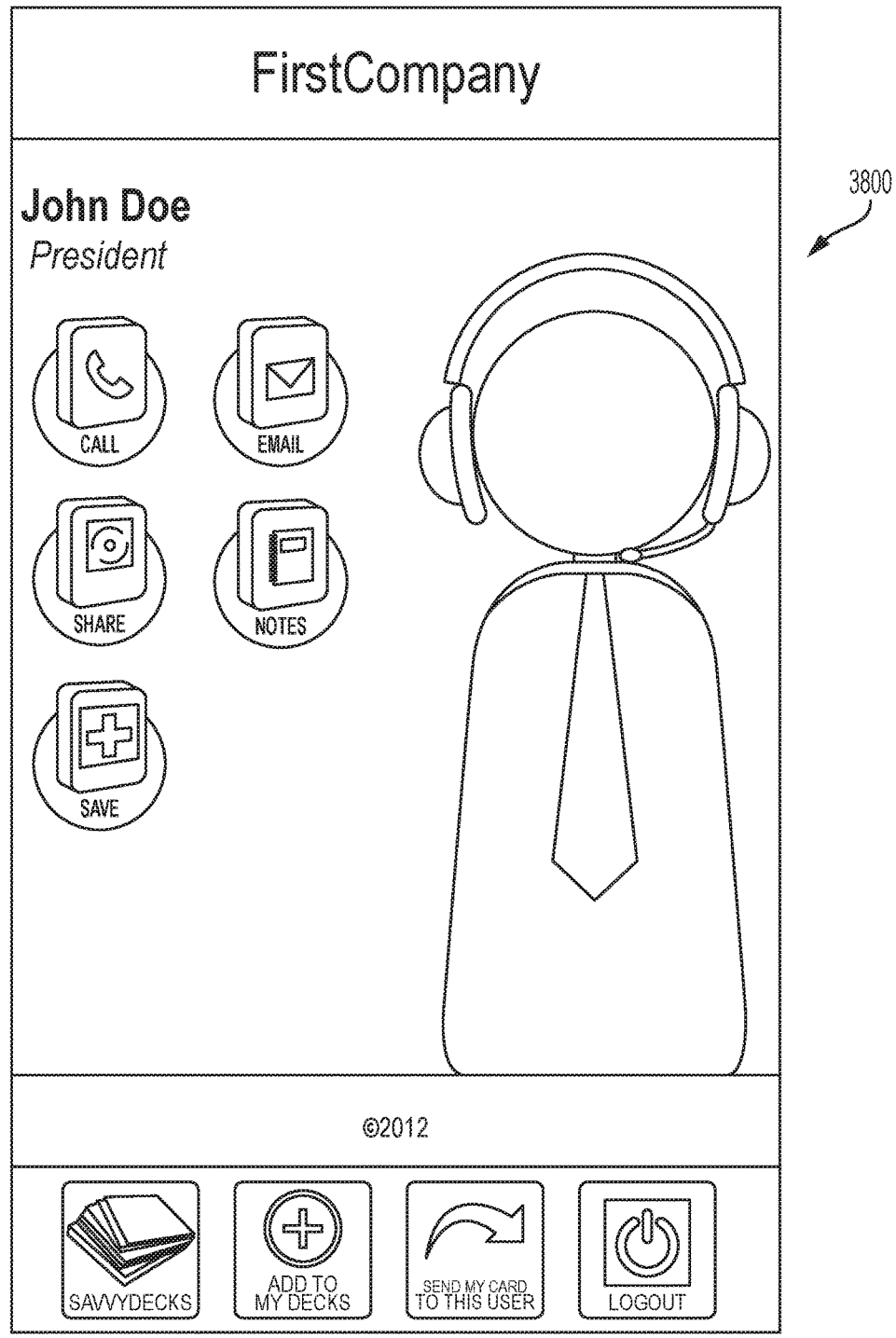
FIG. 38 shows an example card displayed according to a card according to disclosed embodiments shown in FIGS. 31-37.

Referring now to FIG. 38, an example card 3800 displayed according to the embodiments of FIGS. 31-37 is shown. The card is similar in format to cards 600 and 602, for example, as discussed above. Below card 3800 is a global button area 3802. The particular buttons in global button area 3202 in FIG. 38 reflect functions of show directory, add to (remove from) directory, send the users card to this cardholder, and logout. Other global buttons, such as login and/or register, may also be provided.

FIG. 41 shows an example share analytics summary report for an example card. As shown in FIG. 41, the share analytics report may include a list of the users who have shared that particular card the most and a number of times each of these users have shared that card, as well as a total number of times that the particular card has been shared. The report may include a link to the card, e.g., the mini-card, or may display the card itself. The report may include a log of each share of the card for history of the card or some other desired duration. For example, FIG. 41 shows share details of a card for the previous 30 days. For each share of the card, the system may log a date and time, a type of share (e.g., email, text message, Instant Message, etc.), the sharing party of the shared card, the recipient of the shared card and a portion of a message included with the shared card.

Although example embodiments have been shown and described in this specification and figures, those skilled in the art will appreciate that various changes may be made to the illustrated and/or described example embodiments without departing from their principles and spirit.

The invention claimed is:

1. A method of creating a micro site, comprising:
providing, by a server, a microsite creation interface for creating a microsite;
providing in the creation interface a button library containing m action buttons;
first displaying, based on information received via the creation interface, a visual layout of a template microsite, the visual layout including a selectable button display area that displays a maximum of n selectable buttons inn predetermined positions in the button display area;
populating the template micro site by adding k buttons selected from the library of m buttons to the selectable button display area of the template micro site, the k buttons including at least a phone call button and an email button;
creating at least one microsite from the populated template, the at least one microsite being programmed to cooperate with computer hardware to display the k buttons in the button display area of the at least one micro site as follows:
when k<n, display at least all k buttons;
when 2n−1>k>n, initially display a first group buttons, the first group including (a) n−1 of the k buttons in n−1 of then predetermined positions and (b) a first change button in a remaining unoccupied one of the n predetermined positions;
in response to selection of the first change button, change the initial display of the first group of buttons to a second group of buttons, the second group of buttons including (a) remaining ones of k buttons in up to n−1 of the predetermined positions and (b) a second change button in an unoccupied one of then predetermined positions;
in response to selection of the second change button, changing the display of the second group of buttons back to the first group of buttons in a format of the initial display.

2. The method of claim 1, wherein the creating comprises creating a plurality of microsites, each microsite (a) being specific to a device different platform, (b) having an identical web address (c) being programmed to initially display visually identical content including the k buttons consistent with the populated template microsite before the creating, and (d) having functionality for the k buttons specific to a corresponding device platform.

3. The method of claim 2, wherein the plurality of microsites include (a) a first microsite configured for a device platform that has a phone and which is programmed to respond to selection of the phone call button by activating phone functionality of the phone, (b) a second micro site configured for a device platform that does not have a phone which is programmed to respond to selection of the phone call button by displaying a phone number without attempting to access phone functionality.

4. A method of creating a microsite, comprising:
providing, by a server, a microsite creation interface for creating a microsite;
providing in the creation interface a button library containing m non-functional action buttons;
first displaying, based on information received via the creation interface, a visual layout of a template microsite, the visual layout including a selectable button display area that displays a maximum of n selectable buttons inn predetermined positions of the button display area;
populating the template micro site by adding k buttons selected from the library of m buttons to the selectable button display area of the template micro site, the k buttons including at least a phone call button and an email button;
converting the populated template microsite into at least first and second microsites having the same web address, the first and second microsites being specific to different device type platforms, wherein the converting associates the k buttons with functionality consistent with the platform of its corresponding micro site;
each microsite being programmed to initially display visually identical content including the k buttons consistent with the populated template microsite before the converting;
each microsite being programmed to cooperate with computer hardware to display the k buttons in the button display area of the at least one micro site as follows:
when k<n, display at least all k buttons;
when 2n–1>k>n, initially display a first group buttons, the first group including (a) n–1 of the k buttons in n–1 of then predetermined positions and (b) a first change button in a remaining unoccupied one of the n predetermined positions;
in response to selection of the first change button, change the initial display of the first group of buttons to a second group of buttons, the second group of buttons including (a) remaining ones of k buttons in up to n–1 of the predetermined positions and (b) a second change button in an unoccupied one of then predetermined positions;
in response to selection of the second change button, changing the display of the second group of buttons back to the first group of buttons in a format of the initial display.

5. The method of claim 4, further comprising:
the first microsite is configured for a device type platform that has an integrated phone, and the first micro site is programmed to respond to selection of the phone call button by accessing phone functionality; and
the second microsite is configured for a type device platform that lacks an integrated phone, and the second micro site is programmed to respond to the selection of the phone call button by displaying a phone number without attempting to access phone functionality.

6. A system configured to create a microsite, the system including a server and a non-transitory computer readable medium storing computer code, computer code being programmed to cooperate with the server to perform steps, comprising:
providing, by the server, a microsite creation interface for creating a microsite;
providing in the creation interface a button library containing m action buttons;
first displaying, based on information received via the creation interface, a visual layout of a template microsite, the visual layout including a selectable button display area that displays a maximum of n selectable buttons inn predetermined positions in the button display area;
populating the template micro site by adding k buttons selected from the library of m buttons to the selectable button display area of the template micro site, the k buttons including at least a phone call button and an email button;
creating at least one microsite from the populated template, the at least one microsite being programmed to cooperate with computer hardware to display the k buttons in the button display area of the at least one micro site as follows:
when k<n, display at least all k buttons;
when 2n–1>k>n, initially display a first group buttons, the first group including (a) n–1 of the k buttons in n–1 of then predetermined positions and (b) a first change button in a remaining unoccupied one of the n predetermined positions;
in response to selection of the first change button, change the initial display of the first group of buttons to a second group of buttons, the second group of buttons including (a) remaining ones of k buttons in up to n–1 of the predetermined positions and (b) a second change button in an unoccupied one of then predetermined positions;
in response to selection of the second change button, changing the display of the second group of buttons back to the first group of buttons in a format of the initial display.

7. The system of claim 6, wherein the creating comprises creating a plurality of microsites, each microsite (a) being specific to a device different platform, (b) having an identical web address (c) being programmed to initially display visually identical content including the k buttons consistent with the populated template microsite before the creating, and (d) having functionality for the k buttons specific to a corresponding device platform.

8. The system of claim 6, wherein the plurality of micro sites include (a) a first microsite configured for a device platform that has a phone and which is programmed to respond to selection of the phone call button by activating phone functionality of the phone, (b) a second micro site configured for a device platform that does not have a phone which is programmed to respond to selection of the phone call button by displaying a phone number without attempting to access phone functionality.

9. A non-transitory computer readable medium containing computer code adapted to be executed by electronic computer hardware in conjunction with software, the computer code being programmed to perform steps comprising:
providing, by a server, a microsite creation interface for creating a microsite;
providing in the creation interface a button library containing m action buttons;
first displaying, based on information received via the creation interface, a visual layout of a template microsite, the visual layout including a selectable button display area that displays a maximum of n selectable buttons inn predetermined positions in the button display area;
populating the template micro site by adding k buttons selected from the library of m buttons to the selectable button display area of the template micro site, the k buttons including at least a phone call button and an email button;

creating at least one microsite from the populated template, the at least one microsite being programmed to cooperate with computer hardware to display the k buttons in the button display area of the at least one micro site as follows:

when k<n, display at least all k buttons;

when 2n–1>k>n, initially display a first group buttons, the first group including (a) n–1 of the k buttons in n–1 of then predetermined positions and (b) a first change button in a remaining unoccupied one of the n predetermined positions;

in response to selection of the first change button, change the initial display of the first group of buttons to a second group of buttons, the second group of buttons including (a) remaining ones of k buttons in up to n–1 of the predetermined positions and (b) a second change button in an unoccupied one of then predetermined positions;

in response to selection of the second change button, changing the display of the second group of buttons back to the first group of buttons in a format of the initial display.

10. The computer readable medium of claim 9, wherein the creating comprises creating a plurality of microsites, each microsite (a) being specific to a device different platform, (b) having an identical web address (c) being programmed to initially display visually identical content including the k buttons consistent with the populated template microsite before the creating, and (d) having functionality for the k buttons specific to a corresponding device platform.

11. The computer readable medium of claim 9, wherein the plurality of microsites include (a) a first microsite configured for a device platform that has a phone and which is programmed to respond to selection of the phone call button by activating phone functionality of the phone, (b) a second micro site configured for a device platform that does not have a phone which is programmed to respond to selection of the phone call button by displaying a phone number without attempting to access phone functionality.

* * * * *